United States Patent
Jing et al.

(10) Patent No.: US 12,108,289 B2
(45) Date of Patent: *Oct. 1, 2024

(54) SESSION ESTABLISHMENT METHOD AND SYSTEM, AND DEVICE

(71) Applicant: HUAWEI TECHNOLOGIES CO., LTD., Guangdong (CN)

(72) Inventors: Hao Jing, Xi'an (CN); Zaifeng Zong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,275

(22) Filed: Jan. 25, 2023

(65) Prior Publication Data

US 2023/0164644 A1   May 25, 2023

Related U.S. Application Data

(63) Continuation of application No. 16/847,357, filed on Apr. 13, 2020, now Pat. No. 11,589,270, which is a
(Continued)

(30) Foreign Application Priority Data

Oct. 16, 2017  (CN) .......................... 201710963960.1
Nov. 27, 2017  (CN) .......................... 201711208402.0
(Continued)

(51) Int. Cl.
*H04W 36/00*   (2009.01)
*H04W 76/10*   (2018.01)

(52) U.S. Cl.
CPC ... *H04W 36/0022* (2013.01); *H04W 36/0066* (2013.01); *H04W 76/10* (2018.02)

(58) Field of Classification Search
CPC . H04W 36/14; H04W 36/12; H04W 36/0055; H04W 76/10; H04W 8/08; H04W 36/0022; H04W 36/0011
See application file for complete search history.

(56) References Cited

U.S. PATENT DOCUMENTS 11,265,935 B2    3/2022   Bharatia
2017/0339609 A1  11/2017  Youn
(Continued)

FOREIGN PATENT DOCUMENTS

CN    106559868 A    4/2017
CN    106851589 A    6/2017
(Continued)

OTHER PUBLICATIONS

3GPP TS 23.401 V15.1.0 (Sep. 2017), "3rd Generation Partnership Project, Technical Specification Group Services and System Aspects, General Packet Radio Service (GPRS) enhancements for Evolved Universal Terrestrial Radio Access Network (E-UTRAN) access (Release 5)," Sep. 2017, 397 pages.
(Continued)

*Primary Examiner* — Allahyar Kasraian
(74) *Attorney, Agent, or Firm* — Fish & Richardson P.C.

(57) ABSTRACT

The present disclosure relates to session establishment methods, systems, and devices. One example method includes obtaining, by a first mobility management entity, information about a packet data network (PDN) connection that has been established when a terminal accesses an evolved packet core (EPC) network, and obtaining, by the first mobility management entity, single network slice selection assistance information (S-NSSAI) of a network slice corresponding to the PDN connection.

26 Claims, 18 Drawing Sheets

Related U.S. Application Data continuation of application No. PCT/CN2018/109971, filed on Oct. 12, 2018.

(30) Foreign Application Priority Data

| May 21, 2018 | (CN) | 201810491244.2 |
| Oct. 8, 2018 | (CN) | 201811169443.8 |

(56) References Cited

U.S. PATENT DOCUMENTS

| 2018/0367980 A1* | 12/2018 | Lee | H04L 67/51 |
| 2019/0090128 A1 | 3/2019 | Lu | |
| 2019/0357130 A1* | 11/2019 | Garcia Azorero | H04W 8/08 |
| 2019/0387428 A1 | 12/2019 | Ahmad | |
| 2020/0015131 A1* | 1/2020 | Ying | H04W 48/18 |
| 2020/0029207 A1* | 1/2020 | Ni | H04L 12/4633 |
| 2020/0163145 A1* | 5/2020 | Park | H04W 76/18 |
| 2020/0275331 A1 | 8/2020 | Kim | |
| 2020/0359291 A1 | 11/2020 | Ramle | |
| 2021/0211960 A1 | 7/2021 | Ryu | |
| 2021/0289351 A1 | 9/2021 | Ferdi | |

FOREIGN PATENT DOCUMENTS

| CN | 106982458 A | 7/2017 |
| RU | 2474077 C2 | 1/2013 |
| WO | 2017062244 A1 | 4/2017 |

OTHER PUBLICATIONS

3GPP TS 23.501 V1.4.0 (Sep. 2017), "3rd Generation Partnership Project, Technical Specification Group Services and System Aspects, System Architecture for the 5G System, Stage 2 (Release 15)," Sep. 2017, 151 pages.
3GPP TS 23.501 V15.0.0, "3rd Generation Partnership Project; Technical Specification Group Services and System Aspects; System Architecture for the 5G System; Stage 2 (Release 15)," Dec. 2017, 181 pages.
3GPP TS 23.502 V1.2.0 (Sep. 2017), "3rd Generation Partnership Project, Technical Specification Group Services and System Aspects, Procedures for the 5G System, Stage 2 (Release 15)," Sep. 2017, 165 pages.
Extended European Search Report issued in European Application No. 18868000.3 on Nov. 18, 2020, 12 pages.
Huawei, "TS 23.502: Providing S-NSSAI to the RAN and UE during PDU session establishment," 3GPP TSG SA WG2 Meeting #120, S2-172068, Mar. 27-31, 2017, Busan, 6 pages.
NTT Docomo et al., TS 23.501: Network slicing interworking with eDecor, SA WG2 Meeting #122bis, S2-176639, Sophia Antipolis, France, Aug. 21-25, 2017, 3 pages.
NTT Docomo et al., "TS 23.501: Network slicing interworking with eDecor," SA WG2 Meeting #122bis, S2-175679, Sophia Antipolis, France, Aug. 21-25, 2017, 2 pages.
NTT Docomo et al., "TS 23.502: Captures dual-registration mobility procedure from EPC to 5GC," SA WG2 Meeting #121, S2-173947, May 15-19, 2017, Hangzou, China, 11 pages.
NTT Docomo, "No-Nx Interworking Procedures," SA WG2 Meeting #122, S2-174571, Cabo, Mexico, Jun. 26-30, 2017, 11 pages.
Office Action issued in Chinese Application No. 201811169443.8 on Dec. 18, 2019, 14 pages (With English Translation).
Office Action issued in Korean Application No. 2020-7012625 on Feb. 22, 2021, 6 pages (with English translation).
Office Action issued in Russian Application No. 2020115877/07(026044) on Jan. 10, 2022, 35 pages (with English translation).
PCT International Search Report and Written Opinion in International Application No. PCT/CN2018/109971, dated Dec. 29, 2018, 16 pages (With English Translation).
Qualcomm Incorporated, "TS 23.501—Interworking between 5GC slicing mechanisms and eDecor," SA WG2 Meeting #122bis, S2-175769, Aug. 21-25, 2017, Sophia Antipolis, France, 3 pages.
ZTE, "NW Slice Availability Handling Approaches during Mobility," 3GPP TSG RAN WG3 Meeting #95bis, R3-171029, Spokane, USA, Apr. 3-7, 2017, 6 pages.

* cited by examiner

SESSION ESTABLISHMENT METHOD AND SYSTEM, AND DEVICE

CROSS-REFERENCE TO RELATED APPLICATIONS

This application is a continuation of U.S. patent application Ser. No. 16/847,357, filed on Apr. 13, 2020, which is a continuation of International Application No. PCT/CN2018/109971, filed on Oct. 12, 2018, which claims priority to Chinese Application No. 201710963960.1, filed on Oct. 16, 2017 and Chinese Application No. 201711208402.0, filed on Nov. 27, 2017 and Chinese Application No. 201810491244.2, filed on May 21, 2018 and Chinese Application No. 201811169443.8, filed on Oct. 8, 2018. All of the aforementioned applications are hereby incorporated by reference in their entireties.

TECHNICAL FIELD

This application relates to the field of communications technologies, and in particular, to a session establishment method and system and a device.

BACKGROUND

A dedicated core network (DCN) is a dedicated network that is defined by the third generation partnership project (3GPP) in the fourth generation (4G) and that is used to serve a specific type of service. A network slice is an upgrade version of the DCN defined by the 3GPP in the fifth generation (5G), and is a logical-isolated network used to support logical isolation between a particular network capability and a particular network feature. The network slice may include an entire network in an end-to-end (E2E) manner, or a plurality of network slices may share some network function. The network slice is a key technology for meeting a network differentiation requirement of a 5G mobile communications technology proposed by the 3GPP.

A main difference between the network slice and the DCN lies in that one DCN is a dedicated network, there is no association between DCNs, and a terminal can access only one DCN, while a plurality of network slices may share a set of access and mobility management function (AMF) entities, and the terminal may simultaneously access the plurality of network slices that share a same set of AMF entities. In addition, network slice selection assistance information (NSSAI) is introduced into the network slice. When accessing a 5G core network (5GC), the terminal provides requested NSSAI. A network selects a corresponding network slice for the terminal based on the NSSAI, and determines, based on the NSSAI requested by the terminal, NSSAI that the terminal is allowed to access, namely, allowed NSSAI.

However, an access point name (APN) parameter is required when a packet data network (PDN) connection is established in the DCN, and a data network name (DNN) and single NSSAI (S-NSSAI) are required when a protocol data unit (PDU) session is established in the network slice. An APN is equivalent to a DNN in an existing protocol, but at present, when a terminal is handed over from an evolved packet core (EPC) supporting a DCN to a 5GC supporting a network slice, there is no related solution to a problem of how to determine S-NSSAI so that a PDU session can be established in a network slice of the 5GC based on the selected S-NSSAI.

SUMMARY

Embodiments of this application provide a session establishment method and system, and a device, so that when a terminal is handed over from an EPC supporting a DCN to a 5GC supporting a network slice, a PDU session may be established in the network slice of the 5GC based on selected S-NSSAI.

To achieve the foregoing objective, the embodiments of this application provide the following technical solutions:

According to a first aspect, a session establishment method is provided. The method includes: obtaining, by a first mobility management entity, information about a packet data network PDN connection that has been established when a terminal accesses an evolved packet core EPC; and obtaining, by the first mobility management entity based on the information about the PDN connection, single network slice selection assistance information S-NSSAI of a network slice corresponding to the PDN connection, where the S-NSSAI of the network slice corresponding to the PDN connection is used to indicate a network slice for establishing a protocol data unit PDU session. According to the session establishment method provided in this embodiment of this application, the first mobility management entity may obtain, based on the information about the PDN connection, the S-NSSAI of the network slice corresponding to the PDN connection. Therefore, after receiving a PDU session establishment request from the terminal, the first mobility management entity or a second mobility management entity may establish, based on the S-NSSAI of the network slice corresponding to the PDN connection, the PDU session in the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

In a first possible design of the first aspect, the method further includes: obtaining, by the first mobility management entity, information about the second mobility management entity. In this embodiment of this application, the first mobility management entity may also be referred to as an initial mobility management entity, and the second mobility management entity may also be referred to as a target mobility management entity. This is not specifically limited in this embodiment of this application.

In a second possible design of the first aspect, the obtaining, by the first mobility management entity based on the information about the PDN connection, S-NSSAI of a network slice corresponding to the PDN connection includes: determining, by the first mobility management entity based on the information about the PDN connection, the S-NSSAI of the network slice corresponding to the PDN connection. The information about the PDN connection may, for example, include an access point name APN corresponding to the PDN connection or information about a control plane function entity corresponding to the PDN connection. This is not specifically limited in this embodiment of this application.

In a third possible design of the first aspect, the information about the PDN connection includes the access point name APN corresponding to the PDN connection; and the determining, by the first mobility management entity based on the information about the PDN connection, the S-NSSAI of the network slice corresponding to the PDN connection includes: determining, by the first mobility management entity based on the APN and a pre-configured correspondence between an APN and S-NSSAI, the S-NSSAI of the network slice corresponding to the PDN connection.

In a fourth possible design of the first aspect, the pre-configured correspondence between an APN and S-NSSAI includes a one-to-many relationship between an APN and S-NSSAI; and the determining, by the first mobility management entity based on the APN and a pre-configured correspondence between an APN and S-NSSAI, the S-NSSAI of the network slice corresponding to the PDN connection includes: determining, by the first mobility management entity, the S-NSSAI of the network slice corresponding to the PDN connection, based on the APN, a pre-configured one-to-many relationship between an APN and S-NSSAI, and at least one of the following information in the pre-configured one-to-many relationship between an APN and S-NSSAI: a priority of each piece of S-NSSAI, load information of a network slice indicated by each piece of S-NSSAI, and NSSAI supported by a mobility management entity set configured in the first mobility management entity.

In a fifth possible design of the first aspect, the information about the PDN connection includes information about a control plane function entity corresponding to the PDN connection; and the determining, by the first mobility management entity based on the information about the PDN connection, the S-NSSAI of the network slice corresponding to the PDN connection includes: determining, by the first mobility management entity based on the information about the control plane function entity, the S-NSSAI of the network slice corresponding to the PDN connection.

In a sixth possible design of the first aspect, in a possible design, the information about the PDN connection includes the information about the control plane function entity corresponding to the PDN connection; and the obtaining, by the first mobility management entity based on the information about the PDN connection, S-NSSAI of a network slice corresponding to the PDN connection includes: sending, by the first mobility management entity, a request message to the control plane function entity based on the information about the control plane function entity, where the request message is used to request to obtain the S-NSSAI of the network slice corresponding to the PDN connection; and receiving, by the first mobility management entity from the control plane function entity, the S-NSSAI of the network slice corresponding to the PDN connection.

In a possible design, the first mobility management entity the obtaining, by the first mobility management entity based on the information about the PDN connection, S-NSSAI of a network slice corresponding to the PDN connection includes: sending, by the first mobility management entity, the information about the PDN connection to a network storage function entity; and receiving, by the first mobility management entity from the network storage function entity, the S-NSSAI of the network slice corresponding to the PDN connection. In other words, in this embodiment of this application, the first mobility management entity may obtain, from the network storage function entity, the S-NSSAI of the network slice corresponding to the PDN connection.

In a possible design, the first mobility management entity the obtaining, by a first mobility management entity, information about a PDN connection that has been established when a terminal accesses an EPC includes: receiving, by the first mobility management entity, the information about the PDN connection from a third mobility management entity in the EPC. In other words, in this embodiment of this application, the first mobility management entity may obtain the information about the PDN connection from the third mobility management entity in the EPC.

Optionally, the information about the control plane function entity includes an internet protocol IP address or a fully qualified domain name FQDN of the control plane function entity.

In a seventh possible design of the first aspect, the obtaining, by the first mobility management entity, information about a second mobility management entity includes: obtaining, by the first mobility management entity, the information about the second mobility management entity based on the S-NSSAI of the network slice corresponding to the PDN connection.

Optionally, considering that one network slice may include one or more network slice instances, the obtaining, by the first mobility management entity, the information about the second mobility management entity based on the S-NSSAI of the network slice corresponding to the PDN connection includes: determining, by the first mobility management entity based on the information about the PDN connection, a network slice instance corresponding to the PDN connection; and determining, by the first mobility management entity, the information about the second mobility management entity based on the S-NSSAI of the network slice corresponding to the PDN connection and information about the network slice instance. In other words, in this embodiment of this application, the first mobility management entity may determine the information about the second mobility management entity based on the S-NSSAI of the network slice corresponding to the PDN connection.

Alternatively, optionally, the obtaining, by the first mobility management entity, the information about the second mobility management entity based on the S-NSSAI of the network slice corresponding to the PDN connection includes: sending, by the first mobility management entity to a network slice selection function NSSF entity, the S-NSSAI of the network slice corresponding to the PDN connection, where the S-NSSAI of the network slice corresponding to the PDN connection is used to determine the information about the second mobility management entity; and receiving, by the first mobility management entity, the information about the second mobility management entity from the NSSF entity. In other words, in this embodiment of this application, the NSSF entity may determine the information about the second mobility management entity based on the S-NSSAI of the network slice corresponding to the PDN connection.

In an eighth possible design of the first aspect, the obtaining, by the first mobility management entity based on the information about the PDN connection, S-NSSAI of a network slice corresponding to the PDN connection and the obtaining, by the first mobility management entity, information about a second mobility management entity include: sending, by the first mobility management entity, a slice selection request message to an NSSF entity, where the slice selection request message carries the information about the PDN connection, and the information about the PDN connection is used to determine the information about the second mobility management entity and the S-NSSAI of the network slice corresponding to the PDN connection; receiving, by the first mobility management entity from the NSSF entity, information about a candidate mobility management entity set and the S-NSSAI of the network slice corresponding to the PDN connection; and selecting, by the first mobility management entity, the second mobility management entity from the candidate mobility management entity set based on the information about the candidate mobility management entity set. In other words, in this embodiment of this application, the NSSF entity may determine the S-NSSAI of the network slice corresponding to the PDN connection and the information about the candidate mobility management entity set in which the second mobility management entity is located.

In a ninth possible design of the first aspect, the obtaining, by the first mobility management entity based on the information about the PDN connection, S-NSSAI of a network slice corresponding to the PDN connection and the obtaining, by the first mobility management entity, information about a second mobility management entity include: sending, by the first mobility management entity, a slice selection request message to an NSSF entity, where the slice selection request message carries the information about the PDN connection, and the information about the PDN connection is used to determine the information about the second mobility management entity and the S-NSSAI of the network slice corresponding to the PDN connection; and receiving, by the first mobility management entity from the NSSF entity, the S-NSSAI of the network slice corresponding to the PDN connection and the information about the second mobility management entity. In other words, in this embodiment of this application, the NSSF entity may determine the S-NSSAI of the network slice corresponding to the PDN connection and the information about the second mobility management entity.

In another possible design, the first mobility management entity is different from the second mobility management entity, and the method further includes: sending, by the first mobility management entity to the second mobility management entity, the S-NSSAI of the network slice corresponding to the PDN connection.

In another possible design, the sending, by the first mobility management entity to the second mobility management entity, the S-NSSAI of the network slice corresponding to the PDN connection includes: sending, by the first mobility management entity to the second mobility management entity by using an access device, the S-NSSAI of the network slice corresponding to the PDN connection. In other words, a terminal device may be rerouted to the second mobility management entity by using the access device.

In another possible design, the method further includes: sending, by the second mobility management entity, a registration accept message to the terminal; receiving, by the second mobility management entity, a PDU session establishment request from the terminal, where the PDU session establishment request is used to request to establish a PDU session in the network slice corresponding to the PDN connection; and establishing, by the second mobility management entity based on the S-NSSAI of the network slice corresponding to the PDN connection, the PDU session in the network slice corresponding to the PDN connection. According to this solution, when the terminal is handed over from an EPC supporting a DCN to a 5GC supporting a network slice, a PDU session may be established in the network slice of the 5GC based on selected S-NSSAI.

In another possible design, the first mobility management entity is the same as the second mobility management entity, and the method further includes: sending, by the first mobility management entity, a registration accept message to the terminal, where the registration accept message carries the S-NSSAI of the network slice corresponding to the PDN connection; receiving, by the first mobility management entity, a PDU session establishment request from the terminal, where the PDU session establishment request carries the S-NSSAI of the network slice corresponding to the PDN connection; and establishing, by the first mobility management entity based on the S-NSSAI of the network slice corresponding to the PDN connection, the PDU session in the network slice corresponding to the PDN connection. According to this solution, when the terminal is handed over from an EPC supporting a DCN to a 5GC supporting a network slice, a PDU session may be established in the network slice of the 5GC based on selected S-NSSAI.

In another possible design, the first mobility management entity is the same as the second mobility management entity, and the method further includes: sending, by the first mobility management entity, a registration accept message to the terminal; receiving, by the first mobility management entity, a PDU session establishment request from the terminal, where the PDU session establishment request carries S-NSSAI that is of a network slice and that is requested by the terminal and an APN that corresponds to a PDN connection and that is requested by the terminal; and when the S-NSSAI that is of the network slice and that is requested by the terminal is the same as pre-stored S-NSSAI of the network slice corresponding to the PDN connection, and the APN that corresponds to the PDN connection and that is requested by the terminal is the same as the APN corresponding to the PDN connection, establishing, by the first mobility management entity based on the S-NSSAI of the network slice corresponding to the PDN connection, the PDU session in the network slice corresponding to the PDN connection. According to this solution, when the terminal is handed over from an EPC supporting a DCN to a 5GC supporting a network slice, a PDU session may be established in the network slice of the 5GC based on selected S-NSSAI.

In another possible design, the first mobility management entity is the same as the second mobility management entity, and the method further includes: sending, by the first mobility management entity, a registration accept message to the terminal; receiving, by the first mobility management entity, a PDU session establishment request from the terminal, where the PDU session establishment request carries the information about the PDN connection; and establishing, by the first mobility management entity based on the S-NSSAI of the network slice corresponding to the PDN connection, the PDU session in the network slice corresponding to the PDN connection. According to this solution, when the terminal is handed over from an EPC supporting a DCN to a 5GC supporting a network slice, a PDU session may be established in the network slice of the 5GC based on selected S-NSSAI.

According to a second aspect, a session establishment method is provided. The method includes: sending, by a terminal, a registration request message to a first mobility management entity, where the registration request message carries an identifier of the terminal, the identifier of the terminal is used to obtain subscription data of the terminal, and the subscription data includes information about a packet data network PDN connection that has been established when the terminal accesses an evolved packet core EPC; receiving, by the terminal, a registration accept message, where the registration accept message carries single network slice selection assistance information S-NSSAI of a network slice corresponding to the PDN connection; and sending, by the terminal, a protocol data unit PDU session establishment request, where the PDU session establishment request carries the S-NSSAI of the network slice corresponding to the PDN connection, and the PDU session establishment request is used to request to establish a PDU session in the network slice corresponding to the PDN connection. According to this solution, when the terminal is handed over from an EPC supporting a DCN to a 5GC supporting a network slice, a PDU session may be established in the network slice of the 5GC based on selected S-NSSAI.

In a possible design, the registration accept message further carries information about a PDN connection allowed to be handed over, and the method further includes: releasing, by the terminal based on the information about the PDN connection allowed to be handed over, all PDN connections, in the EPC, other than the PDN connection allowed to be handed over. In this way, system resources can be saved.

According to a third aspect, a session establishment method is provided. The method includes: receiving, by a second mobility management entity from a first mobility management entity, single network slice selection assistance information S-NSSAI of a network slice corresponding to a packet data network PDN connection that has been established when a terminal accesses an evolved packet core EPC; sending, by the second mobility management entity, a registration accept message to the terminal; receiving, by the second mobility management entity, a protocol data unit PDU session establishment request from the terminal, where the PDU session establishment request is used to request to establish a PDU session in the network slice corresponding to the PDN connection; and establishing, by the second mobility management entity based on the S-NSSAI of the network slice corresponding to the PDN connection, the PDU session in the network slice corresponding to the PDN connection. According to the session establishment method provided in this embodiment of this application, the second mobility management entity may receive, from the first mobility management entity, the S-NSSAI of the network slice corresponding to the PDN connection, and after receiving the PDU session establishment request from the terminal, establish the PDU session in the network slice corresponding to the PDN connection based on the S-NSSAI of the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

According to a fourth aspect, a first mobility management entity is provided. The first mobility management entity has functions of implementing the method according to the first aspect. The functions may be implemented by hardware, or may be implemented by hardware executing corresponding software. The hardware or the software includes one or more modules corresponding to the foregoing functions.

According to a fifth aspect, a first mobility management entity is provided, and includes a processor and a memory. The memory is configured to store a computer-executable instruction, and when the first mobility management entity operates, the processor executes the computer-executable instruction stored in the memory, so that the first mobility management entity performs the session establishment method according to the first aspect.

According to a sixth aspect, a computer-readable storage medium is provided. The computer-readable storage medium stores an instruction, and when the instruction is run on a computer, the computer can be enabled to perform the session establishment method according to the first aspect.

According to a seventh aspect, a computer program product including an instruction is provided. When the computer program product is run on a computer, the computer can be enabled to perform the session establishment method according to the first aspect.

According to an eighth aspect, a chip system is provided. The chip system includes a processor, configured to support a first mobility management entity in implementing the functions in the foregoing aspects, for example, support the first mobility management entity in obtaining, based on information about a PDN connection, single network slice selection assistance information S-NSSAI of a network slice corresponding to the PDN connection. In a possible design, the chip system further includes a memory. The memory is configured to store a program instruction and data that are necessary for the first mobility management entity. The chip system may include a chip, or may include a chip and another discrete component.

For technical effects brought by any one of the design manners of the fourth aspect to the eighth aspect, refer to technical effects brought by different design manners of the first aspect. Details are not described herein again.

According to a ninth aspect, a terminal is provided. The terminal has functions of implementing the method according to the first aspect. The functions may be implemented by hardware, or may be implemented by hardware executing corresponding software. The hardware or the software includes one or more modules corresponding to the foregoing functions.

According to a tenth aspect, a terminal is provided, and includes a processor and a memory. The memory is configured to store a computer-executable instruction, and when the terminal operates, the processor executes the computer-executable instruction stored in the memory, so that the terminal performs the session establishment method according to the second aspect.

According to an eleventh aspect, a computer-readable storage medium is provided. The computer-readable storage medium stores an instruction, and when the instruction is run on a computer, the computer can be enabled to perform the session establishment method according to the second aspect.

According to a twelfth aspect, a computer program product including an instruction is provided. When the computer program product is run on a computer, the computer can be enabled to perform the session establishment method according to the second aspect.

According to a thirteenth aspect, a chip system is provided. The chip system includes a processor, configured to support a terminal in implementing functions in the foregoing aspects, for example, support the terminal in sending a protocol data unit PDU session establishment request, where the PDU session establishment request carries S-NSSAI of a network slice corresponding to a PDN connection, and the PDU session establishment request is used to request to establish a PDU session in the network slice corresponding to the PDN connection. In a possible design, the chip system further includes a memory. The memory is configured to store a program instruction and data that are necessary for the terminal. The chip system may include a chip, or may include a chip and another discrete component.

For technical effects brought by any one of the design manners of the ninth aspect to the thirteenth aspect, refer to technical effects brought by different design manners of the second aspect. Details are not described herein again.

According to a fourteenth aspect, a second mobility management entity is provided. The second mobility management entity has functions of implementing the method according to the third aspect. The functions may be implemented by hardware, or may be implemented by hardware executing corresponding software. The hardware or the software includes one or more modules corresponding to the foregoing functions.

According to a fifteenth aspect, a second mobility management entity is provided, and includes a processor and a memory. The memory is configured to store a computer-executable instruction, and when the second mobility management entity operates, the processor executes the computer-executable instruction stored in the memory, so that the second mobility management entity performs the session establishment method according to the third aspect.

According to a sixteenth aspect, a computer-readable storage medium is provided. The computer-readable storage medium stores an instruction, and when the instruction is run on a computer, the computer can be enabled to perform the session establishment method according to the third aspect.

According to a seventeenth aspect, a computer program product including an instruction is provided. When the computer program product is run on a computer, the computer can be enabled to perform the session establishment method according to the third aspect.

According to an eighteenth aspect, a chip system is provided. The chip system includes a processor, configured to support a second mobility management entity in implementing the functions in the foregoing aspects, for example, support the second mobility management entity in establishing, based on S-NSSAI of a network slice corresponding to a PDN connection, a PDU session in the network slice corresponding to the PDN connection. In a possible design, the chip system further includes a memory. The memory is configured to store a program instruction and data that are necessary for the second mobility management entity. The chip system may include a chip, or may include a chip and another discrete component.

For technical effects brought by any one of the design manners of the fourteenth aspect to the eighteenth aspect, refer to technical effects brought by different design manners of the third aspect. Details are not described herein again.

According to a nineteenth aspect, a session establishment system is provided. The session establishment system includes a first mobility management entity and a second mobility management entity, where the first mobility management entity is configured to obtain information about a packet data network PDN connection that has been established when a terminal accesses an evolved packet core EPC; the first mobility management entity is further configured to: after obtaining, based on the information about the PDN connection, single network slice selection assistance information S-NSSAI of a network slice corresponding to the PDN connection, send, to the second mobility management entity, the S-NSSAI of the network slice corresponding to the PDN connection, where the S-NSSAI of the network slice corresponding to the PDN connection is used to indicate a network slice for establishing a protocol data unit PDU session; the second mobility management entity is configured to receive, from the first mobility management entity, the S-NSSAI of the network slice corresponding to the PDN connection; and the second mobility management entity is further configured to: after sending a registration accept message to the terminal, receive a protocol data unit PDU session establishment request from the terminal, and establish, based on the S-NSSAI of the network slice corresponding to the PDN connection, the PDU session in the network slice corresponding to the PDN connection.

According to a twentieth aspect, a session establishment method is provided. The method includes: determining, by a control plane function entity, single network slice selection assistance information S-NSSAI of a network slice corresponding to a session; storing, by the control plane function entity to a user data management entity, the S-NSSAI of the network slice corresponding to the session; and obtaining, by a first mobility management entity from the user data management entity, the S-NSSAI of the network slice corresponding to the session, where the S-NSSAI of the network slice corresponding to the session is used to indicate a network slice for establishing a session. According to the session establishment method, the first mobility management entity may obtain, from the user data management entity, the S-NSSAI of the network slice corresponding to the session. Therefore, the first mobility management entity or a second mobility management entity may establish, based on the S-NSSAI of the network slice corresponding to the session, a session in the network slice corresponding to the session. In other words, according to this solution, when the terminal is handed over from an EPC to a 5GC supporting a network slice, or when the terminal is handed over from a 5GC that does not support a network slice to a 5GC that supports a network slice, a session may be established in the network slice of the 5GC based on selected S-NSSAI.

In a possible design, the determining, by a control plane function entity, S-NSSAI of a network slice corresponding to a session includes: determining, by the control plane function entity, one piece of S-NSSAI supported by the control plane function entity as the S-NSSAI of the network slice corresponding to the session.

In a possible design, the method further includes: obtaining, by the first mobility management entity, information about the second mobility management entity. In this embodiment of this application, the first mobility management entity may also be referred to as an initial mobility management entity, and the second mobility management entity may also be referred to as a target mobility management entity. This is not specifically limited in this embodiment of this application.

For a manner in which the first mobility management entity obtains the information about the second mobility management entity, refer to related descriptions in any one of the seventh possible design of the first aspect to the ninth possible design of the first aspect. Details are not described herein again.

In another possible design, the first mobility management entity is different from the second mobility management entity, and the method further includes: sending, by the first mobility management entity to the second mobility management entity, the S-NSSAI of the network slice corresponding to the session.

In a possible design, the sending, by the first mobility management entity to the second mobility management entity, the S-NSSAI of the network slice corresponding to the session includes: sending, by the first mobility management entity to the second mobility management entity by using an access device, the S-NSSAI of the network slice corresponding to the session. In other words, a terminal device may be rerouted to the second mobility management entity by using the access device.

In a possible design, the method further includes: sending, by the second mobility management entity, a registration accept message to the terminal; receiving, by the second mobility management entity, a session establishment request from the terminal, where the session establishment request is used to request to establish a session in the network slice corresponding to the session; and establishing, by the second mobility management entity based on the S-NSSAI of the network slice corresponding to the session, a session in the network slice corresponding to the session. In other words, according to this solution, when the terminal is handed over from an EPC to a 5GC supporting a network slice, or when the terminal is handed over from a 5GC that does not support a network slice to a 5GC that supports a network slice, a session may be established in the network slice of the 5GC based on selected S-NSSAI.

In a possible design, the first mobility management entity is the same as the second mobility management entity, and the method further includes: sending, by the first mobility management entity, a registration accept message to the terminal, where the registration accept message carries the S-NSSAI of the network slice corresponding to the session; receiving, by the first mobility management entity, a session establishment request from the terminal, where the session establishment request carries the S-NSSAI of the network slice corresponding to the session; and establishing, by the first mobility management entity based on the S-NSSAI of the network slice corresponding to the session, a session in the network slice corresponding to the session. In other words, according to this solution, when the terminal is handed over from an EPC to a 5GC supporting a network slice, or when the terminal is handed over from a 5GC that does not support a network slice to a 5GC that supports a network slice, a session may be established in the network slice of the 5GC based on selected S-NSSAI.

In a possible design, the first mobility management entity is the same as the second mobility management entity, and the method further includes: sending, by the first mobility management entity, a registration accept message to the terminal; receiving, by the first mobility management entity, a session establishment request from the terminal, where the session establishment request carries S-NSSAI that is of a network slice and that is requested by the terminal and session information that corresponds to a session and that is requested by the terminal; and when the S-NSSAI that is of the network slice and that is requested by the terminal is the same as pre-stored S-NSSAI of the network slice corresponding to the session, and the session information that corresponds to the session and that is requested by the terminal is the same as session information corresponding to the session, establishing, by the first mobility management entity based on the S-NSSAI of the network slice corresponding to the session, a session in the network slice corresponding to the session. In other words, according to this solution, when the terminal is handed over from an EPC to a 5GC supporting a network slice, or when the terminal is handed over from a 5GC that does not support a network slice to a 5GC that supports a network slice, a session may be established in the network slice of the 5GC based on selected S-NSSAI.

In a possible design, the first mobility management entity is the same as the second mobility management entity, and the method further includes: sending, by the first mobility management entity, a registration accept message to the terminal; receiving, by the first mobility management entity, a session establishment request from the terminal, where the session establishment request carries the information about the session; and establishing, by the first mobility management entity based on the S-NSSAI of the network slice corresponding to the session, a session in the network slice corresponding to the session. In other words, according to this solution, when the terminal is handed over from an EPC to a 5GC supporting a network slice, or when the terminal is handed over from a 5GC that does not support a network slice to a 5GC that supports a network slice, a session may be established in the network slice of the 5GC based on selected S-NSSAI.

According to a twenty-first aspect, a session establishment system is provided. The session establishment system includes a control plane function entity and a first mobility management entity. The control plane function entity is configured to: determine single network slice selection assistance information S-NSSAI of a network slice corresponding to a session, and store, to a user data management entity, the S-NSSAI of the network slice corresponding to the session. The first mobility management entity is configured to obtain, from the user data management entity, the S-NSSAI of the network slice corresponding to the session, where the S-NSSAI of the network slice corresponding to the session is used to indicate a network slice for establishing a session.

According to a twenty-second aspect, a session establishment method is provided. The method includes: obtaining, by a control plane function entity, information about a packet data network PDN connection that has been established when a terminal accesses an evolved packet core EPC and single network slice selection assistance information S-NSSAI of a network slice corresponding to the PDN connection; and sending, by the control plane function entity to a network storage function entity, the information about the PDN connection and the S-NSSAI of the network slice corresponding to the PDN connection; and obtaining, by the first mobility management entity from the network storage function entity based on the information about the PDN connection, the S-NSSAI of the network slice corresponding to the PDN connection, where the S-NSSAI of the network slice corresponding to the PDN connection is used to indicate a network slice for establishing a protocol data unit PDU session. According to this solution, a first AMF entity may obtain, based on the information about the PDN connection, the S-NSSAI of the network slice corresponding to the PDN connection. Therefore, after receiving a handover request from an MME, the first AMF entity may obtain information about a second AMF entity based on the S-NSSAI of the network slice corresponding to the PDN connection, and further, may establish the PDU session in the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

In a possible design, the sending, by the control plane function entity to a network storage function entity, the information about the PDN connection and the S-NSSAI of the network slice corresponding to the PDN connection includes: in a process of establishing the PDN connection or a process of establishing the PDU session, sending, by the control plane function entity to the network storage function entity, the information about the PDN connection and the S-NSSAI of the network slice corresponding to the PDN connection.

In a possible design, the session establishment method provided in this embodiment of this application may further include: sending, by the control plane function entity, the information about the PDN connection to a third mobility management entity in the EPC; and sending, by the third mobility management entity, the information about the PDN connection to the first mobility management entity. According to this solution, the first mobility management entity may obtain the information about the PDN connection.

In a possible design, the obtaining, by a control plane function entity, single network slice selection assistance information S-NSSAI of a network slice corresponding to the PDN connection includes: determining, by the control plane function entity, S-NSSAI corresponding to the PDU session as the S-NSSAI of the network slice corresponding to the PDN connection when the PDU session is handed over to the EPC. According to this solution, the control plane function entity may obtain the S-NSSAI of the network slice corresponding to the PDN connection.

According to a twenty-third aspect, a control plane function entity is provided. The control plane function entity has functions of implementing the method according to the third aspect. The functions may be implemented by hardware, or may be implemented by hardware executing corresponding software. The hardware or the software includes one or more modules corresponding to the foregoing functions.

According to a twenty-fourth aspect, a control plane function entity is provided, and includes a processor and a memory. The memory is configured to store a computer-executable instruction, and when the control plane function entity operates, the processor executes the computer-executable instruction stored in the memory, so that the control plane function entity performs the session establishment method according to the third aspect.

According to a twenty-fifth aspect, a computer-readable storage medium is provided. The computer-readable storage medium stores an instruction, and when the instruction is run on a computer, the computer can be enabled to perform the session establishment method according to the third aspect.

According to a twenty-sixth aspect, a computer program product including an instruction is provided. When the computer program product is run on a computer, the computer can be enabled to perform the session establishment method according to the third aspect.

According to a twenty-seventh aspect, a chip system is provided. The chip system includes a processor, configured to support a control plane function entity in implementing the functions in the foregoing aspects, for example, support the control plane function entity in establishing, based on S-NSSAI of a network slice corresponding to a PDN connection, a PDU session in the network slice corresponding to the PDN connection. In a possible design, the chip system further includes a memory. The memory is configured to store a program instruction and data that are necessary for the control plane function entity. The chip system may include a chip, or may include a chip and another discrete component.

For technical effects brought by any one of the design manners of the twenty-third aspect to the twenty-seventh aspect, refer to technical effects brought by different design manners of the twenty-second aspect. Details are not described herein again.

According to a twenty-eighth aspect, a session establishment system is provided. The session establishment system includes a control plane function entity and a first mobility management entity. The control plane function entity is configured to obtain information about a packet data network PDN connection that has been established when a terminal accesses an evolved packet core EPC and single network slice selection assistance information S-NSSAI of a network slice corresponding to the PDN connection. The control plane function entity is further configured to send, to a network storage function entity, the information about the PDN connection and the S-NSSAI of the network slice corresponding to the PDN connection. The first mobility management entity is configured to send the information about the PDN connection to the network storage function entity, where the information about the PDN connection is used to determine the S-NSSAI of the network slice corresponding to the PDN connection. The first mobility management entity is configured to receive, from the network storage function entity, the S-NSSAI of the network slice corresponding to the PDN connection. For technical effects of the twenty-eighth aspect, refer to the twenty-second aspect. Details are not described herein again.

According to a twenty-ninth aspect, a session establishment method is provided. The method includes: receiving, by a network storage function entity from a first mobility management entity, first information of a user plane entity corresponding to a packet data network PDN connection; determining, by the network storage function entity based on the first information, single network slice selection assistance information S-NSSAI of a first network slice corresponding to the PDN connection; and sending, by the network storage function entity, the S-NSSAI of the first network slice to the first mobility management entity. Based on the session establishment method provided in this embodiment of this application, the first mobility management entity may obtain, based on the first information of the user plane entity corresponding to the PDN connection, the S-NSSAI of the first network slice corresponding to the PDN connection. Therefore, after receiving a handover request or a registration request, the first mobility management entity may obtain information about a second mobility management entity based on the S-NSSAI of the first network slice corresponding to the PDN connection, and further may establish a PDU session in the corresponding first network slice. In other words, according to this solution, when a terminal is handed over from an EPC supporting a DCN to a 5GC supporting a network slice, interworking may be implemented and a corresponding session may be established in the network slice of the 5GC based on selected S-NSSAI.

In a possible design, before the receiving, by a network storage function entity from a first mobility management entity, first information of a user plane entity corresponding to a PDN, the method further includes: receiving, by the network storage function entity from the user plane entity, the first information and the S-NSSAI that is of the first network slice and that corresponds to the first information. In this way, optionally, the network storage function entity may store a correspondence between the first information and the S-NSSAI of the first network slice. Further, after obtaining the first information, the network storage function entity may query the correspondence to determine the S-NSSAI that is of the first network slice and that corresponds to the first information. This is not specifically limited in this embodiment of this application.

According to a thirtieth aspect, a session establishment method is provided. The method includes: obtaining, by a user plane entity, information about the user plane entity and single network slice selection assistance information S-NSSAI that is of a network slice and that corresponds to the information about the user plane entity; sending, by the user plane entity, the information about the user plane entity and the S-NSSAI of the network slice to a network storage function entity; and obtaining, by a first mobility management entity from the network storage function entity based on first information of a user plane entity corresponding to a packet data network PDN, S-NSSAI of a first network slice corresponding to the PDN connection. Based on the session establishment method provided in this embodiment of this application, the first mobility management entity may obtain, based on the first information of the user plane entity corresponding to the PDN connection, the S-NSSAI of the first network slice corresponding to the PDN connection. Therefore, after receiving a handover request or a registration request, the first mobility management entity may obtain information about a second mobility management entity based on the S-NSSAI of the first network slice corresponding to the PDN connection, and further may establish a PDU session in the corresponding first network slice. In other words, according to this solution, when a terminal is handed over from an EPC supporting a DCN to a 5GC supporting a network slice, interworking may be implemented and a corresponding session may be established in the network slice of the 5GC based on selected S-NSSAI.

In a possible design, the sending, by the user plane entity, the information about the user plane entity and the S-NSSAI of the network slice to a network storage function entity includes: in a process in which the user plane entity registers with the network storage function entity, or in a process of establishing the PDN connection, or in a process of establishing the protocol data unit PDU session, sending, by the user plane entity, the information about the user plane entity and the S-NSSAI of the network slice to the network storage function entity.

According to a thirty-first aspect, a network storage function entity is provided. The network storage function entity has functions of implementing the method according to the twenty-ninth aspect. The functions may be implemented by hardware, or may be implemented by hardware executing corresponding software. The hardware or the software includes one or more modules corresponding to the foregoing functions.

According to a thirty-second aspect, a network storage function entity is provided, and includes a processor and a memory. The memory is configured to store a computer-executable instruction, and when the network storage function entity operates, the processor executes the computer-executable instruction stored in the memory, so that the network storage function entity performs the session establishment method according to the twenty-ninth aspect.

According to a thirty-third aspect, a network storage function entity is provided, and includes a processor. The processor is configured to: after being coupled to a memory and reading an instruction in the memory, perform, according to the instruction, the session establishment method according to the twenty-ninth aspect.

According to a thirty-fourth aspect, a computer-readable storage medium is provided. The computer-readable storage medium stores an instruction, and when the instruction is run on a computer, the computer can be enabled to perform the session establishment method according to the twenty-ninth aspect.

According to a thirty-fifth aspect, a computer program product including an instruction is provided. When the computer program product is run on a computer, the computer can be enabled to perform the session establishment method according to the twenty-ninth aspect.

According to a thirty-sixth aspect, an apparatus (for example, the apparatus may be a chip system) is provided. The apparatus includes a processor, configured to support a network storage function entity in implementing the functions in the twenty-ninth aspect, for example, determining, based on first information, S-NSSAI of a first network slice corresponding to a PDN connection. In a possible design, the apparatus further includes a memory. The memory is configured to store a program instruction and data that are necessary for the network storage function entity. When the apparatus is a chip system, the apparatus may include a chip, or may include a chip and another discrete component.

For technical effects brought by any one of the design manners of the thirty-first aspect to the thirty-sixth aspect, refer to technical effects brought by different design manners of the twenty-ninth aspect. Details are not described herein again.

According to a thirty-seventh aspect, a user plane entity is provided. The user plane entity has functions of implementing the method according to the thirtieth aspect. The functions may be implemented by hardware, or may be implemented by hardware executing corresponding software. The hardware or the software includes one or more modules corresponding to the foregoing functions.

According to a thirty-eighth aspect, a user plane entity is provided, and includes a processor and a memory. The memory is configured to store a computer-executable instruction, and when the user plane entity operates, the processor executes the computer-executable instruction stored in the memory, so that the user plane entity performs the session establishment method according to the thirtieth aspect.

According to a thirty-ninth aspect, a user plane entity is provided, and includes a processor. The processor is configured to: after being coupled to a memory and reading an instruction in the memory, perform, according to the instruction, the session establishment method according to the thirtieth aspect.

According to a fortieth aspect, a computer-readable storage medium is provided. The computer-readable storage medium stores an instruction, and when the instruction is run on a computer, the computer can be enabled to perform the session establishment method according to the thirtieth aspect.

According to a forty-first aspect, a computer program product including an instruction is provided. When the computer program product is run on a computer, the computer can be enabled to perform the session establishment method according to the thirtieth aspect.

According to a forty-second aspect, an apparatus (for example, the apparatus may be a chip system) is provided. The apparatus includes a processor, configured to support a user plane entity in implementing the functions in the thirtieth aspect, for example, determining, based on first information, S-NSSAI of a first network slice corresponding to a PDN connection. In a possible design, the apparatus further includes a memory. The memory is configured to store a program instruction and data that are necessary for the user plane entity. When the apparatus is a chip system, the apparatus may include a chip, or may include a chip and another discrete component.

For technical effects brought by any one of the design manners of the thirty-seventh aspect to the forty-second aspect, refer to technical effects brought by different design manners of the thirtieth aspect. Details are not described herein again.

According to a forty-third aspect, a session establishment system is provided. The session establishment system includes a first mobility management entity and a network storage function entity. The first mobility management entity is configured to send, to the network storage function entity, first information of a user plane entity corresponding to a PDN connection. The network storage function entity is configured to receive the first information from the first mobility management entity. The network storage function entity is further configured to determine, based on the first information, single network slice selection assistance information S-NSSAI of a first network slice corresponding to the PDN connection. The network storage function entity is further configured to send the S-NSSAI of the first network slice to the first mobility management entity. The first mobility management entity is further configured to receive the S-NSSAI of the first network slice from the network storage function entity.

In a possible design, the system further includes a user plane entity. The user plane entity is configured to send, to the network storage function entity, the first information and the S-NSSAI that is of the first network slice and that corresponds to the first information. The network storage function entity is configured to receive, from the user plane entity, the first information and the S-NSSAI that is of the first network slice and that corresponds to the first information.

These aspects or other aspects in this application may be clearer and intelligible in descriptions in the following embodiments.

DESCRIPTION OF EMBODIMENTS

For ease of understanding of technical solutions in embodiments of this application, the following first briefly describes technologies related to this application.

NSSAI:

The NSSAI includes a plurality of pieces of S-NSSAI. The S-NSSAI includes a service type (SST) and a slice differentiator (SD). The SST includes a standardized type and an operator-customized type. The SD is optional information for supplementing the SST, and is used to distinguish between a plurality of network slices of a same SST. A type and a function of the NSSAI defined in the 23.501 standard are shown in Table 1.

TABLE 1

| Type | Function description |
| --- | --- |
| Configured NSSAI | NSSAI pre-configured on a terminal |
| S-NSSAI | Used to identify a particular network slice |
| Allowed NSSAI | NSSAI that is allowed to be used by a terminal in a current registration area network provided by a service network |

Figure 1:
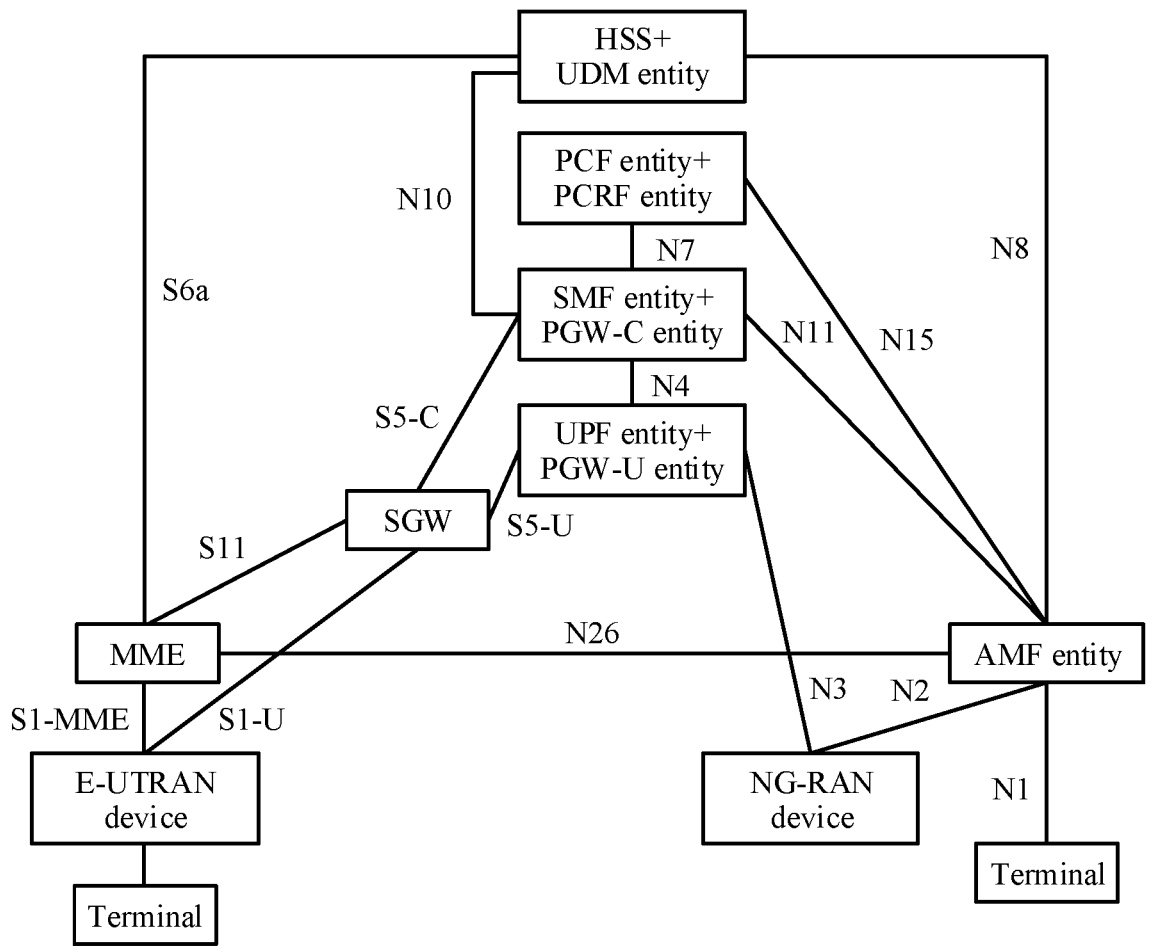
FIG. 1 is a schematic diagram of an existing interworking architecture of a 4G network and a 5G network.

Interworking architecture of a 4G network and a 5G network:

FIG. 1 is a schematic diagram of an existing interworking architecture of a 4G network and a 5G network. The 4G network and the 5G network share a user plane function (UPF) entity+a PDN gateway user plane function (PGW-U) entity, a session management function (SMF) entity+a PDN gateway control plane function (PGW-C) entity, a policy control function (PCF) entity+a policy and charging rules function (PCRF) entity, and a home subscriber server (HSS)+a unified data management (UDM) entity. Herein, "+" represents an integrated configuration. A UPF is a user plane function of the 5G network, and a PGW-U is a gateway user plane function that is of the 4G network and that corresponds to the UPF. An SMF is a session management function of the 5G network, and a PGW-C is a gateway control plane function that is of the 4G network and that corresponds to the SMF. A PCF is a policy control function of the 5G network, and a PCRF is a policy and charging rules function that is of the 4G network and that corresponds to the PCF. In the embodiments of this application, for ease of description, the HSS+the UDM entity is referred to as a user data management entity, the PGW-C entity+the SMF entity is referred to as a control plane function entity, and the UPF entity+the PGW-U entity is referred to as a user plane entity. This is centrally described herein, and will not be described below again. Certainly, the foregoing network devices obtained after the integrated configuration may also use other names. This is not specifically limited in the embodiments of this application.

In addition, as shown in FIG. 1, the foregoing interworking architecture of the 4G network and the 5G network may further include a mobility management entity (MME) and a serving gateway (SGW) in the 4G network, and an AMF entity in the 5G network.

A terminal accesses the 4G network through an evolved universal terrestrial radio access network (E-UTRAN) device, and the terminal accesses the 5G network through a next generation radio access network (NG-RAN) device. The E-UTRAN device communicates with the MME through an S1-MME interface. The E-UTRAN device communicates with the SGW through an S1-U interface. The MME communicates with the SGW through an S11 interface. The MME communicates with a user data management entity through an Sha interface. The MME communicates with the AMF entity through an N26 interface. The SGW communicates with the PGW-U entity+the UPF entity through an S5-U interface. The SGW communicates with the PGW-C entity+the SMF entity through an S5-C interface. The PGW-U entity+the UPF entity communicates with the NG-RAN device through an N3 interface. The PGW-U entity+the UPF entity communicates with the PGW-C entity+the SMF entity through an N4 interface. The PGW-C entity+the SMF entity communicates with the PCRF entity+ the PCF entity through an N7 interface. The HSS+the UDM entity communicates with the PGW-C entity+the SMF entity through an N10 interface. The HSS+the UDM entity communicates with the AMF entity through an N8 interface. The PCRF entity+the PCF entity communicates with the AMF entity through an N15 interface. The PGW-C entity+the SMF entity communicates with the AMF entity through an N11 interface. The AMF entity communicates with the NG-RAN device through an N2 interface. The AMF entity communicates with the terminal through an N1 interface.

It should be noted that the names of the interfaces between the network elements in FIG. 1 are only examples, and the names of the interfaces may be other names during specific implementation. This is not specifically limited in the embodiments of this application.

It should be noted that the NG-RAN device in the 5G network may also be referred to as an access device. The access device is a device that accesses a core network, and may be, for example, a base station, a broadband network gateway (BNG), an aggregation switch, or a non-3GPP access device. The base station may include various types of base stations, for example, a macro base station, a micro base station (also referred to as a small cell), a relay node, and an access point. This is not specifically limited in the embodiments of this application.

Certainly, the 4G network and the 5G network may further include other network elements. For example, the 4G network may further include a serving general packet radio system (GPRS) support node (SGSN), and the like, and the 5G network may further include an authentication server function (AUSF) entity, a network slice selection function (NSSF) entity, a network function repository function (NRF) network element, and the like. This is not specifically limited in the embodiments of this application.

APN:

When initiating a packet service, a terminal may provide an APN to an MME. The MME performs, based on the APN provided by the terminal, domain name resolution by using a domain name server (DNS), to obtain an internet protocol (IP) address of the PGW and connect a user to a PDN corresponding to the APN.

The following describes the technical solutions in the embodiments of this application with reference to the accompanying drawings in the embodiments of this application. In the descriptions of this application, unless otherwise specified, "plurality" means two or more than two. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of the network architecture and the emergence of new service scenarios, the technical solutions provided in the embodiments of this application are also applicable to similar technical problems.

Figure 2:
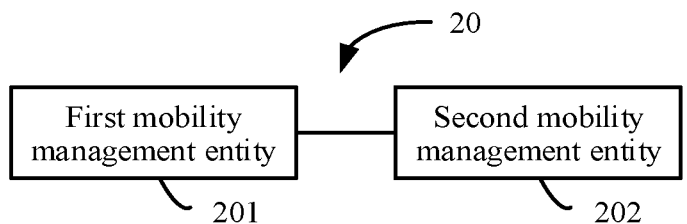
FIG. 2 is a schematic architectural diagram of a session establishment system according to an embodiment of this application.

FIG. 2 shows a session establishment system 20 according to an embodiment of this application. The session establishment system 20 includes a first mobility management entity 201 and a second mobility management entity 202.

The first mobility management entity 201 is configured to: obtain information about a PDN connection that has been established when a terminal accesses an EPC, obtain, based on the information about the PDN connection, S-NSSAI of a network slice corresponding to the PDN connection, and send, to the second mobility management entity 202, the S-NSSAI of the network slice corresponding to the PDN connection, where the S-NSSAI of the network slice corresponding to the PDN connection is used to indicate a network slice for establishing a PDU session.

The second mobility management entity 202 is configured to: receive, from the first mobility management entity 201, the S-NSSAI of the network slice corresponding to the PDN connection, and send a registration accept message to the terminal.

The second mobility management entity 202 is further configured to: after receiving a PDU session establishment request from the terminal, establish, based on the S-NSSAI of the network slice corresponding to the PDN connection, the PDU session in the network slice corresponding to the PDN connection.

Optionally, the first mobility management entity 201 and the second mobility management entity 202 in this embodiment of this application may directly communicate with each other, or may communicate with each other through forwarding by another device. This is not specifically limited in this embodiment of this application.

Optionally, in this embodiment of this application, the first mobility management entity 201 may also be referred to as an initial mobility management entity, and the second mobility management entity 202 may also be referred to as a target mobility management entity. This is centrally described herein, and will not be described below again.

Based on the session establishment system provided in this embodiment of this application, the first mobility management entity may obtain, based on the information about the PDN connection, the S-NSSAI of the network slice corresponding to the PDN connection, and send, to the second mobility management entity, the S-NSSAI of the network slice corresponding to the PDN connection. Therefore, the second mobility management entity may receive, from the first mobility management entity, the S-NSSAI of the network slice corresponding to the PDN connection, and after receiving the PDU session establishment request from the terminal, establish, based on the S-NSSAI of the network slice corresponding to the PDN connection, the PDU session in the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

Optionally, in the foregoing embodiment, an example in which the first mobility management entity 201 is different from the second mobility management entity 202 is used for description. Certainly, in the embodiments of this application, the first mobility management entity 201 may alternatively be the same as the second mobility management entity 202. In this case, the first mobility management entity 201 is configured to: obtain information about a PDN connection when a terminal accesses an EPC, and after obtaining, based on the information about the PDN connection, S-NSSAI of a network slice corresponding to the PDN connection, send a registration accept message to the terminal; and the first mobility management entity 201 is further configured to: after receiving a PDU session establishment request from the terminal, establish, based on the S-NSSAI of the network slice corresponding to the PDN connection, a PDU session in the network slice corresponding to the PDN connection.

According to the session establishment system provided in this embodiment of this application, the first mobility management entity may obtain, based on the information about the PDN connection, the S-NSSAI of the network slice corresponding to the PDN connection. Therefore, after receiving the PDU session establishment request from the terminal, the first mobility management entity may establish, based on the S-NSSAI of the network slice corresponding to the PDN connection, the PDU session in the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

Optionally, the session establishment system 20 may be applied to the interworking architecture of the 4G network and the 5G network shown in FIG. 1. In this case, the first mobility management entity 201 or the second mobility management entity 202 may correspond to the AMF entity in FIG. 1.

It should be noted that FIG. 1 merely shows an example of a connection manner of an AMF entity in the interworking architecture of the 4G network and the 5G network. When the first mobility management entity 201 and the second mobility management entity 202 are different mobility management entities, the first mobility management entity 201 and the second mobility management entity 202 respectively correspond to different AMF entities. For a connection manner of each AMF entity in the interworking architecture of the 4G network and the 5G network, refer to the AMF entity shown in FIG. 1. Details are not described herein again. In addition, different AMF entities may communicate with each other through an N14 interface. This is centrally described herein, and will not be described below again.

Figure 11:
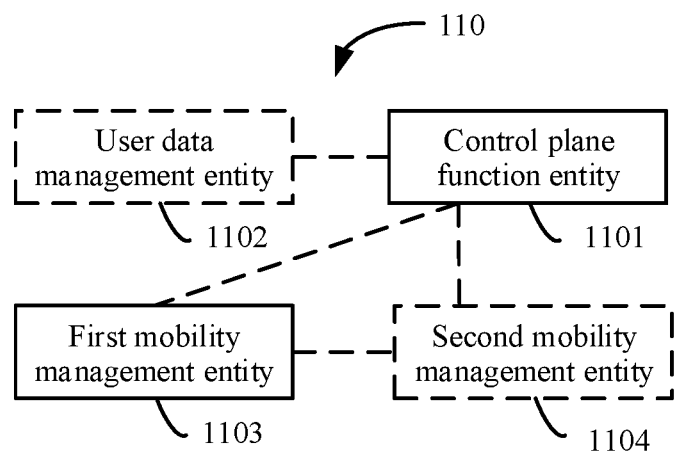
FIG. 11 is another schematic architectural diagram of a session establishment system according to an embodiment of this application.

FIG. 11 shows a session establishment system 110 according to an embodiment of this application. The session establishment system 110 includes a control plane function entity 1101 and a first mobility management entity 1103. Optionally, the session establishment system 110 may further include a user data management entity 1102 and a second mobility management entity 1104.

The control plane function entity 1101 is configured to: determine S-NSSAI of a network slice corresponding to a session, and store, to the user data management entity 1102, the S-NSSAI of the network slice corresponding to the session.

The first mobility management entity 1103 is configured to obtain, from the user data management entity 1102, the S-NSSAI of the network slice corresponding to the session, where the S-NSSAI of the network slice corresponding to the session is used to indicate a network slice for establishing a session.

Optionally, the first mobility management entity 1103 is further configured to send, to the second mobility management entity 1104, the S-NSSAI of the network slice corresponding to the session.

The second mobility management entity 1104 is configured to: receive, from the first mobility management entity 1103, the S-NSSAI of the network slice corresponding to the session, and establish, based on the S-NSSAI of the network slice corresponding to the session, a session in the network slice corresponding to the session.

Optionally, the first mobility management entity 1103 and the second mobility management entity 1104 in this embodiment of this application may directly communicate with each other, or may communicate with each other through forwarding by another device. This is not specifically limited in this embodiment of this application.

Optionally, in this embodiment of this application, the first mobility management entity 1103 may also be referred to as an initial mobility management entity, and the second mobility management entity 1104 may also be referred to as a target mobility management entity. This is centrally described herein, and will not be described below again.

Optionally, the session establishment system 110 provided in this embodiment of this application is not only applicable to a scenario in which the terminal is handed over from an EPC to a 5GC supporting a network slice, but also applicable to a scenario in which the terminal is handed over from a 5GC that does not support a network slice to a 5GC that supports a network slice. This is not specifically limited in this embodiment of this application. A session in the EPC includes a PDN connection; and a session in the 5GC includes a PDU session. This is centrally described herein, and will not be described below again.

It should be noted that session establishment in this embodiment of this application is specifically updating an existing session. This is centrally described herein, and will not be described below again.

Based on the session establishment system provided in this embodiment of this application, the first mobility management entity may obtain, from the user data management entity, the S-NSSAI of the network slice corresponding to the session, and send, to the second mobility management entity, the S-NSSAI of the network slice corresponding to the session. Therefore, the second mobility management entity may receive, from the first mobility management entity, the S-NSSAI of the network slice corresponding to the session, and establish, based on the S-NSSAI of the network slice corresponding to the session, a session in the network slice corresponding to the session. In other words, according to this solution, when the terminal is handed over from an EPC to a 5GC supporting a network slice, or when the terminal is handed over from a 5GC that does not support a network slice to a 5GC that supports a network slice, a session may be established in the network slice of the 5GC based on selected S-NSSAI.

Optionally, in the foregoing embodiment, an example in which the first mobility management entity 1103 is different from the second mobility management entity 1104 is used for description. Certainly, in the embodiments of this application, the first mobility management entity 1103 may alternatively be the same as the second mobility management entity 1104. In this case, the control plane function entity 1101 is configured to: determine S-NSSAI of a network slice corresponding to a session, and store, to the user data management entity 1102, the S-NSSAI of the network slice corresponding to the session; and the first mobility management entity 1103 is configured to: obtain, from the user data management entity 1102, the S-NSSAI of the network slice corresponding to the session, and establish, based on the S-NSSAI of the network slice corresponding to the session, a session in the network slice corresponding to the session.

According to the session establishment system provided in this embodiment of this application, the first mobility management entity may obtain, from the user data management entity, the S-NSSAI of the network slice corresponding to the session. Therefore, after receiving a session establishment request from the terminal, the first mobility management entity may establish, based on the S-NSSAI of the network slice corresponding to the session, a session in the network slice corresponding to the session. In other words, according to this solution, when the terminal is handed over from an EPC to a 5GC supporting a network slice, or when the terminal is handed over from a 5GC that does not support a network slice to a 5GC that supports a network slice, a session may be established in the network slice of the 5GC based on selected S-NSSAI.

Optionally, if the session establishment system 110 provided in this embodiment of this application is applied to the scenario in which the terminal is handed over from the EPC to the 5GC supporting the network slice, the session establishment system 110 may be applied to the interworking architecture of the 4G network and the 5G network shown in FIG. 1. In this case, the control plane function entity 1101 may correspond to the SMF entity+the PGW-C entity in FIG. 1, the user data management entity 1102 may correspond to the HSS entity+the UDM entity in FIG. 1, the first mobility management entity 1103 or the second mobility management entity 1104 may correspond to the AMF entity in FIG. 1. This is centrally described herein, and will not be described below again.

It should be noted that FIG. 11 merely shows an example of a connection manner of an AMF entity in the interworking architecture of the 4G network and the 5G network. When the first mobility management entity 1103 and the second mobility management entity 1104 are different mobility management entities, the first mobility management entity 1103 and the second mobility management entity 1104 respectively correspond to different AMF entities. For a connection manner of each AMF entity in the interworking architecture of the 4G network and the 5G network, refer to the AMF entity shown in FIG. 1. Details are not described herein again. In addition, different AMF entities may communicate with each other through an N14 interface. This is centrally described herein, and will not be described below again.

Optionally, if the session establishment system 110 provided in this embodiment of this application is applied to the scenario in which the terminal is handed over from the 5GC that does not support the network slice to the 5GC that supports the network slice, the control plane function entity 1101 may correspond to the SMF entity in the 5G network, the user data management entity 1102 may correspond to the UDM entity in the 5G network, and the first mobility management entity 1103 or the second mobility management entity 1104 may correspond to the AMF entity in the 5G network. This is centrally described herein, and will not be described below again.

Figure 14:
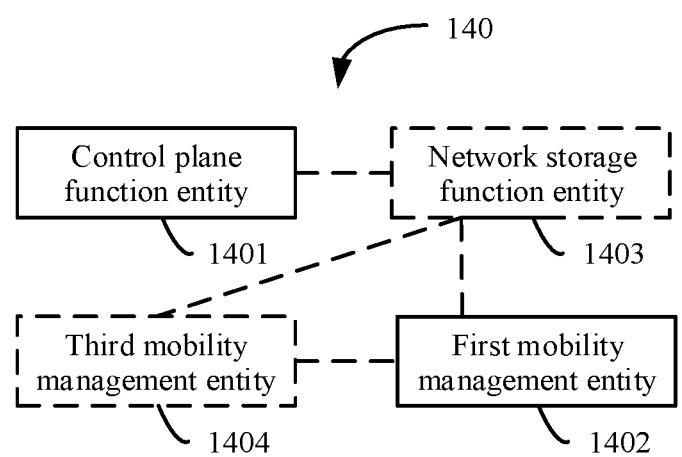
FIG. 14 is another schematic architectural diagram of a session establishment system according to an embodiment of this application.

FIG. 14 shows a session establishment system 140 according to an embodiment of this application. The session establishment system 140 includes a control plane function entity 1401 and a first mobility management entity 1402.

The control plane function entity 1401 is configured to obtain information about a PDN connection that has been established when a terminal accesses an EPC and S-NSSAI of a network slice corresponding to the PDN connection.

The control plane function entity 1401 is further configured to send, to a network storage function entity, the information about the PDN connection and the S-NSSAI of the network slice corresponding to the PDN connection.

The first mobility management entity 1402 is configured to: obtain the information about the PDN connection, and send the information about the PDN connection to the network storage function entity, where the information about the PDN connection is used to determine the S-NSSAI of the network slice corresponding to the PDN connection.

The first mobility management entity 1402 is further configured to receive, from the network storage function entity, the S-NSSAI of the network slice corresponding to the PDN connection.

It should be noted that session establishment in this embodiment of this application is specifically updating an existing session. This is centrally described herein, and will not be described below again.

According to the session establishment system provided in this embodiment of this application, a first AMF entity may obtain, based on the information about the PDN connection, the S-NSSAI of the network slice corresponding to the PDN connection. Therefore, after receiving a handover request from an MME, the first AMF entity may obtain information about a second AMF entity based on the S-NSSAI of the network slice corresponding to the PDN connection, and further, may establish a PDU session in the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

Optionally, as shown in FIG. 14, the session establishment system 140 in this embodiment of this application may further include the network storage function entity 1403.

The network storage function entity 1403 is configured to receive, from the control plane function entity 1401, and store the information about the PDN connection and the S-NSSAI of the network slice corresponding to the PDN connection.

The network storage function entity 1403 is further configured to: receive the information about the PDN connection from the first mobility management entity, and after determining, based on the information about the PDN connection, the stored information about the PDN connection, and the S-NSSAI of the network slice corresponding to the PDN connection, the S-NSSAI of the network slice corresponding to the PDN connection, send, to the first mobility management entity 1402, the S-NSSAI of the network slice corresponding to the PDN connection.

Optionally, the control plane function entity 1401 and the network storage function entity 1403 in this embodiment of this application may directly communicate with each other, or may communicate with each other through forwarding by another device. This is not specifically limited in this embodiment of this application.

Optionally, the first mobility management entity 1402 and the network storage function entity 1403 in this embodiment of this application may directly communicate with each other, or may communicate with each other through forwarding by another device. This is not specifically limited in this embodiment of this application.

Optionally, as shown in FIG. 14, the session establishment system 140 in this embodiment of this application may further include a third mobility management entity 1404 in the EPC.

The control plane function entity 1401 is further configured to send the information about the PDN connection to the third mobility management entity 1404.

The third mobility management entity 1404 is configured to: receive the information about the PDN connection from the control plane function entity 1401, and send the information about the PDN connection to the first mobility management entity.

Correspondingly, that the first mobility management entity 1402 is configured to obtain the information about the PDN connection includes: receiving the information about the PDN connection from the third mobility management entity.

Optionally, the control plane function entity 1401 and the third mobility management entity 1404 in this embodiment of this application may directly communicate with each other, or may communicate with each other through forwarding by another device. This is not specifically limited in this embodiment of this application.

Optionally, the first mobility management entity 1402 and the third mobility management entity 1404 in this embodiment of this application may directly communicate with each other, or may communicate with each other through forwarding by another device. This is not specifically limited in this embodiment of this application.

According to this solution, when the terminal is handed over from an EPC supporting a DCN to a 5GC supporting a network slice, the first mobility management entity may obtain the information about the PDN connection.

Optionally, if the session establishment system 140 provided in this embodiment of this application is applied to the scenario in which the terminal is handed over from the EPC supporting the DCN to the 5GC supporting the network slice, the control plane function entity 1401 may correspond to the SMF entity+the PGW-C entity in the interworking architecture of the 4G network and the 5G network shown in FIG. 1, the first mobility management entity may correspond to the AMF entity in the interworking architecture of the 4G network and the 5G network shown in FIG. 1, and the network storage function entity 1403 may correspond to an NRF entity (now shown) in the 5G network. This is centrally described herein, and will not be described below again.

Figure 18:
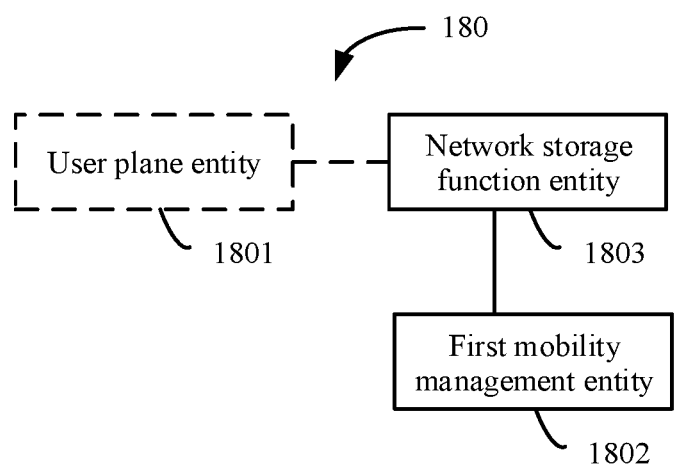
FIG. 18 is another schematic architectural diagram of a session establishment system according to an embodiment of this application.

FIG. 18 shows a session establishment system 180 according to an embodiment of this application. The session establishment system 180 includes a network storage function entity 1803 and a first mobility management entity 1802.

The first mobility management entity 1802 is configured to send, to the network storage function entity 1803, first information of a user plane entity corresponding to a PDN connection. The network storage function entity 1803 is configured to receive the first information from the first mobility management entity 1801. The network storage function entity 1803 is further configured to: determine, based on the first information, S-NSSAI of a first network slice corresponding to the PDN connection, and send the S-NSSAI of the first network slice to the first mobility management entity 1802. The first mobility management entity 1802 is further configured to receive the S-NSSAI of the first network slice from the network storage function entity 1803.

According to the session establishment system provided in this embodiment of this application, a first AMF entity may obtain, based on the first information of the user plane entity corresponding to the PDN connection, the S-NSSAI of the first network slice corresponding to the PDN connection. Therefore, after receiving a request message (for example, a handover request or a registration request) from an MME, the first AMF entity may obtain information about a second AMF entity based on the S-NSSAI of the first network slice corresponding to the PDN connection, and further may establish a PDU session in the corresponding first network slice. In other words, according to this solution, when a terminal is handed over from an EPC supporting a DCN to a 5GC supporting a network slice, a PDU session may be established in the network slice of the 5GC based on selected S-NSSAI.

Optionally, as shown in FIG. 18, the session establishment system 180 in this embodiment of this application may further include the user plane entity 1801. The user plane entity 1801 is configured to send, to the network storage function entity 1803, the first information and the S-NSSAI that is of the first network slice and that corresponds to the first information. The network storage function entity 1803 is configured to receive, from the user plane entity 1801, the first information and the S-NSSAI that is of the first network slice and that corresponds to the first information.

Optionally, the user plane entity 1801 and the network storage function entity 1803 in this embodiment of this application may directly communicate with each other, or may communicate with each other through forwarding by another device. This is not specifically limited in this embodiment of this application.

Optionally, the first mobility management entity 1802 and the network storage function entity 1803 in this embodiment of this application may directly communicate with each other, or may communicate with each other through forwarding by another device. This is not specifically limited in this embodiment of this application.

Optionally, the terminal in the embodiments of this application may include various handheld devices, vehicle-mounted devices, wearable devices, or computing devices that have a wireless communication function, or other processing devices connected to a wireless modem. The terminal device may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (MS), a terminal device, and the like. For ease of description, the devices mentioned above are collectively referred to as a terminal in this application.

Optionally, the first mobility management entity 201 or the second mobility management entity 202 in FIG. 2, or the control plane function entity 1401 or the network storage function entity 1403 in FIG. 14, or the user plane entity 1801, the first mobility management entity 1802, or the network storage function entity 1803 in FIG. 18 may be implemented by one physical device, may be jointly implemented by a plurality of physical devices, or may be a logical function module in one physical device. This is not specifically limited in the embodiments of this application.

Figure 3:
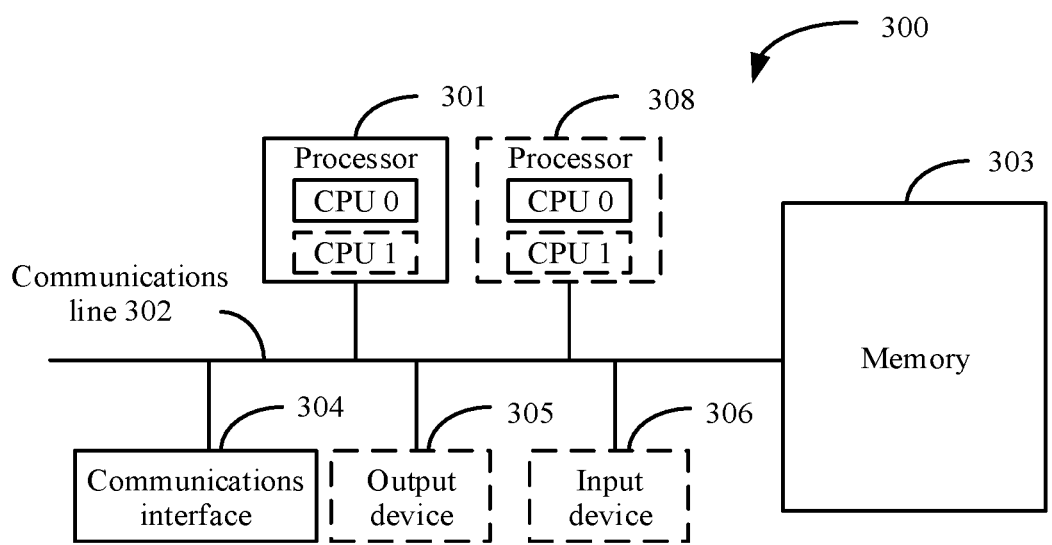
FIG. 3 is a schematic diagram of a hardware structure of a communications device according to an embodiment of this application.

For example, the first mobility management entity 201 or the second mobility management entity 202 in FIG. 2, or the control plane function entity 1401 or the network storage function entity 1403 in FIG. 14, or the user plane entity 1801, the first mobility management entity 1802, or the network storage function entity 1803 in FIG. 18 may be implemented by using a communications device in FIG. 3. FIG. 3 is a schematic diagram of a hardware structure of the communications device according to an embodiment of this application. The communications device 300 includes at least one processor 301, a communications line 302, a memory 303, and at least one communications interface 304.

The processor 301 may be a central processing unit (CPU), a microprocessor, an application-specific integrated circuit (ASIC), or one or more integrated circuits for controlling program execution in the solutions of this application.

The communications line 302 may include a path transmitting information between the foregoing components.

The communications interface 304, which uses any apparatus such as a transceiver, is configured to communicate with another device or a communications network, such as Ethernet, a radio access network (RAN), or a wireless local area network (WLAN).

The memory 303 may be a read-only memory (ROM) or another type of static storage device that is capable of storing static information and a static instruction, or a random access memory (RAM) or another type of dynamic storage device that is capable of storing information and an instruction, or may be an electrically erasable programmable read-only memory (EEPROM), a compact disc read-only memory (CD-ROM), or other compact disc storage, optical disc storage (which includes a compact disc, a laser disc, an optical disc, a digital versatile disc, a Blu-ray disc, and the like), a disk storage medium or another magnetic storage device, or any other medium that can be used to carry or store expected program code having an instruction or a data structure form and that can be accessed by a computer. However, this is not limited herein. The memory may exist independently, or may be connected to the processor by using the communications line 302. Alternatively, the memory may be integrated into the processor.

The memory 303 is configured to store a computer-executable instruction for executing the solutions of this application, and the processor 301 controls the execution. The processor 301 is configured to execute the computer-executable instruction stored in the memory 303, to implement session establishment methods provided in the following embodiments of this application.

Optionally, the computer-executable instruction in this embodiment of this application may also be referred to as application program code. This is not specifically limited in this embodiment of this application.

During specific implementation, in one embodiment, the processor 301 may include one or more CPUs, for example, a CPU 0 and a CPU 1 in FIG. 3.

During specific implementation, in one embodiment, the communications device 300 may include a plurality of processors, such as a processor 301 and a processor 308 in FIG. 3. Each of the processors may be a single-core (single-CPU) processor or a multi-core (multi-CPU) processor. The processor herein may be one or more devices, circuits, and/or processing cores configured to process data (for example, a computer program instruction).

During specific implementation, in one embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, or a projector. The input device 306 communicates with the processor 301, and may receive inputs from a user in a plurality of manners. For example, the input device 306 may be a mouse cursor, a keyboard, a touchscreen device, or a sensing device.

The communications device 300 may be a general-purpose device or a dedicated device. During specific implementation, the communications device 300 may be a desktop computer, a portable computer, a network server, a palmtop computer (PDA), a mobile phone, a tablet computer, a wireless terminal device, an embedded device, or a device with a structure similar to that in FIG. 3. A type of the communications device 300 is not limited in this embodiment of this application.

The following describes in detail the session establishment method provided in the embodiments of this application with reference to FIG. 1 to FIG. 3, FIG. 11, FIG. 14, and FIG. 18.

Figure 4:
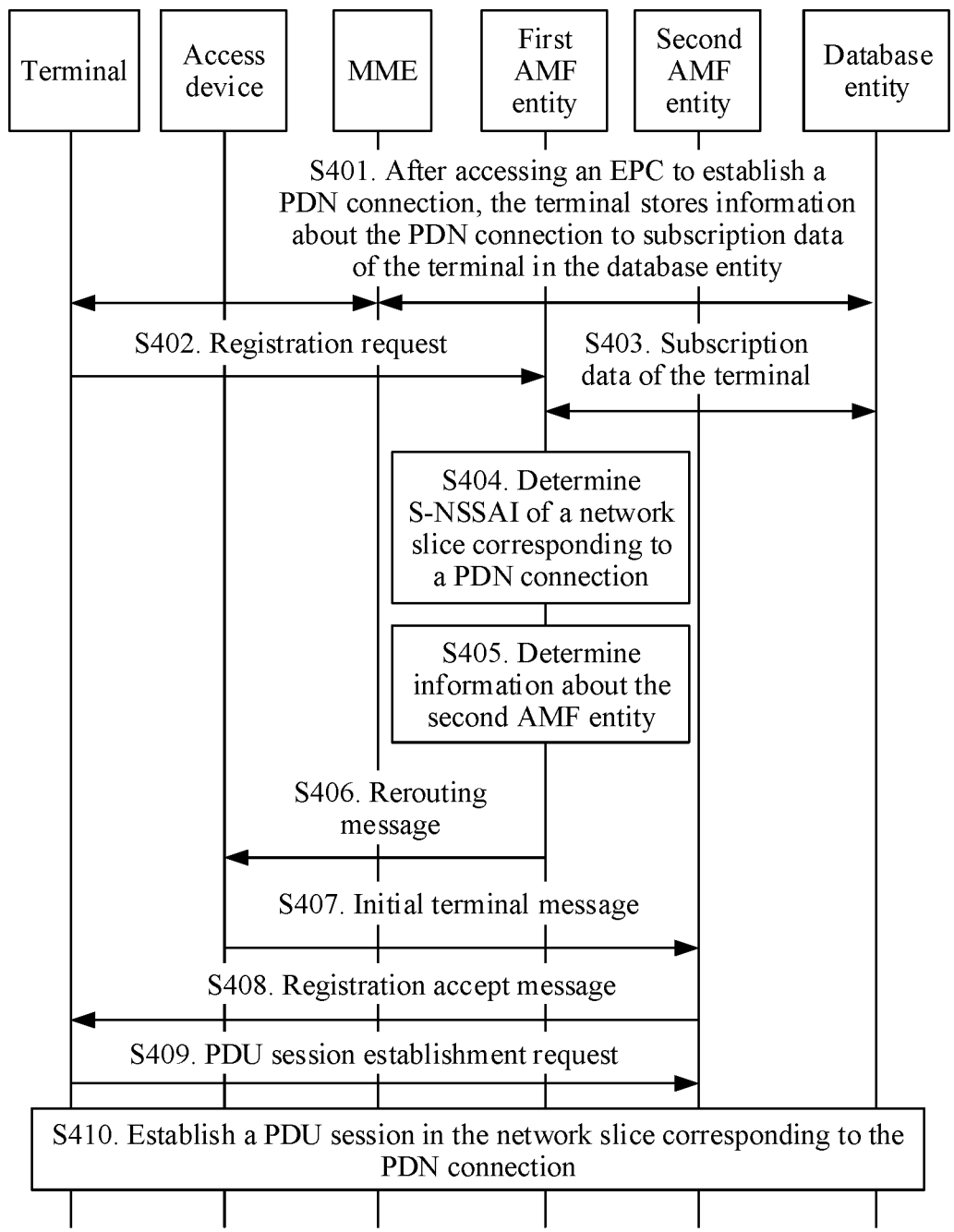
FIG. 4 is a first schematic flowchart of a session establishment method according to an embodiment of this application.

For example, a session establishment system shown in FIG. 2 is applied to the interworking architecture of the 4G network and the 5G network shown in FIG. 1. FIG. 4 shows a session establishment method according to an embodiment of this application. The method includes the following steps.

S401. After accessing an EPC to establish a PDN connection, a terminal stores information about the PDN connection to subscription data of the terminal in a user data management entity.

For related implementation of step S401, refer to an implementation in the existing technology. Details are not described herein.

Optionally, in this embodiment of this application, the information about the PDN connection may be an APN corresponding to the PDN connection or information about a control plane function entity (namely, an SMF entity+a PGW-C entity) corresponding to the PDN connection. This is not specifically limited in this embodiment of this application. For example, the information about the control plane function entity corresponding to the PDN connection may include an IP address, a fully qualified domain name (FQDN), or the like of the control plane function entity. This is not specifically limited in this embodiment of this application.

Optionally, the PDN connection in this embodiment of this application may be a PDN connection established in a DCN selected for the terminal when the terminal accesses the EPC, or may be a PDN connection established not in a DCN. This is not specifically limited in this embodiment of this application.

If the PDN connection in this embodiment of this application is a PDN connection established in the DCN selected for the terminal when the terminal accesses the EPC, an MME may further send information about the DCN to the terminal. This is not specifically limited in this embodiment of this application.

S402. The terminal sends a registration request to a first AMF entity, so that the first AMF entity receives the registration request from the terminal. The registration request carries an identifier of the terminal.

Optionally, the registration request may further carry NSSAI requested by the terminal (also referred to as requested NSSAI), the information about the DCN, location information of the terminal, and the like. This is not specifically limited in this embodiment of this application.

S403. The first AMF entity obtains the subscription data of the terminal from the user data management entity based on the identifier of the terminal, where the subscription data includes the information about the PDN connection established when the terminal accesses the EPC.

In addition, subscription data related to a network slice in the 5G network is different from subscription data in the 4G network, and a subscribed network slice in the 5G network cannot be directly mapped from the information about the DCN. Therefore, the subscription data of the terminal that is obtained by the first AMF entity from the user data management entity may further include one or more pieces of subscribed S-NSSAI(s). This is not specifically limited in this embodiment of this application.

Optionally, in this embodiment of this application, the subscription data of the terminal may be carried in an Nudm message sent by the user data management entity to the first AMF entity. Nudm is a service-oriented interface of a UDM entity. The Nudm message is Nudm subscriber data management in an existing protocol, and has the following functions: if necessary, allowing a network function (NF) consumer to retrieve the subscription data of the terminal, and providing updated subscription data of the terminal for a subscribed NF consumer.

S404. The first AMF entity obtains, based on the information about the PDN connection, S-NSSAI of a network slice corresponding to the PDN connection.

Optionally, in a possible implementation, the information about the PDN connection includes the APN corresponding to the PDN connection; and that the first AMF entity obtains, based on the information about the PDN connection, S-NSSAI of a network slice corresponding to the PDN connection includes: determining, by the first AMF entity, based on the APN and a pre-configured correspondence between an APN and S-NSSAI, the S-NSSAI of the network slice corresponding to the PDN connection. The pre-configured correspondence between an APN and S-NSSAI includes a one-to-one relationship between an APN and S-NSSAI or a one-to-many relationship between an APN and S-NSSAI.

When the pre-configured correspondence between an APN and S-NSSAI includes the one-to-one relationship between an APN and S-NSSAI, the first AMF entity may determine, based on the APN and the pre-configured one-to-one relationship between an APN and S-NSSAI, the S-NSSAI of the network slice corresponding to the PDN connection.

For example, it is assumed that the pre-configured one-to-one relationship between an APN and S-NSSAI is shown in Table 2:

TABLE 2

| APN | S-NSSAI |
|---|---|
| APN 1 | S-NSSAI 1 |
| APN 2 | S-NSSAI 2 |
| APN 3 | S-NSSAI 3 |
| ... | ... |

If the APN corresponding to the PDN connection is the APN 3, the first AMF entity may determine, based on the APN and a pre-configured one-to-one relationship between an APN and S-NSSAI, that the S-NSSAI of the network slice corresponding to the PDN connection is the S-NSSAI 3.

When the pre-configured correspondence between an APN and S-NSSAI includes the one-to-many relationship between an APN and S-NSSAI, the first AMF entity determines the S-NSSAI of the network slice corresponding to the PDN connection based on the APN, the pre-configured one-to-many relationship between an APN and S-NSSAI, and at least one of the following information in the pre-configured one-to-many relationship between an APN and S-NSSAI: a priority of each piece of S-NSSAI, load information of a network slice indicated by each piece of S-NSSAI, and NSSAI supported by an AMF set configured in the first AMF entity.

For example, it is assumed that the pre-configured one-to-many relationship between an APN and S-NSSAI is shown in Table 3:

TABLE 3

| APN | S-NSSAI |
|---|---|
| APN 1 | S-NSSAI 1, S-NSSAI 2, and S-NSSAI 3 |
| APN 2 | S-NSSAI 4, S-NSSAI 5, and S-NSSAI 6 |
| APN 3 | S-NSSAI 7, S-NSSAI 8, and S-NSSAI 9 |
| ... | ... |

If the APN corresponding to the PDN connection is the APN 3, first, the first AMF entity may determine, based on the APN and the pre-configured one-to-many relationship between an APN and S-NSSAI, S-NSSAI of three network slices: the S-NSSAI 7, the S-NSSAI 8, and the S-NSSAI 9; and then, the first AMF entity may determine, based on pre-configured priorities of the S-NSSAI 7, the S-NSSAI 8, and the S-NSSAI 9, the S-NSSAI of the network slice corresponding to the PDN connection. For example, if the priority of the S-NSSAI 7 is higher than the priority of the S-NSSAI 8, and the priority of the S-NSSAI 8 is higher than the priority of the S-NSSAI 9, the first AMF entity may determine that the S-NSSAI of the network slice corresponding to the PDN connection is the S-NSSAI 7.

Alternatively, the first AMF entity may determine, based on pre-configured load information of network slices indicated by the S-NSSAI 7, the S-NSSAI 8, and the S-NSSAI 9, the S-NSSAI of the network slice corresponding to the PDN connection. For example, if load of the network slice indicated by the S-NSSAI 7 is higher than load of the network slice indicated by the S-NSSAI 8, and the load of the network slice indicated by the S-NSSAI 8 is higher than load of the network slice indicated by the S-NSSAI 9, the first AMF entity may determine that the S-NSSAI of the network slice corresponding to the PDN connection is the S-NSSAI 9.

Alternatively, the first AMF entity may determine, based on the NSSAI supported by the AMF set configured in the first AMF entity, the S-NSSAI of the network slice corresponding to the PDN connection. For example, if the NSSAI supported by the AMF set configured in the first AMF entity includes the S-NSSAI 3, the S-NSSAI 5, and the S-NSSAI 8, the first AMF entity may determine that the S-NSSAI of the network slice corresponding to the PDN connection is the S-NSSAI 8.

Alternatively, the first AMF entity may determine, based on pre-configured priorities of the S-NSSAI 7, the S-NSSAI 8, and the S-NSSAI 9, and load information of network slices indicated by the S-NSSAI 7, the S-NSSAI 8, and the S-NSSAI 9, the S-NSSAI of the network slice corresponding to the PDN connection. For example, if the priority of the S-NSSAI 7 is higher than the priority of the S-NSSAI 8, the priority of the S-NSSAI 8 is higher than the priority of the S-NSSAI 9, load of the network slice indicated by the S-NSSAI 7 is higher than load of the network slice indicated by the S-NSSAI 8, and the load of the network slice indicated by the S-NSSAI 8 is higher than load of the network slice indicated by the S-NSSAI 9, the first AMF entity may determine that the S-NSSAI of the network slice corresponding to the PDN connection is the S-NSSAI 8.

Alternatively, the first AMF entity may determine, based on pre-configured priorities of the S-NSSAI 7, the S-NSSAI 8, and the S-NSSAI 9, and the NSSAI supported by the AMF set configured in the first AMF entity, the S-NSSAI of the network slice corresponding to the PDN connection. For example, if the priority of the S-NSSAI 7 is equal to the priority of the S-NSSAI 8, the priority of the S-NSSAI 8 is higher than the priority of the S-NSSAI 9, and the NSSAI supported by the AMF set configured in the first AMF entity includes the S-NSSAI 3, the S-NSSAI 5, and the S-NSSAI 8, the first AMF entity may determine that the S-NSSAI of the network slice corresponding to the PDN connection is the S-NSSAI 8.

Alternatively, the first AMF entity may determine, based on load information of network slices indicated by the S-NSSAI 7, the S-NSSAI 8, and the S-NSSAI 9, and the NSSAI supported by the AMF set configured in the first AMF entity, the S-NSSAI of the network slice corresponding to the PDN connection. For example, if load of the network slice indicated by the S-NSSAI 7 is higher than load of the network slice indicated by the S-NSSAI 8, the load of the network slice indicated by the S-NSSAI 8 is higher than load of the network slice indicated by the S-NSSAI 9, and the NSSAI supported by the AMF set configured in the first AMF entity includes the S-NSSAI 3, the S-NSSAI 8, and the S-NSSAI 9, the first AMF entity may determine that the S-NSSAI of the network slice corresponding to the PDN connection is the S-NSSAI 9.

Alternatively, the first AMF entity may determine, based on pre-configured priorities of the S-NSSAI 7, the S-NSSAI 8, and the S-NSSAI 9, load information of network slices indicated by the S-NSSAI 7, the S-NSSAI 8, and the S-NSSAI 9, and the NSSAI supported by the AMF set configured in the first AMF entity, the S-NSSAI of the network slice corresponding to the PDN connection. For example, if the priority of the S-NSSAI 7 is equal to the priority of the S-NSSAI 8, the priority of the S-NSSAI 8 is higher than the priority of the S-NSSAI 9, load of the network slice indicated by the S-NSSAI 7 is higher than load of the network slice indicated by the S-NSSAI 8, and the NSSAI supported by the AMF set configured in the first AMF entity includes the S-NSSAI 3, the S-NSSAI 5, and the S-NSSAI 8, the first AMF entity may determine that the S-NSSAI of the network slice corresponding to the PDN connection is the S-NSSAI 8.

Certainly, the first AMF entity may alternatively determine, with reference to other information, the S-NSSAI of the network slice corresponding to the PDN connection. For example, when determining the S-NSSAI of the network slice corresponding to the PDN connection, the first AMF entity may alternatively refer to the information about the DCN. For example, a terminal usage type in the information about the DCN may be mapped to an SST in the S-NSSAI of the network slice, to determine the S-NSSAI of the network slice corresponding to the PDN connection. This is not specifically limited in this embodiment of this application.

Optionally, in another possible implementation, the information about the PDN connection includes the information about the control plane function entity (namely, an SMF entity+a PGW-C entity) corresponding to the PDN connection. Because the SMF entity+the PGW-C entity is located in the network slice, that the first AMF entity obtains, based on the information about the PDN connection, S-NSSAI of a network slice corresponding to the PDN connection includes: determining, by the first AMF entity based on the information about the control plane function entity, the S-NSSAI of the network slice corresponding to the PDN connection.

For example, if the information about the control plane function entity includes an FQDN of the SMF entity+the PGW-C entity, because the FQDN includes information about the network slice, the S-NSSAI corresponding to the network slice may be determined based on the FQDN.

Alternatively, for example, if the information about the control plane function entity includes an IP address of the SMF entity+the PGW-C entity, the first AMF entity may query a DNS in a reverse manner based on the IP address, to obtain an FQDN of the SMF entity+the PGW-C entity. Because the FQDN includes information about the network slice, the S-NSSAI corresponding to the network slice may be determined based on the FQDN.

Certainly, if the network slice cannot be directly determined based on the FQDN of the SMF entity+the PGW-C entity, the first AMF entity further needs to determine, based on configuration information, the S-NSSAI corresponding to the network device, where the configuration information includes a correspondence between an IP address segment and a network slice, and the like. This is not specifically limited in this embodiment of this application.

Optionally, in another possible implementation, the information about the PDN connection includes the information about the control plane function entity (namely, the SMF entity+the PGW-C entity) corresponding to the PDN connection. Because the SMF entity+the PGW-C entity is located in the network slice, that the first AMF entity obtains, based on the information about the PDN connection, S-NSSAI of a network slice corresponding to the PDN connection includes: sending, by the first AMF entity, a request message to the control plane function entity based on the information about the control plane function entity, where the request message is used to request to obtain the S-NSSAI of the network slice corresponding to the PDN connection; and receiving, by the first AMF entity from the control plane function entity, the S-NSSAI of the network slice corresponding to the PDN connection.

It should be noted that this embodiment of this application merely provides several specific implementations of obtaining the S-NSSAI of the network slice corresponding to the PDN connection. Certainly, the S-NSSAI of the network slice corresponding to the PDN connection may alternatively be obtained in another manner. A manner of obtaining the S-NSSAI of the network slice corresponding to the PDN connection is not specifically limited in this embodiment of this application.

S405. The first AMF entity obtains information about a second AMF entity.

Optionally, that the first AMF entity obtains information about a second AMF entity may specifically include: obtaining, by the first AMF entity, the information about the second AMF entity based on the S-NSSAI of the network slice corresponding to the PDN connection.

In a possible implementation, considering that one network slice may include one or more network slice instances, the determining, by the first AMF entity, the information about the second AMF entity based on the S-NSSAI of the network slice corresponding to the PDN connection may specifically include: determining, by the first AMF entity based on the information about the PDN connection, a network slice instance corresponding to the PDN connection; and determining, by the first AMF entity, information about a second mobility management entity based on the S-NSSAI of the network slice corresponding to the PDN connection and information about the network slice instance.

Certainly, the first AMF entity may further determine the information about the second mobility management entity with reference to other information. For example, the first AMF entity may further determine the information about the second AMF entity based on mapping information that is between a network slice and an AMF entity set and that is configured in the first AMF entity, mapping information that is between a DCN and an AMF entity set and that is configured in the first AMF entity, NSSAI requested by the terminal, subscribed NSSAI of the terminal, location information of the terminal, or the like. For details, refer to an existing implementation. Details are not described herein.

Alternatively, in a possible implementation, the obtaining, by the first AMF entity, the information about the second AMF entity based on the S-NSSAI of the network slice corresponding to the PDN connection includes: sending, by the first AMF entity to an NSSF entity, the S-NSSAI of the network slice corresponding to the PDN connection, where the S-NSSAI of the network slice corresponding to the PDN connection is used to determine the information about the second AMF entity; and receiving, by the first AMF entity, the information about the second AMF entity from the NSSF entity. For a specific manner in which the NSSF entity determines the information about the second AMF entity based on the S-NSSAI of the network slice corresponding to the PDN connection, refer to the foregoing specific manner in which the first AMF entity determines the information about the second AMF entity based on the S-NSSAI of the network slice corresponding to the PDN connection. Details are not described herein again.

Optionally, in this embodiment of this application, the first AMF entity may obtain the information about the second AMF entity after determining that the first AMF entity cannot serve the network slice corresponding to the PDN connection. In this case, the second AMF entity is different from the first AMF entity. Alternatively, the first AMF entity may directly obtain the information about the second AMF entity. In this case, the second AMF entity and the first AMF entity may be the same or may be different. This is not specifically limited in this embodiment of this application.

Certainly, if the first AMF entity determines that the first AMF entity can serve the network slice corresponding to the PDN connection, the first AMF entity does not need to obtain the information about the second AMF entity. This is centrally described herein, and will not be described below again.

Assuming that the first AMF entity is different from the second AMF entity, the session establishment method provided in this embodiment of this application further includes the following steps.

S406. The first AMF entity sends a rerouting message to an access device, so that the access device receives the rerouting message from the first AMF entity. The rerouting message carries the information about the second AMF entity and the S-NSSAI of the network slice corresponding to the PDN connection, the information about the second AMF entity is used to instruct to reroute a message related to the terminal to the second AMF entity, and the S-NSSAI of the network slice corresponding to the PDN connection is used to indicate a network slice for establishing a PDU session.

S407. The access device sends an initial terminal message to the second AMF entity, so that the second AMF entity receives the initial terminal message from the access device. The initial terminal message carries the S-NSSAI of the network slice corresponding to the PDN connection.

Optionally, in this embodiment of this application, after performing step S405, the first AMF entity may alternatively directly send, to the second AMF entity, the S-NSSAI of the network slice corresponding to the PDN connection, and a rerouting process of steps S406 and S407 does not need to be performed. This is not specifically limited in this embodiment of this application.

S408. The second AMF entity sends a registration accept message to the terminal, so that the terminal receives the registration accept message from the second AMF entity. The registration accept message carries the S-NSSAI of the network slice corresponding to the PDN connection.

Optionally, the registration accept message may further carry allowed NSSAI in a registration area. This is not specifically limited in this embodiment of this application.

S409. The terminal sends a PDU session establishment request to the second AMF entity, so that the second AMF entity receives the PDU session establishment request from the terminal. The PDU session establishment request carries the S-NSSAI of the network slice corresponding to the PDN connection.

S410. The second AMF entity establishes, based on the S-NSSAI of the network slice corresponding to the PDN connection, the PDU session in the network slice corresponding to the PDN connection.

That the second AMF entity establishes the PDU session in the network slice corresponding to the PDN connection in step S410 specifically means that the second AMF entity coordinates with the terminal or another network element to establish the PDU session in the network slice corresponding to the PDN connection. For a process of establishing the PDU session, refer to an existing procedure. Details are not described herein.

Optionally, the registration accept message in step S408 in this embodiment of this application may further carry information about a PDN connection allowed to be handed over. In this way, after receiving the registration accept message, the terminal may further release, based on the information about the PDN connection allowed to be handed over, all PDN connections, in the EPC, other than the PDN connection allowed to be handed over, so that a system resource can be saved.

Alternatively, optionally, the registration accept message in step S408 in this embodiment of this application may further carry information about a PDN connection that needs to be deleted. In this way, after receiving the registration accept message, the terminal may further release a corresponding PDN connection in the EPC based on the information about the PDN connection that needs to be deleted, so that a system resource can be saved.

Based on the session establishment method provided in this embodiment of this application, the first AMF entity may obtain, based on the information about the PDN connection, the S-NSSAI of the network slice corresponding to the PDN connection, and send, to the second AMF entity, the S-NSSAI of the network slice corresponding to the PDN connection. Therefore, the second AMF entity may receive, from the first AMF entity, the S-NSSAI of the network slice corresponding to the PDN connection, and after receiving the PDU session establishment request from the terminal, establish, based on the S-NSSAI of the network slice corresponding to the PDN connection, the PDU session in the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

The actions of the first AMF entity and the second AMF entity in steps S401 to S410 may be performed by the processor 301 in the communications device 300 shown in FIG. 3 by invoking the application program code stored in the memory 303. This is not limited in this embodiment of this application.

Figure 5:
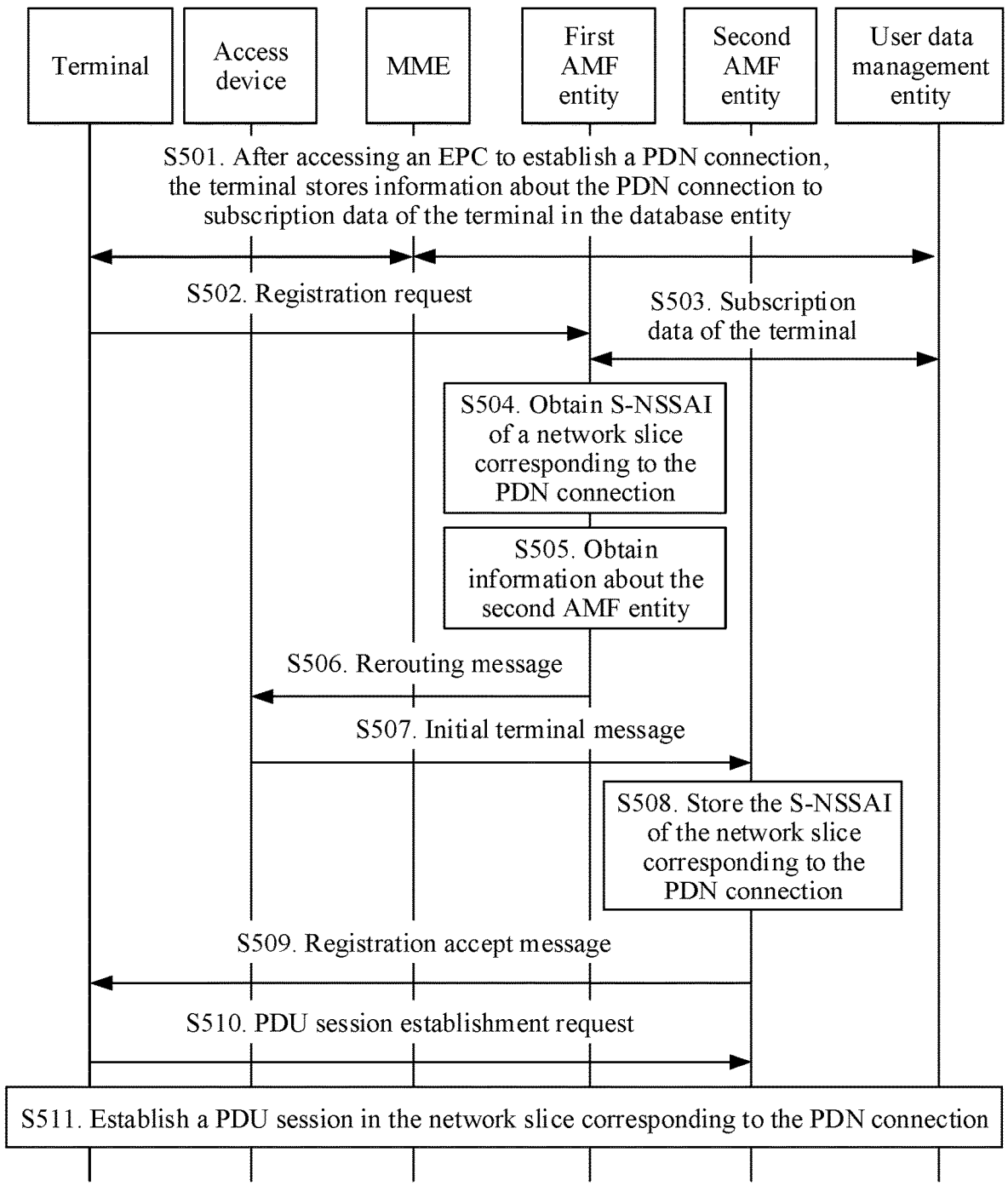
FIG. 5 is a second schematic flowchart of a session establishment method according to an embodiment of this application.

Optionally, for example, the session establishment system shown in FIG. 2 is applied to the interworking architecture of the 4G network and the 5G network shown in FIG. 1. FIG. 5 shows a session establishment method according to an embodiment of this application. The method includes the following steps.

S501 to S507 are similar to steps S401 to S407. For details, refer to the embodiment shown in FIG. 4. Details are not described herein again.

S508. A second AMF entity stores S-NSSAI of a network slice corresponding to a PDN connection.

S509. The second AMF entity sends a registration accept message to a terminal, so that the terminal receives the registration accept message from the second AMF entity. The registration accept message carries allowed NSSAI in a registration area.

S510. The terminal sends a PDU session establishment request to the second AMF entity, so that the second AMF entity receives the PDU session establishment request from the terminal. The PDU session establishment request carries S-NSSAI that is of a network slice and that is requested by the terminal and an APN that corresponds to a PDN connection and that is requested by the terminal.

The S-NSSAI that is of the network slice and that is requested by the terminal is selected by the terminal from the allowed NSSAI in the registration area that is sent by the second AMF entity to the terminal. For details, refer to an existing implementation. Details are not described herein.

S511. When the S-NSSAI that is of the network slice and that is requested by the terminal is the same as pre-stored S-NSSAI of the network slice corresponding to the PDN connection, and the APN that corresponds to the PDN connection and that is requested by the terminal is the same as an APN corresponding to the PDN connection, the second AMF entity establishes, based on the S-NSSAI of the network slice corresponding to the PDN connection, a PDU session in the network slice corresponding to the PDN connection.

That the second AMF entity establishes a PDU session in the network slice corresponding to the PDN connection in step S511 specifically means that the second AMF entity coordinates with the terminal or another network element to establish the PDU session in the network slice corresponding to the PDN connection. For a process of establishing the PDU session, refer to an existing procedure. Details are not described herein.

Optionally, when the S-NSSAI that is of the network slice and that is requested by the terminal is different from the pre-stored S-NSSAI of the network slice corresponding to the PDN connection, the second AMF entity may reject the PDU session establishment request. This is not specifically limited in this embodiment of this application.

Optionally, in this embodiment of this application, the PDU session establishment request in step S510 may carry information about the PDN connection instead of the S-NSSAI that is of the network slice and that is requested by the terminal. Further, after receiving the PDU session establishment request from the terminal, the second AMF entity may establish, based on the S-NSSAI of the network slice corresponding to the PDN connection, the PDU session in the network slice corresponding to the PDN connection. This is not specifically limited in this embodiment of this application.

According to the session establishment method provided in this embodiment of this application, when the terminal is handed over from an EPC supporting a DCN to a 5GC supporting a network slice, a PDU session may be established in the network slice of the 5GC based on selected S-NSSAI.

The actions of the first AMF entity and the second AMF entity in steps S501 to S511 may be performed by the processor 301 in the communications device 300 shown in FIG. 3 by invoking the application program code stored in the memory 303. This is not limited in this embodiment of this application.

Figure 6:
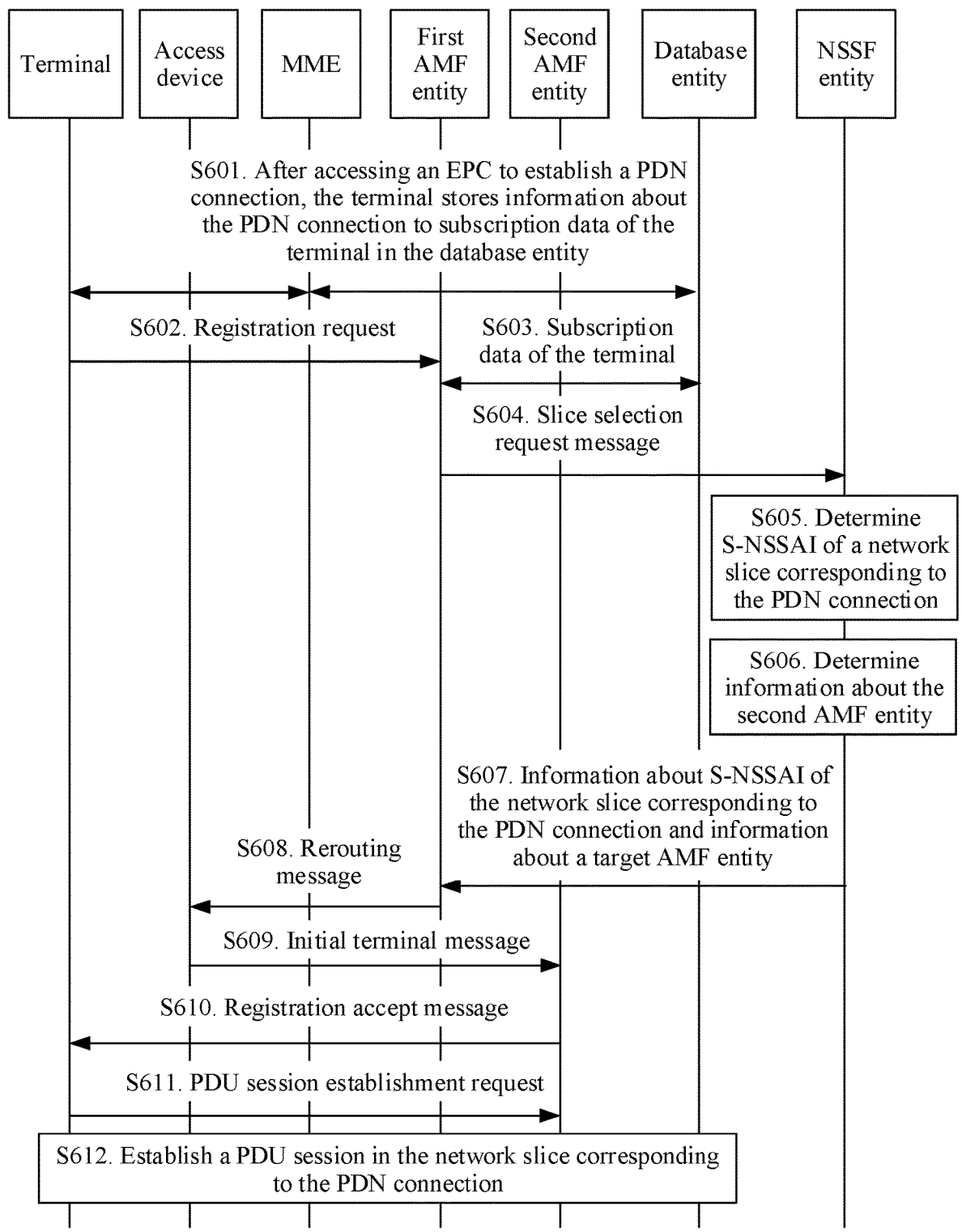
FIG. 6 is a third schematic flowchart of a session establishment method according to an embodiment of this application.

Optionally, for example, the session establishment system shown in FIG. 2 is applied to the interworking architecture of the 4G network and the 5G network shown in FIG. 1. FIG. 6 shows a session establishment method according to an embodiment of this application. The method includes the following steps.

S601 to S603 are similar to steps S401 to S403. For details, refer to the embodiment shown in FIG. 4. Details are not described herein again.

S604. A first AMF entity sends a slice selection request message to an NSSF entity, so that the NSSF entity receives the slice selection request message from the first AMF entity. The slice selection request message carries information about a PDN connection.

S605 and S606 are similar to steps S404 and S405. For details, refer to the embodiment shown in FIG. 4. Details are not described herein again.

S607. The NSSF entity sends, to the first AMF entity, information about S-NSSAI of a network slice corresponding to the PDN connection and information about a second AMF entity, so that the first AMF entity receives, from the NSSF entity, the S-NSSAI of the network slice corresponding to the PDN connection and the information about the second AMF entity.

Optionally, in this embodiment of this application, the NSSF entity may alternatively send a candidate AMF entity set to the first AMF entity after determining the candidate AMF entity set. Further, the first AMF entity selects the second AMF entity from the candidate AMF entity set based on information such as information about the candidate AMF entity set and load information of each AMF entity in the candidate AMF entity set. This is not specifically limited in this embodiment of this application.

S608 to S612 are similar to steps S406 to S410. For details, refer to the embodiment shown in FIG. 4. Details are not described herein again.

Optionally, in this embodiment of this application, after step S607 is performed, refer to steps S506 to S511 in the embodiment shown in FIG. 5. Details are not described in this embodiment of this application again.

According to the session establishment method provided in this embodiment of this application, when a terminal is handed over from an EPC supporting a DCN to a 5GC supporting a network slice, a PDU session may be established in the network slice of the 5GC based on selected S-NSSAI.

The actions of the first AMF entity and the second AMF entity in steps S601 to S612 may be performed by the processor 301 in the communications device 300 shown in FIG. 3 by invoking the application program code stored in the memory 303. This is not limited in this embodiment of this application.

Figure 7:
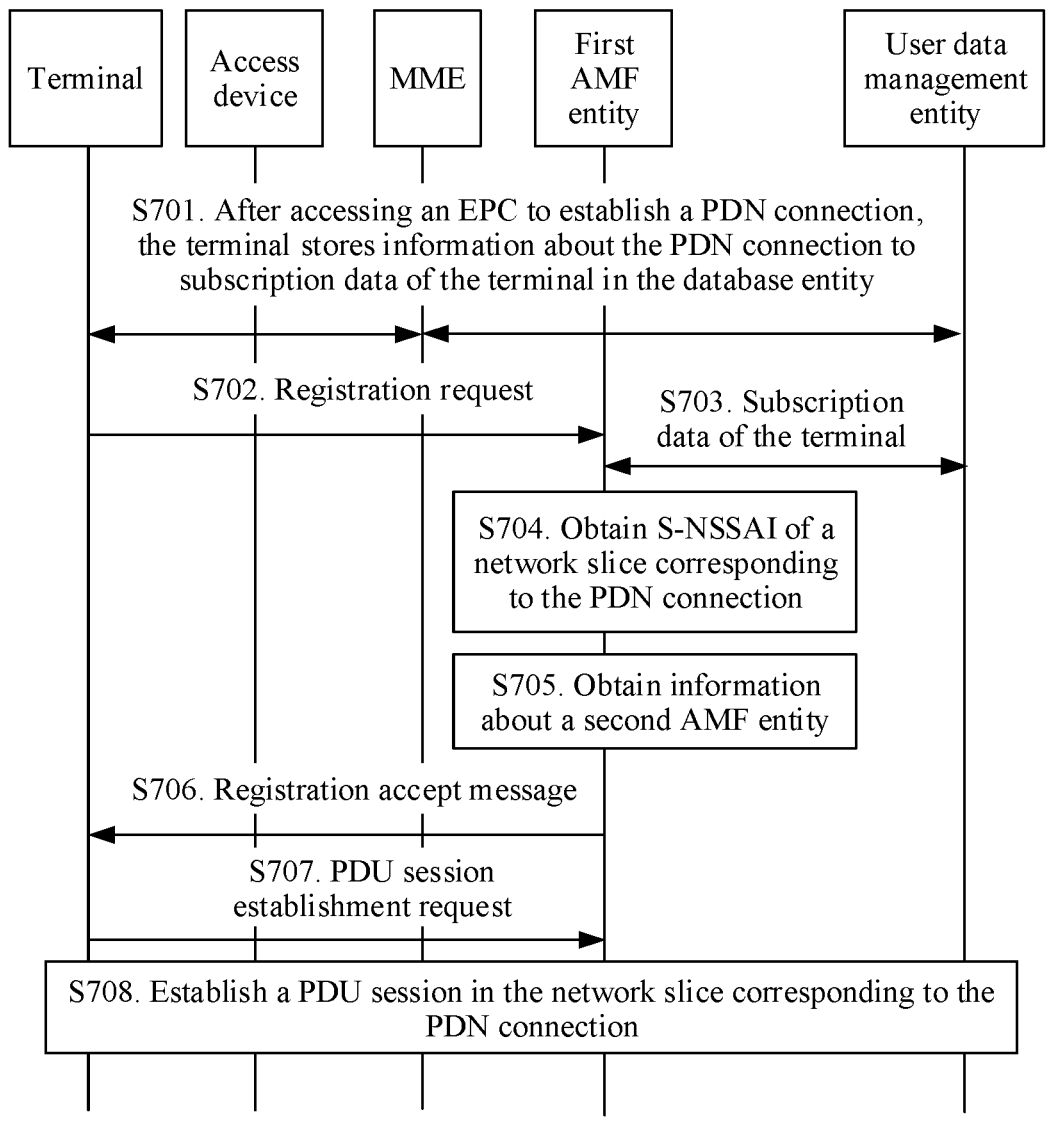
FIG. 7 is a fourth schematic flowchart of a session establishment method according to an embodiment of this application.

Optionally, for example, the session establishment system shown in FIG. 2 is applied to the interworking architecture of the 4G network and the 5G network shown in FIG. 1. FIG. 7 shows a session establishment method according to an embodiment of this application. The method includes the following steps.

S701 to S705 are similar to steps S401 to S405. For details, refer to the embodiment shown in FIG. 4. Details are not described herein again.

Assuming that a first AMF entity is the same as a second AMF entity, the session establishment method provided in this embodiment of this application further includes the following steps.

S706 to S708 are similar to steps S408 to S410. A difference lies only in that the second AMF entity in steps S408 to S410 is replaced with the first AMF entity. For details, refer to the embodiment shown in FIG. 4. Details are not described herein again.

Optionally, in this embodiment of this application, after step S705 is performed, refer to steps S508 to S511 in the embodiment shown in FIG. 5. A difference lies only in that the second AMF entity in steps S508 to S511 is replaced with the first AMF entity. For details, refer to the embodiment shown in FIG. 5. Details are not described herein.

Optionally, in this embodiment of this application, steps S704 and S705 may alternatively be replaced with steps S604 to S607 in the embodiment shown in FIG. 6. For details, refer to the embodiment shown in FIG. 6. Details are not described herein again.

According to the session establishment method provided in this embodiment of this application, the first AMF entity may obtain, based on the information about the PDN connection, S-NSSAI of a network slice corresponding to the PDN connection. Therefore, after receiving a PDU session establishment request from a terminal, the first AMF entity may establish, based on the S-NSSAI of the network slice corresponding to the PDN connection, a PDU session in the network slice corresponding to the PDN connection. In other words, according to this solution, when the terminal is handed over from an EPC supporting a DCN to a 5GC supporting a network slice, a PDU session may be established in the network slice of the 5GC based on selected S-NSSAI.

The actions of the first AMF entity in steps S701 to S708 may be performed by the processor 301 in the communications device 300 shown in FIG. 3 by invoking the application program code stored in the memory 303. This is not limited in this embodiment of this application.

Figure 12:
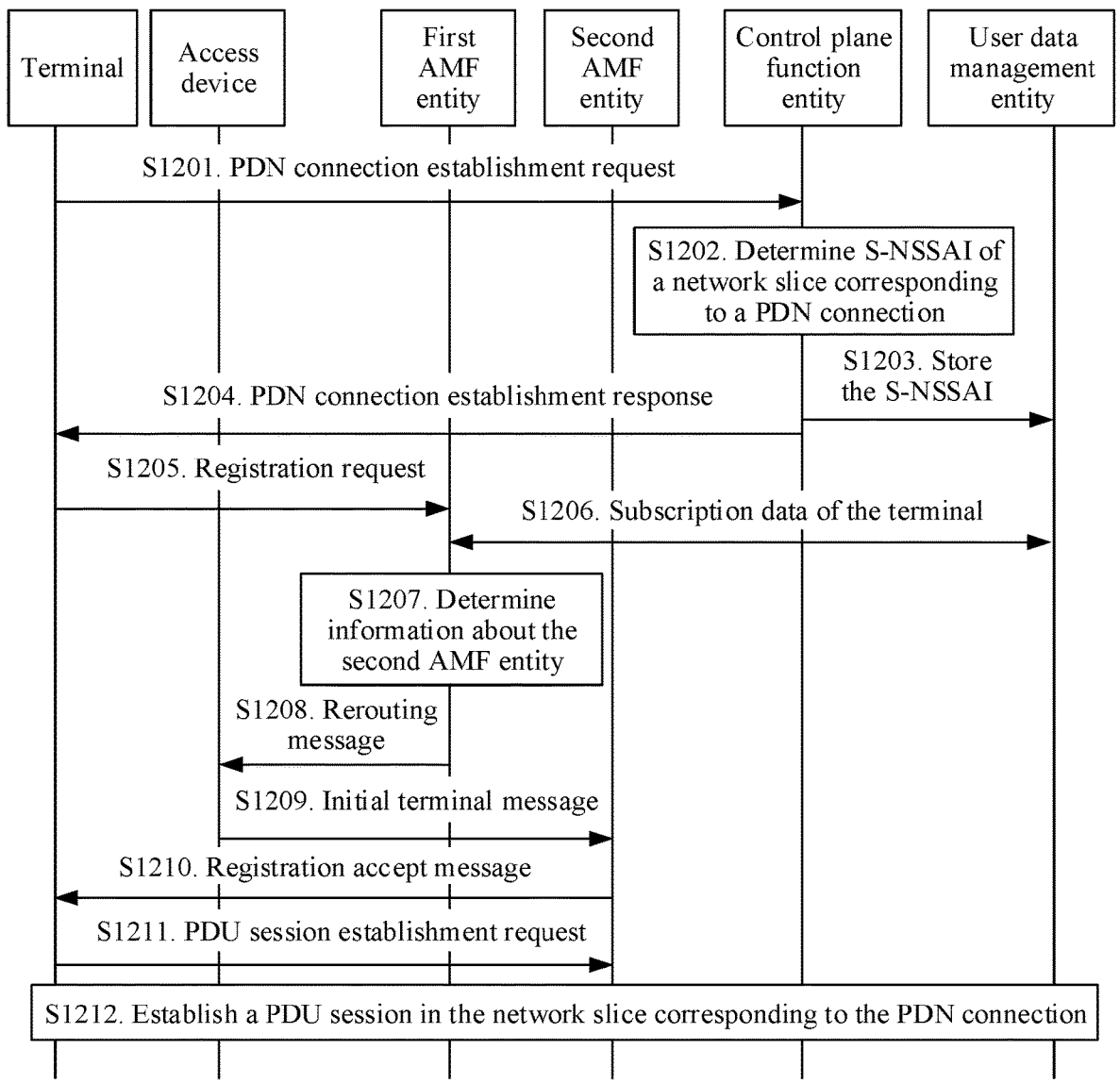
FIG. 12 is a fifth schematic flowchart of a session establishment method according to an embodiment of this application.

For example, the session establishment system shown in FIG. 11 is applied to the interworking architecture of the 4G network and the 5G network shown in FIG. 1, a session in the 4G network is a PDN connection, and a session in the 5G network is a PDU session. FIG. 12 shows a session establishment method according to an embodiment of this application. The method includes the following steps.

S1201. A terminal sends a PDN connection establishment request to a control plane function entity, so that the control plane function entity receives the PDN connection establishment request from the terminal. The PDN connection establishment request carries information about a PDN connection, and is used to request the control plane function entity to establish a corresponding PDN connection for the terminal.

The information about the PDN connection may be, for example, an APN corresponding to the PDN connection. This is not specifically limited in this embodiment of this application.

S1202. The control plane function entity determines S-NSSAI of a network slice corresponding to the PDN connection.

Optionally, that the control plane function entity determines S-NSSAI of a network slice corresponding to the PDN connection may specifically include: determining, by the control plane function entity, one piece of S-NSSAI supported by the control plane function entity as the S-NSSAI of the network slice corresponding to the PDN connection.

For example, if the control plane function entity serves only one network slice, the control plane function entity determines S-NSSAI of the network slice as the S-NSSAI of the network slice corresponding to the PDN connection.

Alternatively, for example, if the control plane function entity serves a plurality of network slices, the control plane function entity selects one piece of S-NSSAI supported by the control plane function entity as the S-NSSAI of the network slice corresponding to the PDN connection. For example, the control plane function entity may select the S-NSSAI based on the APN corresponding to the PDN connection. In this case, APN space supported by different network slices supported by the control plane function entity does not overlap. For example, APNs 1 to N correspond to S-NSSAI 1, APNs N+1 to M correspond to S-NSSAI 2, and the rest may be deduced by analogy. Alternatively, for example, the control plane function entity may determine, based on subscription information of the terminal, a local policy, and/or the like, the S-NSSAI of the network slice corresponding to the PDN connection. For example, the control plane function entity obtains, from a user data management entity, a default S-NSSAI set to which the terminal is subscribed, and intersects the default S-NSSAI set to which the terminal is subscribed and an S-NSSAI set supported by the control plane function entity. If there is only one piece of S-NSSAI in the intersection set, the control plane function entity determines the S-NSSAI as the S-NSSAI of the network slice corresponding to the PDN connection. If there are a plurality of pieces of S-NSSAI in the intersection set, the control plane function entity may select, based on the local policy, one piece of the S-NSSAI as the S-NSSAI of the network slice corresponding to the PDN connection, for example, use, based on load of network slices, S-NSSAI of a network slice with relatively light load as the S-NSSAI of the network slice corresponding to the PDN connection.

S1203. The control plane function entity stores, to the user data management entity, the S-NSSAI of the network slice corresponding to the PDN connection.

Specifically, the control plane function entity sends the S-NSSAI of the network slice corresponding to the PDN connection to the user data management entity, so that the user data management entity receives, from the control plane function entity, and stores the S-NSSAI of the network slice corresponding to the PDN connection.

When sending, to the user data management entity, the S-NSSAI of the network slice corresponding to the PDN connection, the control plane function entity may further send an identifier of the terminal and the information about the PDN connection to the user data management entity, so that the user data management entity may associate the S-NSSAI of the network slice corresponding to the PDN connection with the PDN connection of the terminal, that is, the user data management entity may associate the S-NSSAI of the network slice corresponding to the PDN connection, the identifier of the terminal, and the information about the PDN connection. The information about the PDN connection may be, for example, an APN, an identifier of the control plane function entity, or other information. This is not specifically limited in this embodiment of this application.

Optionally, the control plane function entity may further store, to the user data management entity, an instance identifier of the network slice corresponding to the PDN connection. This is not specifically limited in this embodiment of this application.

S1204. After the PDN connection has been established, the control plane function entity sends a PDN connection establishment response to the terminal, so that the terminal receives the PDN connection establishment response from the control plane function entity.

For details about a process of establishing the PDN connection, refer to an existing implementation. Details are not described herein.

S1205. After the terminal moves within 5G coverage, the terminal sends a registration request to a first AMF entity, so that the first AMF entity receives the registration request from the terminal. The registration request carries the identifier of the terminal.

For descriptions of step S1205, refer to step S402 in FIG. 4. Details are not described herein again.

S1206 is similar to step S403. A difference lies in that, in this embodiment of this application, subscription data of the terminal that is obtained by the first AMF entity from the user data management entity further includes the S-NSSAI of the network slice corresponding to the PDN connection. For details, refer to the embodiment shown in FIG. 4. Details are not described herein again.

Optionally, in this embodiment of this application, if the user data management entity further stores the instance identifier of the network slice corresponding to the PDN connection, the subscription data of the terminal that is obtained by the first AMF entity from the user data management entity may further include the instance identifier of the network slice corresponding to the PDN connection. This is not specifically limited in this embodiment of this application.

S1207 is similar to step S405. For details, refer to the embodiment shown in FIG. 4. Details are not described herein again.

Optionally, in this embodiment of this application, if the subscription data of the terminal that is obtained by the first AMF entity from the user data management entity in step S1206 further includes the instance identifier of the network slice corresponding to the PDN connection, when the first AMF entity selects a second AMF entity, whether the selected second AMF entity supports a slice instance of the network slice corresponding to the PDN connection further needs to be considered. This is centrally described herein, and will not be described below again.

Optionally, in this embodiment of this application, a manner in which the first AMF entity obtains information about the second AMF entity may be similar to the manner of in which the first AMF entity obtains the second AMF entity in steps S604 to S607. For details, refer to the embodiment shown in FIG. 6. Details are not described herein again.

S1208 to S1212 are similar to steps S406 to S410 or steps S506 to S511. For details, refer to the embodiment shown in FIG. 4 or FIG. 5. Details are not described herein again.

It should be noted that the session establishment method shown in FIG. 12 is described by using an example of a scenario in which the terminal is handed over from an EPC to a 5GC supporting a network slice. Certainly, the session establishment method is also applicable to a scenario in which the terminal is handed over from a 5GC that does not support a network slice to a 5GC that supports a network slice. A difference lies only in that the PDN connection in steps S1201 to S1212 is replaced with a PDU session, the control plane function entity is replaced with an SMF entity, and the user data management entity is replaced with a UDM entity. For details, refer to the embodiment shown in FIG. 12. Details are not described herein again.

Optionally, if the session establishment method is applied to the scenario in which the terminal is handed over from the 5GC that does not support the network slice to the 5GC that supports the network slice, after step S1209, steps S1210 to S1212 may be skipped, and instead, the following session update procedure may be performed: The second AMF entity instructs the SMF entity to update a session, and then the SMF entity updates a user plane path for the session, including: selecting, by the SMF entity, a new UPF entity, and replacing the original UPF entity with the new UPF entity or inserting the new UPF entity into the user plane path. For details, refer to an existing implementation, details are not described herein.

Based on the session establishment method provided in this embodiment of this application, the first AMF entity may obtain, from the user data management entity, S-NSSAI of a network slice corresponding to a session, and send, to the second AMF entity, the S-NSSAI of the network slice corresponding to the session. Therefore, the second AMF entity may receive, from the first AMF entity, the S-NSSAI of the network slice corresponding to the session, and after receiving a session establishment request from the terminal, establish, based on the S-NSSAI of the network slice corresponding to the session, a session in the network slice corresponding to the session. In other words, according to this solution, when the terminal is handed over from an EPC supporting a DCN to a 5GC supporting a network slice, or when the terminal is handed over from a 5GC that does not support a network slice to a 5GC that supports a network slice, a session may be established in the network slice of the 5GC based on selected S-NSSAI.

The actions of the first AMF entity and the second AMF entity in steps S1201 to S1212 may be performed by the processor 301 in the communications device 300 shown in FIG. 3 by invoking the application program code stored in the memory 303. This is not limited in this embodiment of this application.

Figure 13:
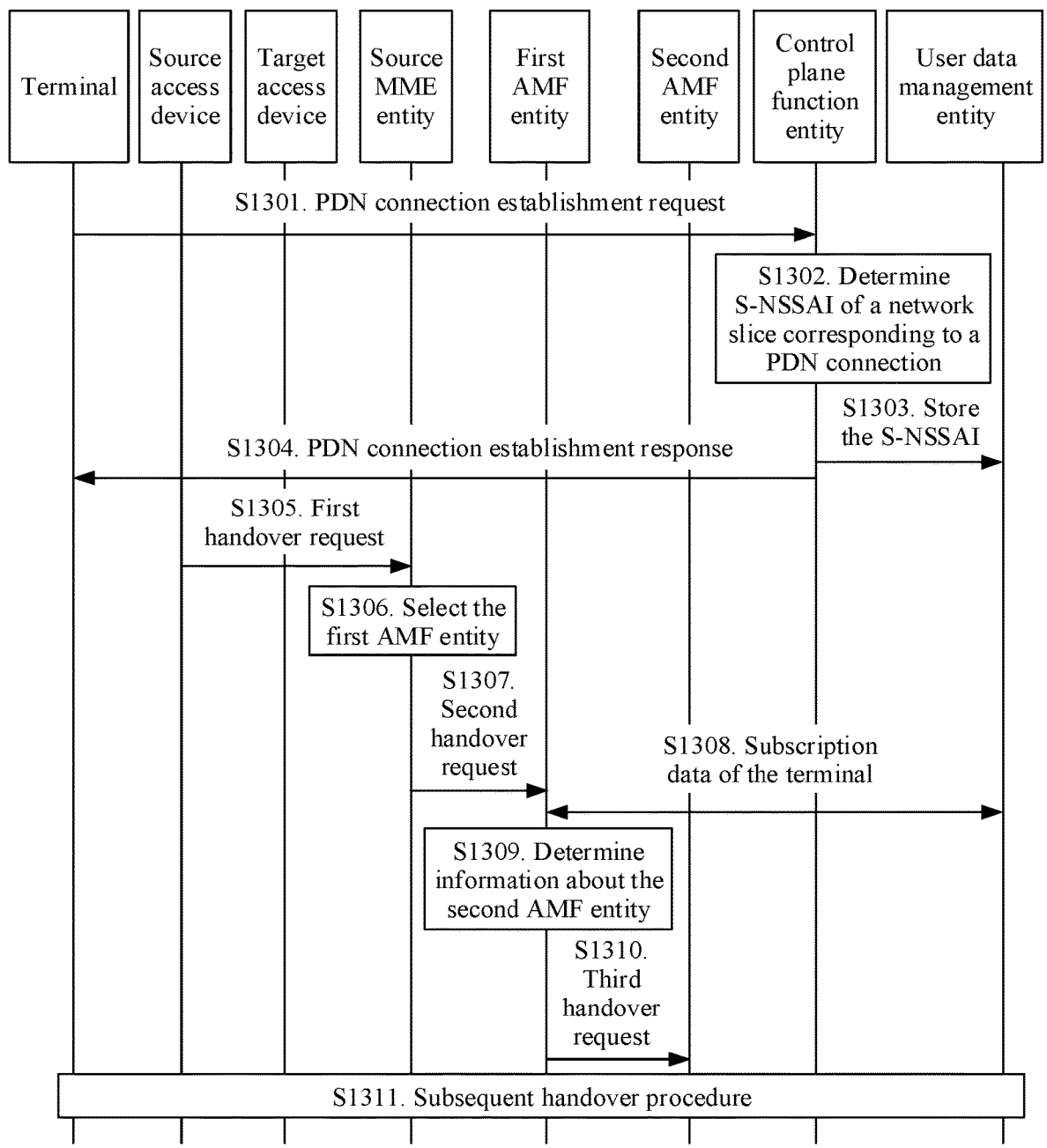
FIG. 13 is a sixth schematic flowchart of a session establishment method according to an embodiment of this application.

For example, the session establishment system shown in FIG. 11 is applied to the interworking architecture of the 4G network and the 5G network shown in FIG. 1, a session in the 4G network is a PDN connection, and a session in the 5G network is a PDU session. FIG. 13 shows a session establishment method according to an embodiment of this application. The method includes the following steps.

S1301 to S1304 are similar to steps S1201 to S1204. For details, refer to the embodiment shown in FIG. 12. Details are not described herein again.

S1305. After determining that a terminal needs to be handed over to a target access device, a source access device sends a first handover request to a source MME entity, so that the source MME entity receives the first handover request from the source access device. The first handover request carries information about the target access device.

Optionally, in this embodiment of this application, for example, the information about the target access device may include location information of the target access device, an identifier of the target access device, or an identifier of a target cell. This is not specifically limited in this embodiment of this application.

S1306. The source MME entity selects a first AMF entity.

For specific implementation of selecting the first AMF entity by the source MME entity, refer to an existing implementation. Details are not described herein. For example, the source MME entity may select the first AMF entity based on the location information of the target access device.

S1307. The source MME entity sends a second handover request to the first AMF entity, so that the first AMF entity receives the second handover request from the source MME entity. The second handover request carries information about an established session, for example, at least one of an APN, a DNN, or an identifier of a control plane function entity.

S1308 is similar to step S1206. For details, refer to the embodiment shown in FIG. 12. Details are not described herein again.

It should be noted that, in this embodiment of this application, an example in which the second handover request in step S1307 does not carry S-NSSAI of a network slice corresponding to an established PDN connection is used for description. Certainly, if the second handover request in step S1307 carries the S-NSSAI of the network slice corresponding to the established PDN connection, step S1308 is skipped. This is centrally described herein, and will not be described below again.

S1309 is similar to step S1207. For details, refer to the embodiment shown in FIG. 12. Details are not described herein again.

S1310. The first AMF entity sends a third handover request to a second AMF entity, so that the second AMF entity receives the third handover request from the first AMF entity. The third handover request carries the information carried in the second handover request and the S-NSSAI that is of the network slice corresponding to the PDN connection and that is obtained from the user data management entity.

Optionally, if the first AMF entity obtains allowed NSSAI of the terminal, the third handover request further carries the allowed NSSAI of the terminal. This is not specifically limited in this embodiment of this application.

Optionally, in this embodiment of this application, the first AMF entity may directly send the second handover request to the second AMF entity, or may send the second handover request to the second AMF entity in the foregoing redirection manner. This is not specifically limited in this embodiment of this application.

S1311. The second AMF entity continues a subsequent handover procedure.

Specifically, in this embodiment of this application, the subsequent handover procedure includes a session update procedure, a registration procedure, and the like. This is not specifically limited in this embodiment of this application. The session update procedure may include: instructing, by the second AMF entity, a control plane management entity to update a session; and further, updating, by the control plane management entity, a user plane path for the session, including: selecting, by the control plane management entity, a new UPF entity, replacing an original UPF entity with the new UPF entity, inserting the new UPF entity into the user plane path, and so on. For details, refer to an existing implementation. Details are not described herein. The registration procedure may include: sending, by the terminal, a registration request to the second AMF entity, so that the second AMF entity receives the registration request from the terminal; and further, sending, by the second AMF entity, the allowed NSSAI and a registration area to the terminal. For details, refer to an existing implementation. Details are not described herein.

It should be noted that the session establishment method shown in FIG. 13 is described by using an example of a scenario in which the terminal is handed over from an EPC to a 5GC supporting a network slice. Certainly, the session establishment method is also applicable to a scenario in which the terminal is handed over from a 5GC that does not support a network slice to a 5GC that supports a network slice. A difference lies only in that the PDN connection in steps S1301 to S1311 is replaced with a PDU session, the source MME entity is replaced with a source AMF entity, the control plane function entity is replaced with an SMF entity, and the user data management entity is replaced with a UDM entity. For details, refer to the embodiment shown in FIG. 13. Details are not described herein again.

According to the session establishment method provided in this embodiment of this application, when the terminal is handed over from the EPC to the 5GC supporting the network slice, or when the terminal is handed over from the 5GC that does not support the network slice to the 5GC that supports the network slice, a session may be established in the network slice of the 5GC based on selected S-NSSAI.

The actions of the first AMF entity and the second AMF entity in steps S1301 to S1311 may be performed by the processor 301 in the communications device 300 shown in FIG. 3 by invoking the application program code stored in the memory 303. This is not limited in this embodiment of this application.

It should be noted that the embodiments shown in FIG. 12 and FIG. 13 are described by using an example in which the first AMF entity is different from the second AMF entity. Certainly, the first AMF entity may alternatively be the same as the second AMF entity. In this case, only the steps of interaction between the first AMF entity and the second AMF entity in the foregoing steps need to be deleted. For example, steps S1207 to S1209 in FIG. 12 do not need to be performed, and steps S1309 and S1310 in FIG. 12 do not need to be performed. For details, refer to the embodiment shown in FIG. 12 or FIG. 13. Details are not described herein again.

Figure 15:
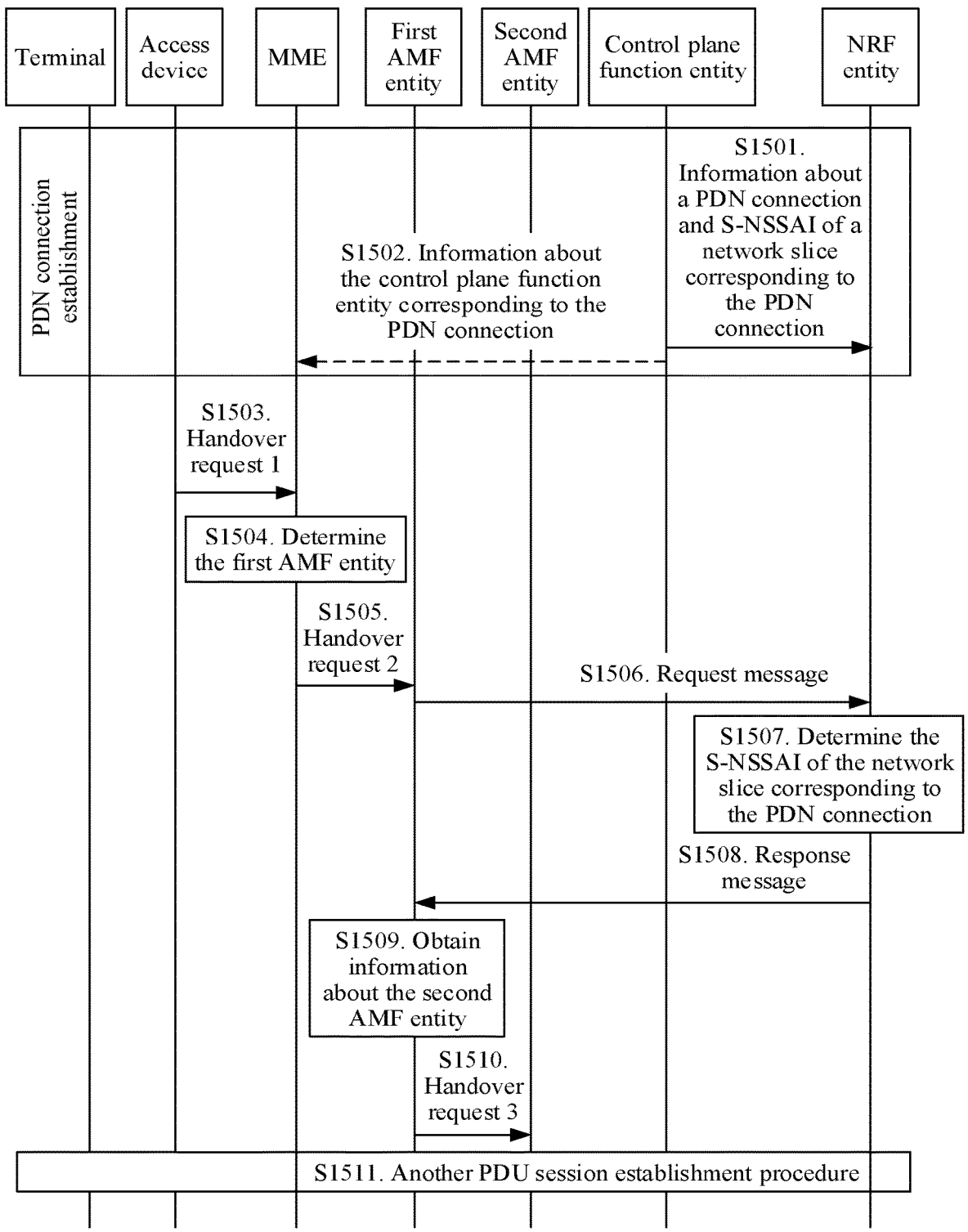
FIG. 15 is a seventh schematic flowchart of a session establishment method according to an embodiment of this application.

Optionally, for example, a session establishment system shown in FIG. 14 is applied to the interworking architecture of the 4G network and the 5G network shown in FIG. 1. FIG. 15 shows a session establishment method according to an embodiment of this application. The method includes the following steps.

S1501. In an establishment process of a PDN connection, a control plane function entity (namely, an SMF entity+a PGW-C entity) sends, to an NRF entity, information about the PDN connection and S-NSSAI of a network slice corresponding to the PDN connection, so that the NRF entity receives, from the control plane function entity, the information about the PDN connection and the S-NSSAI of the network slice corresponding to the PDN connection.

Optionally, in this embodiment of this application, the information about the PDN connection may include at least one of information about the control plane function entity corresponding to the PDN connection, an APN corresponding to the PDN connection, a PDN type corresponding to the PDN connection, or a PDN address corresponding to the PDN connection. This is not specifically limited in this embodiment of this application.

Optionally, in this embodiment of this application, for example, the information about the control plane function entity corresponding to the PDN connection may include information about a public land mobile network (PLMN) in which the control plane function entity corresponding to the PDN connection is located, an IP address of the control plane function entity, or an FQDN. This is not specifically limited in this embodiment of this application.

Optionally, in this embodiment of this application, the control plane function entity may determine, based on at least one of the information about the control plane function entity corresponding to the PDN connection, the APN corresponding to the PDN connection, the PDN type corresponding to the PDN connection, the PDN address corresponding to the PDN connection, or an S-NSSAI set supported by the control plane function entity, the S-NSSAI of the network slice corresponding to the PDN connection. For example, the FQDN of the control plane function entity may include the S-NSSAI of the network slice corresponding to the PDN connection. Alternatively, the control plane function entity may configure a correspondence between an APN and S-NSSAI, and then the control plane function entity may determine, based on the APN corresponding to the PDN connection and the correspondence, the S-NSSAI of the network slice corresponding to the PDN connection. Alternatively, if the control plane function entity supports only one piece of S-NSSAI, the control plane function entity determines that S-NSSAI corresponding to the PDN connection is S-NSSAI supported by the control plane function entity. Alternatively, the control plane function entity may configure a correspondence between a PDN type and S-NSSAI, and then the control plane function entity may determine, based on the PDN type corresponding to the PDN connection and the correspondence, the S-NSSAI of the network slice corresponding to the PDN connection. A specific implementation in which the control plane function entity determines the S-NSSAI of the network slice corresponding to the PDN connection is not limited in this embodiment of this application.

Optionally, in this embodiment of this application, after receiving, from the control plane function entity, the information about the PDN connection and the S-NSSAI of the network slice corresponding to the PDN connection, the NRF entity may establish or store a correspondence between the information about the PDN connection and the S-NSSAI of the network slice corresponding to the PDN connection. This is not specifically limited in this embodiment of this application.

For example, if the information about the PDN connection is an identifier of the control plane function entity corresponding to the PDN connection, the NRF entity may store a correspondence shown in Table 4.

TABLE 4

| Information about a PDN connection | S-NSSAI of a network slice corresponding to the PDN connection |
|---|---|
| Control plane function entity identifier 1 | S-NSSAI 1 |
| Control plane function entity identifier 2 | S-NSSAI 2 |

Certainly, when the information about the PDN connection is other information, only the identifier of the control plane function entity in Table 4 needs to be replaced with corresponding information. Details are not described herein.

Optionally, the session establishment method provided in this embodiment of this application may further include the following step S1502:

S1502. In the establishment process of the PDN connection, if PDN connections of different network slices correspond to information about different control plane function entities, the control plane function entity sends, to an MME, the information about the control plane function entity corresponding to the PDN connection, so that the MME receives, from the control plane function entity, the information about the control plane function entity corresponding to the PDN connection.

For related descriptions of the information about the control plane function entity corresponding to the PDN connection, refer to step S1501. Details are not described herein again.

Optionally, in this embodiment of this application, after receiving, from the control plane function entity, the information about the control plane function entity corresponding to the PDN connection, the MME may store the information about the control plane function entity corresponding to the PDN connection. This is not specifically limited in this embodiment of this application.

It should be noted that in this embodiment of this application, step S1501 and step S1502 are not performed in a necessary sequence. Step S1501 may be performed before step S1502, step S1502 may be performed before step S1501, or step S1501 and step S1502 may be simultaneously performed. This is not specifically limited in this embodiment of this application.

Further, the session establishment method provided in this embodiment of this application may further include the following steps.

S1503. An access device in an EPC sends a handover request 1 to the MME, so that the MME receives the handover request 1 from the access device.

The handover request 1 includes information about a target access area. For example, the information about the target access area may include at least one of information about a target cell, information about a target access device, or information about a target tracking area. This is not specifically limited in this embodiment of this application.

In this embodiment of this application, the target cell is a cell to be accessed by the terminal, and the information about the target cell may include, for example, an identifier of the target cell. The target access device is an access device to which a cell to be accessed by the terminal belongs, and the information about the target access device may include, for example, an identifier or location information of the target access device. The target tracking area is a tracking area in which a cell to be accessed by the terminal is located, and the information about the target tracking area may include, for example, an identifier of the target tracking area. This is not specifically limited in this embodiment of this application.

Optionally, in this embodiment of this application, the handover request 1 may further include information used to determine the terminal, for example, an identifier of the terminal. This is not specifically limited in this embodiment of this application.

Optionally, in this embodiment of this application, the handover request 1 may be sent to the MME after the access device in the EPC performs determining based on cell measurement information reported by the terminal. This is not specifically limited in this embodiment of this application.

S1504. The MIME determines a first AMF entity.

Optionally, in this embodiment of this application, the MME may determine, based on the information that is about the target access area and that is carried in the handover request 1, whether handover requested by the handover request 1 is handover between different types of networks. In the scenario in this embodiment of this application, the target access area is a 5G network. Therefore, the MME determines that the handover requested by the handover request is cross-system handover.

To implement the cross-system handover, the MME needs to determine, based on the information that is about the target access area and that is carried in the handover request, the first AMF entity that performs a handover operation. In an implementation, because the MME does not have information about the network slice corresponding to the PDN connection, the MME may select a default AMF entity as the first AMF entity based on the location information of the target access device. Alternatively, in another implementation, the MME may select the first AMF entity based on a usage type of the terminal and the identifier of the target tracking area.

This embodiment of this application provides only examples of two specific implementations of determining an AMF entity by the MME. Certainly, the MME may alternatively determine the first AMF entity in another manner. For details, refer to an existing implementation. Details are not described herein.

S1505. The MME sends a handover request 2 to the first AMF entity, so that the first AMF entity receives the handover request 2 from the MME.

The handover request 2 includes information about an established PDN connection. For related descriptions of the information about the PDN connection, refer to step S1501. Details are not described herein again.

Optionally, if the information about the established PDN connection included in the handover request 2 is the information about the control plane function entity corresponding to the PDN connection, the information about the control plane function entity corresponding to the PDN connection may be obtained through step S1502. This is centrally described herein, and will not be described below again.

S1506. The first AMF entity sends a request message to the NRF entity, so that the NRF network element receives the request message from the first AMF entity.

The request message carries information about the PDN connection, and is used to request the S-NSSAI of the network slice corresponding to the PDN connection.

S1507. The NRF entity determines, based on the information about the PDN connection, the S-NSSAI of the network slice corresponding to the PDN connection.

Specifically, the NRF entity may query, based on the information about the PDN connection, the information about the PDN connection and the S-NSSAI of the network slice corresponding to the PDN connection that are stored in an NRF, to obtain the S-NSSAI of the network slice corresponding to the PDN connection. This is not specifically limited in this embodiment of this application.

S1508. The NRF entity sends a response message to the first AMF entity, so that the first AMF entity receives the response message from the NRF entity.

The response message carries the S-NSSAI of the network slice corresponding to the PDN connection.

It should be noted that, in this embodiment of this application, the terminal may have established one or more PDN connections in the EPC previously. Therefore, the information about the established PDN connection included in the handover request 2 in step S1505 may be information about the one or more PDN connections. In this case, information about each PDN connection may be performed with reference to steps S1506 to S1508, or S-NSSAI of network slices corresponding to the one or more PDN connections may be obtained by performing steps S1506 to S1508 once. This is not specifically limited in this embodiment of this application.

Optionally, in this embodiment of this application, if a PLMN in which the first AMF entity is located is different from a PLMN in which the control plane function entity is located, the request message in step S1506 may further carry a PLMN identifier of the PLMN in which the control plane function entity is located, so that the NRF entity of the PLMN in which the first AMF entity is located may determine, based on the identifier of the PLMN in which the control plane function entity is located, the NRF entity of the PLMN in which the control plane function entity is located, and further obtain, from the NRF entity of the PLMN in which the control plane function entity is located, the S-NSSAI of the network slice corresponding to the PDN connection. This is not specifically limited in this embodiment of this application.

S1509 is similar to step S405. For related descriptions, refer to the embodiment shown in FIG. 4. Details are not described herein again.

S1510. The first AMF entity sends a handover request 3 to a second AMF entity, so that the second AMF entity receives the handover request 3 from the first AMF entity.

The handover request 3 may include the S-NSSAI of the network slice corresponding to the PDN connection and the information that is about the PDN connection and that is obtained from the MME.

S1511. Another session establishment procedure.

For example, the another session establishment procedure may include selecting an intermediate SMF entity or a visited SMF (V-SMF) entity based on the S-NSSAI corresponding to the PDN connection. For details, refer to 3GPP TS 23.502: "Procedures for the 5G System; Stage 2". Details are not described herein.

According to the session establishment method provided in this embodiment of this application, when the terminal is handed over from an EPC supporting a DCN to a 5GC supporting a network slice, a session may be established in the network slice of the 5GC based on selected S-NSSAI. For analysis on a related technical effect, refer to the session establishment system part shown in FIG. 14. Details are not described herein again.

The actions of the control plane function entity and the first AMF entity in steps S1501 to S1511 may be performed by the processor 301 in the communications device 300 shown in FIG. 3 by invoking the application program code stored in the memory 303. This is not limited in this embodiment of this application.

Figure 16:
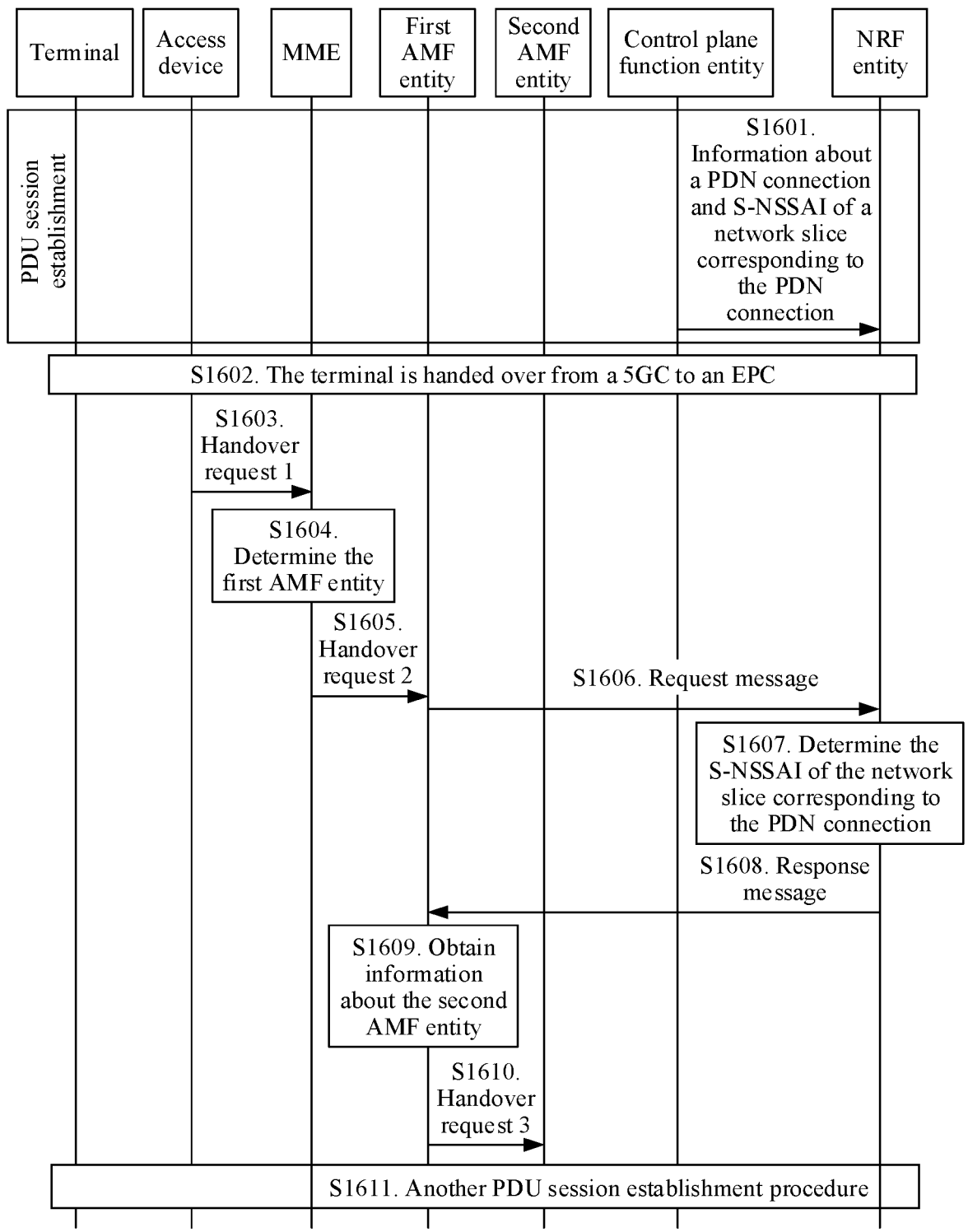
FIG. 16 is an eighth schematic flowchart of a session establishment method according to an embodiment of this application.

Optionally, for example, the session establishment system shown in FIG. 14 is applied to the interworking architecture of the 4G network and the 5G network shown in FIG. 1. FIG. 16 shows a session establishment method according to an embodiment of this application. The method includes the following steps.

S1601. In a process in which a terminal establishes a PDU session in a 5GC, a control plane function entity (namely, an SMF entity+a PGW-C entity) sends, to an NRF entity, information about a PDN connection and S-NSSAI of a network slice corresponding to the PDN connection, so that the NRF entity receives, from the control plane function entity, the information about the PDN connection and the S-NSSAI of the network slice corresponding to the PDN connection.

Optionally, in this embodiment of this application, the control plane function entity may determine, based on subscription data of the terminal, that the PDU session may be handed over to an EPC, further, determine the information about the PDN connection and the S-NSSAI of the network slice corresponding to the PDN connection, and send, to the NRF entity, the information about the PDN connection and the S-NSSAI of the network slice corresponding to the PDN connection. This is not specifically limited in this embodiment of this application.

Optionally, for related descriptions of the information about the PDN connection in this embodiment of this application, refer to step S1501. Details are not described herein again.

For example, the control plane function entity may determine, in the following manner, an APN corresponding to the PDN connection: The control plane function entity may determine, based on a DNN corresponding to the PDU session, the APN corresponding to the PDN connection. For example, the DNN corresponding to the PDU session is the same as the APN corresponding to the PDN connection. Alternatively, the APN corresponding to the PDN connection may be determined based on the DNN corresponding to the PDU session and a mapping relationship between a DNN and an APN. Alternatively, the APN corresponding to the PDN connection may be determined based on the DNN corresponding to the PDU session and S-NSSAI of the PDU session. This is not specifically limited in this embodiment of this application.

Alternatively, for example, the control plane function entity may determine, in the following manner, a PDN type corresponding to the PDN connection: For example, the PDN type corresponding to the PDN connection may be the same as a PDU type corresponding to the PDU session. Alternatively, the PDN type corresponding to the PDN connection may be determined based on the PDU type corresponding to the PDU session and a mapping relationship between a PDU type and a PDN type. For example, a PDU type of an Ethernet type may be mapped to a PDN type of a non-IP type. This is not specifically limited in this embodiment of this application.

Alternatively, for example, the control plane function entity may determine, in the following manner, a PDN address corresponding to the PDN connection: For example, the PDN address corresponding to the PDN connection may be the same as a PDU address corresponding to the PDU session. Alternatively, the PDN address corresponding to the PDN connection may be determined based on the PDU address corresponding to the PDU session and a mapping relationship between a PDU address and a PDN address. This is not specifically limited in this embodiment of this application.

Optionally, in this embodiment of this application, the control plane function entity may determine the S-NSSAI corresponding to the PDU session as the S-NSSAI of the network slice corresponding to the PDN connection when the PDU session is handed over to the EPC. This is not specifically limited in this embodiment of this application.

Optionally, in this embodiment of this application, after receiving, from the control plane function entity, the information about the PDN connection and the S-NSSAI of the network slice corresponding to the PDN connection, the NRF entity may establish or store a correspondence between the information about the PDN connection and the S-NSSAI of the network slice corresponding to the PDN connection. For related descriptions, refer to step S1501 in the embodiment shown in FIG. 15. Details are not described herein again.

S1602. The terminal is handed over from a 5GC to the EPC.

For related implementation of step S1602, refer to an existing implementation. Details are not described herein.

S1603 to S1611 are similar to steps S1503 to S1511. For related descriptions, refer to the embodiment shown in FIG. 5. Details are not described herein again.

According to the session establishment method provided in this embodiment of this application, when the terminal is handed over from an EPC supporting a DCN to a 5GC supporting a network slice, a session may be established in the network slice of the 5GC based on selected S-NSSAI. For analysis on a related technical effect, refer to the session establishment system part shown in FIG. 14. Details are not described herein again.

The actions of the control plane function entity and the first AMF entity in steps S1601 to S1611 may be performed by the processor 301 in the communications device 300 shown in FIG. 3 by invoking the application program code stored in the memory 303. This is not limited in this embodiment of this application.

Figure 19:
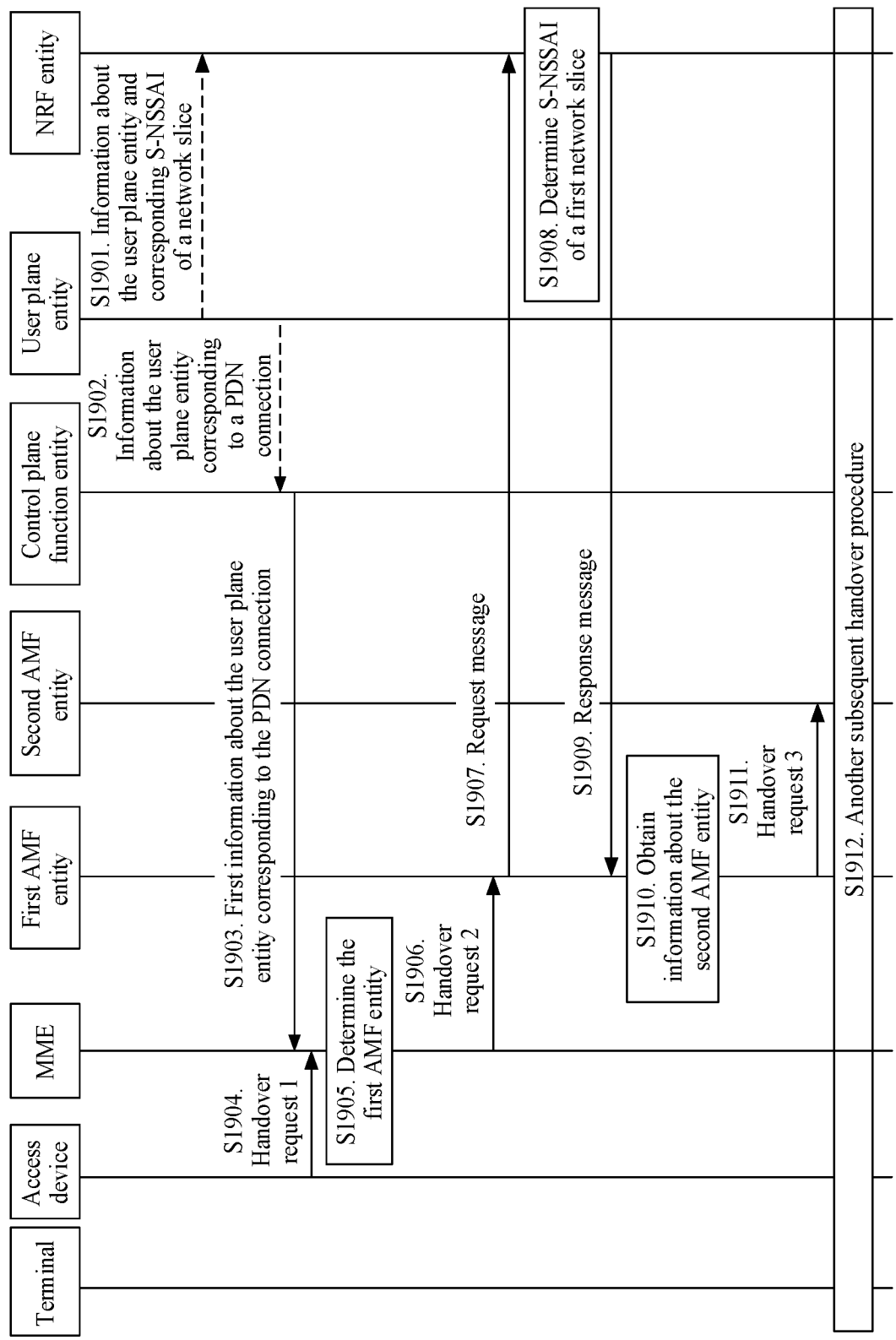
FIG. 19 is a ninth schematic flowchart of a session establishment method according to an embodiment of this application.

Optionally, for example, the session establishment system shown in FIG. 18 is applied to the interworking architecture of the 4G network and the 5G network shown in FIG. 1. FIG. 19 shows a session establishment method according to an embodiment of this application. The method includes the following steps.

S1901. When a user plane entity (that is, a UPF entity+a PGW-U entity) registers with an NRF entity or a control plane function entity (that is, an SMF entity+a PGW-C entity) establishes a connection to a user plane entity (that is, a UPF entity+a PGW-U entity), the user plane entity sends, to the NRF entity, information about the user plane entity and S-NSSAI that is of a network slice and that corresponds to the information about the user plane entity, so that the NRF entity receives, from the user plane entity, the information about the user plane entity and the corresponding S-NSSAI of the network slice.

Optionally, in this embodiment of this application, for example, the information about the user plane entity may include information about a PLMN in which the user plane entity is located, an IP address, an FQDN, or a tunnel endpoint identifier (TED) of the user plane entity, and a network instance. This is not specifically limited in this embodiment of this application. When the user plane entity may serve one piece of S-NSSAI, a same user plane entity may have information about one or more user plane entities. Alternatively, when the user plane entity may serve a plurality of pieces of S-NSSAI, a same user plane entity may have information about one or more user plane entities. This is not specifically limited in this embodiment of this application. For example, one user plane entity may have one or more IP addresses, and different IP addresses correspond to different S-NSSAI. Alternatively, one user plane entity may have one or more TEIDs, and different TEIDs correspond to different S-NSSAI. Alternatively, a TEID of a user plane entity may be divided into one or more segments, and different segments correspond to different S-NSSAI. This is not specifically limited in this embodiment of this application.

Optionally, in this embodiment of this application, the information about the user plane entity may be included in information about an established PDN connection. For related descriptions of the information about the PDN connection, refer to the foregoing embodiments. Details are not described herein again.

Optionally, in this embodiment of this application, after receiving, from the user plane entity, the information about the user plane entity and the corresponding S-NSSAI of the network slice, the NRF entity may establish or store a correspondence between the information about the user plane entity and the corresponding S-NSSAI of the network slice. This is not specifically limited in this embodiment of this application.

For example, if the information about the user plane entity is the IP address of the user plane entity, the NRF entity may store a correspondence shown in Table 5.

TABLE 5

| Information about a user plane entity | Corresponding S-NSSAI of a network slice |
|---|---|
| IP address 1 of the user plane entity | S-NSSAI 1 |
| IP address 2 of the user plane entity | S-NSSAI 2 |
| IP address 3 of the user plane entity | S-NSSAI 3 |

Certainly, when the information about the user plane entity is other information, only the IP address of the user plane entity in Table 5 needs to be replaced with corresponding information. Details are not described herein.

It should be noted that step S1901 in this embodiment of this application is an optional step, that is, step S1901 may be skipped, and instead, the correspondence between the information about the user plane entity and the corresponding S-NSSAI of the network slice is configured on the NRF entity in another manner. For example, when deploying a network, an operator or an operation administration and maintenance (OA&M) directly configures, on the NRF entity, the correspondence between the information about the user plane entity and the corresponding S-NSSAI of the network slice. This is not specifically limited in this embodiment of this application.

S1902. When the control plane function entity establishes a connection to the user plane entity, for example, in a process of establishing the PDN connection, if PDN connections of different network slices correspond to different information about user plane entities, the user plane entity sends, to the control plane function entity, the information about the user plane entity corresponding to the PDN connection, so that the control plane function entity receives, from the user plane entity, the information about the user plane entity corresponding to the PDN connection.

In this embodiment of this application, the information about the user plane entity corresponding to the PDN connection in step S1902 may be all or a part of the information about the user plane entity in step S1901. This is not specifically limited in this embodiment of this application. For example, the information about the user plane entity in step S1901 may be, for example, the IP address 1 of the user plane entity, the IP address 2 of the user plane entity, and the IP address 3 of the user plane entity. In this case, the information about the user plane entity corresponding to the PDN connection in step S1902 may be at least one of the IP address 1 of the user plane entity, the IP address 2 of the user plane entity, or the IP address 3 of the user plane entity.

Optionally, in this embodiment of this application, after receiving, from the user plane entity, the information about the user plane entity corresponding to the PDN connection, the control plane function entity may store the information about the user plane entity corresponding to the PDN connection. This is not specifically limited in this embodiment of this application.

Optionally, in this embodiment of this application, when the control plane function entity establishes a connection to the user plane entity, for example, in the establishment process of the PDN connection, the user plane entity may further send, to the control plane function entity, S-NSSAI that is of a network slice and that corresponds to the information about the user plane entity corresponding to the PDN connection, so that the control plane function entity receives, from the user plane entity, the S-NSSAI that is of the second network slice and that corresponds to the information about the user plane entity corresponding to the PDN connection, and may further store a correspondence between the information about the user plane entity corresponding to the PDN connection and the corresponding S-NSSAI of the network slice. This is not specifically limited in this embodiment of this application.

For example, assuming that the information about the user plane entity corresponding to the PDN connection includes the IP address 1 of the user plane entity and the IP address 2 of the user plane entity, according to Table 5, the S-NSSAI that is of the network slice and that corresponds to the information about the user plane entity corresponding to the PDN connection may be, for example, the S-NSSAI 1 corresponding to the IP address 1 of the user plane entity and the S-NSSAI 2 corresponding to the IP address 2 of the user plane entity.

It should be noted that step S1902 in this embodiment of this application is an optional step, that is, step S1902 may be skipped, and instead, the correspondence between the information about the user plane entity corresponding to the PDN connection and the corresponding S-NSSAI of the network slice is configured on the control plane function entity in another manner. For example, when deploying a network, an operator or an operation administration and maintenance (OA&M) device directly configures, on the control plane function entity, the correspondence between the information about the user plane entity corresponding to the PDN connection and the corresponding S-NSSAI of the network slice. This is not specifically limited in this embodiment of this application.

It should be noted that in this embodiment of this application, step S1901 and step S1902 are not performed in a necessary sequence. Step S1901 may be performed before step S1902, step S1902 may be performed before step S1901, or step S1901 and step S1902 may be simultaneously performed. This is not specifically limited in this embodiment of this application.

S1903. In the establishment process of the PDN connection, if PDN connections of different network slices correspond to information about different user plane entities, the control plane function entity sends, to an MME, first information of the user plane entity corresponding to the PDN connection, so that the MME receives, from the control plane function entity, the first information of the user plane entity corresponding to the PDN connection.

In this embodiment of this application, the first information of the user plane entity corresponding to the PDN connection in step S1903 may be all or a part of the information about the user plane entity corresponding to the PDN connection in step S1902. This is not specifically limited in this embodiment of this application. For example, the information about the user plane entity corresponding to the PDN connection in step S1902 may be, for example, the IP address 1 of the user plane entity and the IP address 2 of the user plane entity. In this case, the first information of the user plane entity corresponding to the PDN connection in step S1903 may be at least one of the IP address 1 of the user plane entity and the IP address 2 of the user plane entity.

Optionally, in this embodiment of this application, if the first information of the user plane entity corresponding to the PDN connection in step S1903 is a part of the information about the user plane entity corresponding to the PDN connection in step S1902, the first information that is of the user plane entity corresponding to the PDN connection and that is sent by the control plane function entity to the MME may be information, which corresponds to the selected S-NSSAI, about the user plane entity and that is determined, by the control plane function entity based on the selected S-NSSAI, from the information, received from the user plane entity, about the user plane entity corresponding to the PDN connection. Alternatively, the first information that is of the user plane entity corresponding to the PDN connection and that is sent by the control plane function entity to the MME may be information selected by the control plane function entity based on a configuration of the control plane function entity, from the information that is about the user plane entity corresponding to the PDN connection and that is received from the user plane entity. This is not specifically limited in this embodiment of this application.

Optionally, in this embodiment of this application, after receiving, from the control plane function entity, the first information of the user plane entity corresponding to the PDN connection, the MME may store the first information of the user plane entity corresponding to the PDN connection, for example, may store, in a context of the terminal, the first information of the user plane entity corresponding to the PDN connection. This is not specifically limited in this embodiment of this application.

Further, the session establishment method provided in this embodiment of this application may further include the following steps.

S1904 and S1905 are similar to steps S1503 and S1504 in the embodiment shown in FIG. 15. For related descriptions, refer to the embodiment shown in FIG. 15. Details are not described herein again.

S1906. The MME sends a handover request 2 to a first AMF entity, so that the first AMF entity receives the handover request 2 from the MME.

The handover request 2 includes first information of a user plane entity corresponding to an established PDN connection (for example, the PDN connection in step S1902 or S1903). The first information of the user plane entity corresponding to the PDN connection may be obtained through step S1903. This is centrally described herein, and will not be described below again.

S1907. The first AMF entity sends a request message to the NRF entity, so that the NRF network element receives the request message from the first AMF entity.

The request message carries the first information of the user plane entity corresponding to the established PDN connection, and is used to request S-NSSAI of a first network slice corresponding to the PDN connection.

S1908. The NRF entity determines, based on the first information of the user plane entity corresponding to the PDN connection, the S-NSSAI of the first network slice corresponding to the PDN connection.

Specifically, the NRF entity may query, based on the first information of the user plane entity corresponding to the PDN connection, a correspondence (for example, the correspondence shown in Table 5) between the information about the user plane entity and the corresponding S-NSSAI of the network slice that are stored in the NRF, to obtain the S-NSSAI of the first network slice corresponding to the PDN connection. This is not specifically limited in this embodiment of this application.

S1909. The NRF entity sends a response message to the first AMF entity, so that the first AMF entity receives the response message from the NRF entity.

The response message carries the S-NSSAI of the first network slice corresponding to the PDN connection.

It should be noted that, in this embodiment of this application, the terminal may have established one or more PDN connections in the EPC previously. Therefore, the first information of the user plane entity corresponding to the established PDN connection included in the handover request 2 in step S1906 may be first information of user plane entities corresponding to the one or more PDN connections. In this case, each PDN connection may be established with reference to steps S1907 to S1909, or S-NSSAI of first network slices corresponding to one or more PDN connections may be obtained by performing steps S1907 to S1909 once. This is not specifically limited in this embodiment of this application.

Optionally, in this embodiment of this application, if a PLMN in which the first AMF entity is located is different from a PLMN in which the user plane entity is located, the request message in step S1907 may further carry a PLMN identifier of the PLMN in which the user plane entity is located, so that the NRF entity of the PLMN in which the first AMF entity is located may determine, based on the identifier of the PLMN in which the user plane entity is located, the NRF entity of the PLMN in which the user plane entity is located, and further obtain, from the NRF entity of the PLMN in which the user plane entity is located, the S-NSSAI of the network slice corresponding to the PDN connection. This is not specifically limited in this embodiment of this application.

S1910 is similar to step S405 in the embodiment shown in FIG. 4. For related descriptions, refer to the embodiment shown in FIG. 4. Details are not described herein again.

S1911. The first AMF entity sends a handover request 3 to a second AMF entity, so that the second AMF entity receives the handover request 3 from the first AMF entity.

The handover request 3 may include the S-NSSAI of the first network slice corresponding to the PDN connection and the information that is about the PDN connection and that is obtained from the MME.

Optionally, in this embodiment of this application, the MME may alternatively obtain, in the manner shown in FIG. 15, the information about the control plane function entity corresponding to the PDN connection, add, to the handover request 2 to be sent to the first AMF entity, the information about the control plane function entity corresponding to the PDN connection, and further add, to the handover request 3 to be sent by the first AMF entity to the second AMF entity, the information about the control plane function entity corresponding to the PDN connection. This is not specifically limited in this embodiment of this application.

S1912. Another subsequent handover procedure.

For example, the another subsequent handover procedure may include: selecting, by the second AMF entity, a control plane function entity or a visited SMF (V-SMF) entity based on the S-NSSAI of the first network slice corresponding to the PDN connection, or selecting a control plane function entity based on information about the control plane function entity. For details, refer to 3GPP TS 23.502: "Procedures for the 5G System; Stage 2". Details are not described herein.

Alternatively, optionally, in this embodiment of this application, when the first AMF entity requests, from the NRF entity based on the first information of the user plane entity corresponding to the PDN connection, the S-NSSAI of the first network slice corresponding to the PDN connection, the first AMF entity may request, based on an FQDN of the control plane function entity corresponding to the PDN connection, an address of the control plane function entity, and further send the obtained address of the control plane function entity to the second AMF entity, so that the second AMF entity selects the corresponding control plane function entity based on the address of the control plane function entity. This is not specifically limited in this embodiment of this application.

According to the session establishment method provided in this embodiment of this application, when the terminal is handed over from an EPC supporting a DCN to a 5GC supporting a network slice, interworking may be achieved and a corresponding session may be established in the network slice of the 5GC based on selected S-NSSAI. For analysis on a related technical effect, refer to the session establishment system part shown in FIG. 18. Details are not described herein again.

The actions of the user plane entity, the control plane function entity, and the first AMF entity in steps S1901 to S1912 may be performed by the processor 301 in the communications device 300 shown in FIG. 3 by invoking the application program code stored in the memory 303. This is not limited in this embodiment of this application.

Figure 20:
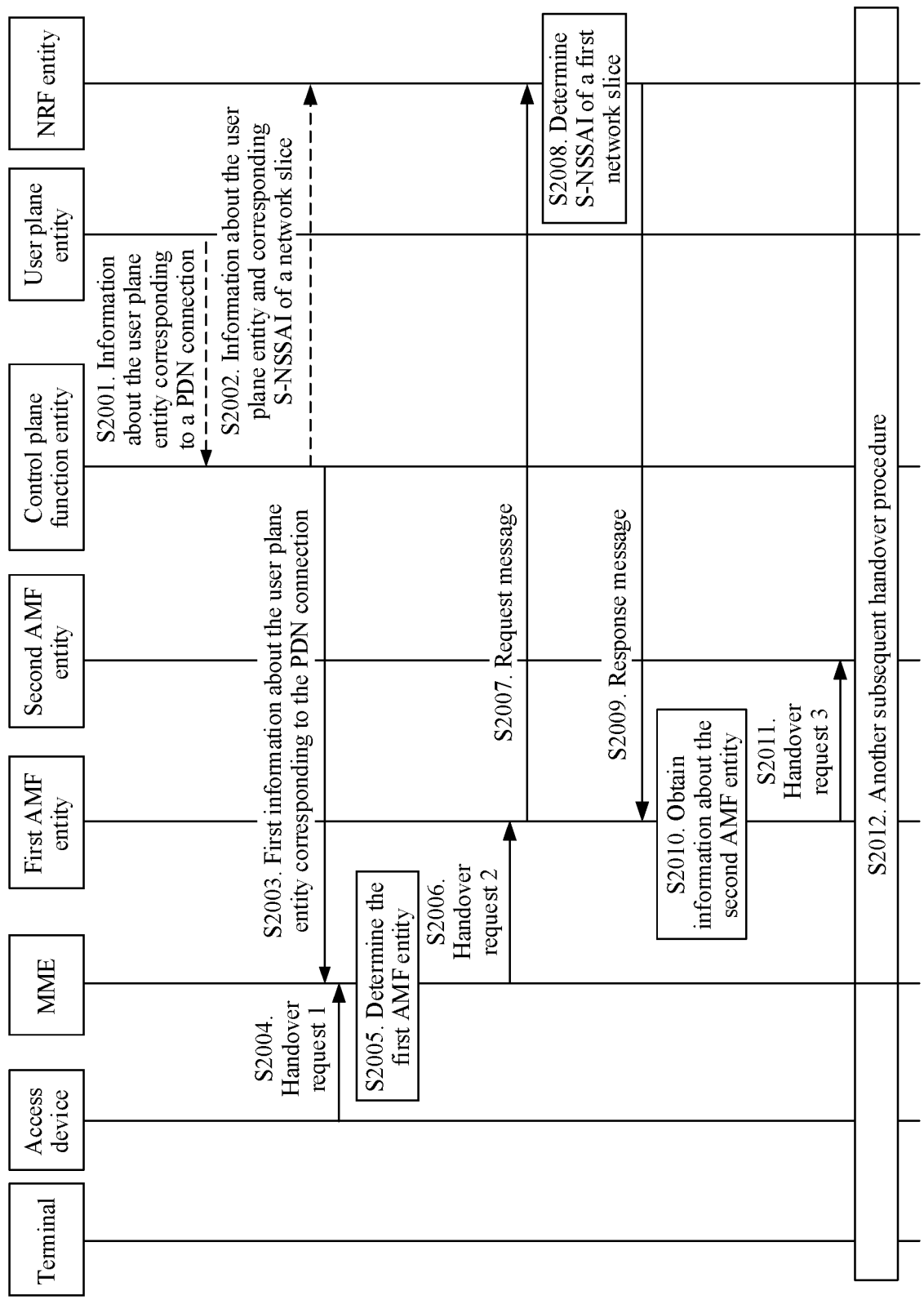
FIG. 20 is a tenth schematic flowchart of a session establishment method according to an embodiment of this application.

Alternatively, optionally, for example, the session establishment system shown in FIG. 18 is applied to the interworking architecture of the 4G network and the 5G network shown in FIG. 1. FIG. 20 shows a session establishment method according to an embodiment of this application. The method includes the following steps.

S2001 is similar to step S1902 in the embodiment shown in FIG. 19. For related descriptions, refer to the embodiment shown in FIG. 19. Details are not described herein again.

It should be noted that step S2001 in this embodiment of this application is an optional step, that is, step S2001 may not alternatively be skipped, and the following step S2002 is directly performed. This is not specifically limited in this embodiment of this application.

S2002. A control plane function entity sends information about a user plane entity and corresponding S-NSSAI of a network slice to an NRF entity, so that the NRF entity receives the information about the user plane entity and the corresponding S-NSSAI of the network slice from the control plane function entity.

Optionally, in this embodiment of this application, the information about the user plane entity and the corresponding S-NSSAI of the network slice may be sent by the user plane entity to the control plane function entity. For example, the information about the user plane entity is information that is about a user plane entity corresponding to a PDN connection and that is sent by the user plane entity to the control plane function entity. Correspondingly, the S-NSSAI that is of the network slice and that corresponds to the information about the user plane entity is S-NSSAI that is of a network slice and that corresponds to the information about the user plane entity corresponding to the PDN connection. Alternatively, the information about the user plane entity and the corresponding S-NSSAI of the network slice may be pre-configured on the control plane function entity. This is not specifically limited in this embodiment of this application.

It should be noted that step S2002 in this embodiment of this application is an optional step, that is, step S2002 may be skipped, and instead, the correspondence between the information about the user plane entity and the S-NSSAI of the network slice is configured on the NRF entity in another manner. For example, when deploying a network, an operator or an OA&M device directly configures, on the NRF, the correspondence between the information about the user plane entity and the S-NSSAI of the network slice. Alternatively, when the control plane function entity registers with the NRF entity, the control plane function entity stores, to the NRF entity, correspondences between information about all user plane entities managed by the control plane function entity and S-NSSAI that is of the network slice and that corresponds to the information about the user plane entity. This is not specifically limited in this embodiment of this application.

S2003 to S2012 are similar to steps S1903 to S1912 in the embodiment shown in FIG. 19. For related descriptions, refer to the embodiment shown in FIG. 19. Details are not described herein again.

According to the session establishment method provided in this embodiment of this application, when a terminal is handed over from an EPC supporting a DCN to a 5GC supporting a network slice, interworking may be achieved and a corresponding session may be established in the network slice of the 5GC based on selected S-NSSAI. For analysis on a related technical effect, refer to the session establishment system part shown in FIG. 18. Details are not described herein again.

The actions of the user plane entity, the control plane function entity, and the first AMF entity in steps S2001 to S2012 may be performed by the processor 301 in the communications device 300 shown in FIG. 3 by invoking the application program code stored in the memory 303. This is not limited in this embodiment of this application.

Figure 21:
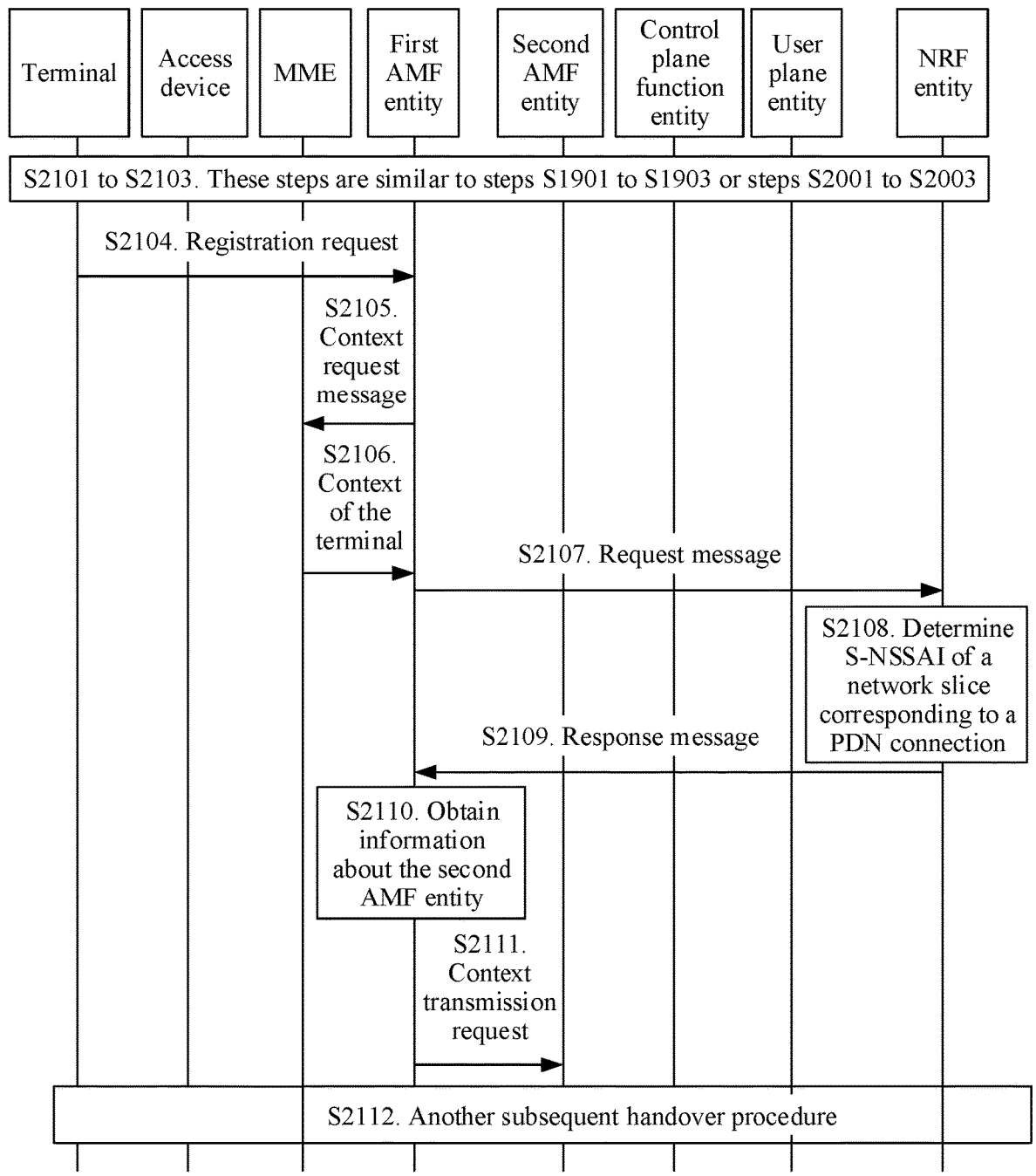
FIG. 21 is an eleventh schematic flowchart of a session establishment method according to an embodiment of this application.

Alternatively, optionally, for example, the session establishment system shown in FIG. 18 is applied to the interworking architecture of the 4G network and the 5G network shown in FIG. 1. FIG. 21 shows a session establishment method according to an embodiment of this application. The method includes the following steps.

S2101 to S2103 are similar to steps S1901 to S1903 in the embodiment shown in FIG. 19 or steps S2001 to S2003 in the embodiment shown in FIG. 20. For related descriptions, refer to the embodiment shown in FIG. 19 or FIG. 20. Details are not described herein again.

S2104. A terminal sends a registration request to a first AMF entity, so that the first AMF entity receives the registration request from the terminal. The registration request carries an identifier of the terminal.

For example, in this embodiment of this application, the identifier of the terminal may be, for example, a globally unique temporary identity (GUTI). This is not specifically limited in this embodiment of this application.

Optionally, the registration request may further carry NSSAI requested by the terminal (also referred to as requested NSSAI), location information of the terminal, and the like. This is not specifically limited in this embodiment of this application.

S2105. The first AMF entity obtains an address of an MME based on the identifier of the terminal, and sends a context request message to the MME, so that the MME receives the context request message from the first AMF entity. The context request message is used to request to obtain a context of the terminal.

S2106. The MME sends the context of the terminal to the first AMF entity, so that the first AMF entity receives the context of the terminal from the MME.

The context of the terminal includes the first information that is of the user plane entity corresponding to the PDN connection and that is sent by the control plane function entity to the MME in step S1903 or step S2003.

S2107 to S2110 are similar to steps S1907 to S1910 in the embodiment shown in FIG. 19. For related descriptions, refer to the embodiment shown in FIG. 19. Details are not described herein again.

In this embodiment of this application, after obtaining S-NSSAI of a first network slice corresponding to the PDN connection, the first AMF entity may store, to the context of the terminal, the S-NSSAI of the first network slice corresponding to the PDN connection. This is not specifically limited in this embodiment of this application.

S2111. The first AMF entity sends a context transmission request to a second AMF entity, so that the second AMF entity receives the context transmission request from the first AMF entity. The context transmission request includes context information of the terminal.

Optionally, in this embodiment of this application, the MME may alternatively obtain, in the manner shown in FIG. 15, information about the control plane function entity corresponding to the PDN connection, add, to the context of the terminal to be sent to the first AMF entity, the information about the control plane function entity corresponding to the PDN connection, and further add, to the context of the terminal to be sent by the first AMF entity to the second AMF entity, the information about the control plane function entity corresponding to the PDN connection. This is not specifically limited in this embodiment of this application.

S2112. Another subsequent handover procedure.

For example, the another subsequent handover procedure may include: selecting, by the second AMF entity, a control plane function entity or a visited SMF (V-SMF) entity based on the S-NSSAI corresponding to the PDN connection, or selecting a control plane function entity based on information about the control plane function entity. For details, refer to 3GPP TS 23.502: "Procedures for the 5G System; Stage 2". Details are not described herein.

Alternatively, optionally, in this embodiment of this application, when the first AMF entity requests, from the NRF entity based on the first information of the user plane entity corresponding to the PDN connection, the S-NSSAI of the first network slice corresponding to the PDN connection, the first AMF entity may request, based on an FQDN of the control plane function entity corresponding to the PDN connection, an address of the control plane function entity, and further send the obtained address of the control plane function entity to the second AMF entity, so that the second AMF entity selects the corresponding control plane function entity based on the address of the control plane function entity. This is not specifically limited in this embodiment of this application.

According to the session establishment method provided in this embodiment of this application, when the terminal is handed over from an EPC supporting a DCN to a 5GC supporting a network slice, interworking may be achieved and a corresponding session may be established in the network slice of the 5GC based on selected S-NSSAI. For analysis on a related technical effect, refer to the session establishment system part shown in FIG. 18. Details are not described herein again.

The actions of the user plane entity, the control plane function entity, and the first AMF entity in steps S2101 to S2112 may be performed by the processor 301 in the communications device 300 shown in FIG. 3 by invoking the application program code stored in the memory 303. This is not limited in this embodiment of this application.

The solutions provided in the embodiments of this application are mainly described from the perspective of interaction between network elements. It may be understood that, to implement the foregoing functions, the terminal, the first mobility management entity, and the second mobility management entity include corresponding hardware structures and/or software modules for performing the functions. A person of ordinary skill in the art should easily be aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal, the first mobility management entity, and the second mobility management entity may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 8:
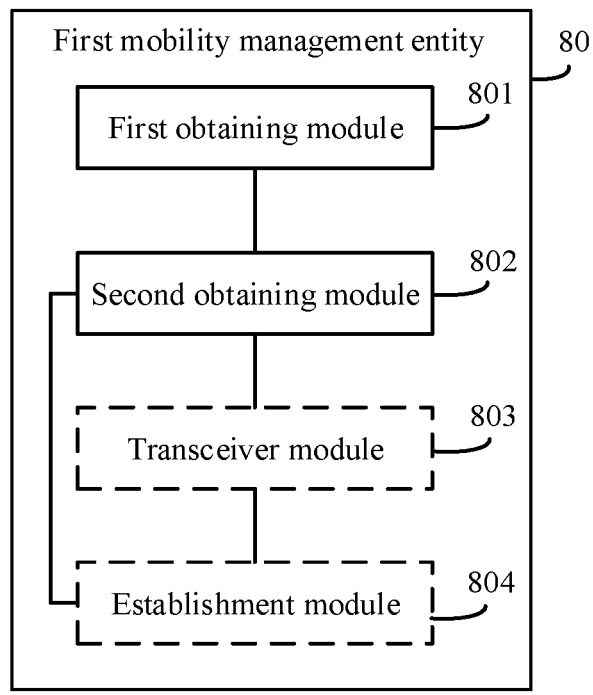
FIG. 8 is a schematic structural diagram of a first mobility management entity according to an embodiment of this application.

For example, if the functional modules are obtained through division in an integration manner, FIG. 8 is a schematic structural diagram of the first mobility management entity 80 in the foregoing embodiments. As shown in FIG. 8, the first mobility management entity 80 includes a first obtaining module 801 and a second obtaining module 802. The first obtaining module 801 is configured to obtain information about a PDN connection that has been established when a terminal accesses an EPC. The second obtaining module 802 is configured to obtain, based on the information about the PDN connection, S-NSSAI of a network slice corresponding to the PDN connection, where the S-NSSAI of the network slice corresponding to the PDN connection is used to indicate a network slice for establishing a PDU session.

Optionally, the second obtaining module 802 is further configured to obtain information about a second mobility management entity.

Optionally, that the second obtaining module 802 is configured to obtain, based on the information about the PDN connection, S-NSSAI of a network slice corresponding to the PDN connection includes: determining, based on the information about the PDN connection, the S-NSSAI of the network slice corresponding to the PDN connection.

In a possible implementation, the information about the PDN connection includes an APN corresponding to the PDN connection; and that the second obtaining module 802 is configured to determine, based on the information about the PDN connection, the S-NSSAI of the network slice corresponding to the PDN connection includes: determining, based on the APN and a pre-configured correspondence between an APN and S-NSSAI, the S-NSSAI of the network slice corresponding to the PDN connection.

Further, the pre-configured correspondence between an APN and S-NSSAI includes a one-to-many relationship between an APN and S-NSSAI; and that the second obtaining module 802 is configured to determine, based on the APN and a pre-configured correspondence between an APN and S-NSSAI, the S-NSSAI of the network slice corresponding to the PDN connection includes: determining the S-NSSAI of the network slice corresponding to the PDN connection, based on the APN, a pre-configured one-to-many relationship between an APN and S-NSSAI, and at least one of the following information in the pre-configured one-to-many relationship between an APN and S-NSSAI: a priority of each piece of S-NSSAI, load information of a network slice indicated by each piece of S-NSSAI, and NSSAI supported by a mobility management entity set configured in the first mobility management entity 80.

In another possible implementation, the information about the PDN connection includes information about a control plane function entity corresponding to the PDN connection; and that the second obtaining module 802 is configured to determine, based on the information about the PDN connection, the S-NSSAI of the network slice corresponding to the PDN connection includes: determining, based on the information about the control plane function entity, the S-NSSAI of the network slice corresponding to the PDN connection.

In another possible implementation, the information about the PDN connection includes the information about the control plane function entity corresponding to the PDN connection; and that the second obtaining module 802 is configured to obtain, based on the information about the PDN connection, S-NSSAI of a network slice corresponding to the PDN connection includes: sending a request message to the control plane function entity based on the information about the control plane function entity, where the request message is used to request to obtain the S-NSSAI of the network slice corresponding to the PDN connection; and receiving, from the control plane function entity, the S-NSSAI of the network slice corresponding to the PDN connection.

Optionally, that the second obtaining module 802 is further configured to obtain information about a second mobility management entity includes: obtaining the information about the second mobility management entity based on the S-NSSAI of the network slice corresponding to the PDN connection.

In a possible implementation, that the second obtaining module 802 is configured to obtain the information about the second mobility management entity based on the S-NSSAI of the network slice corresponding to the PDN connection includes: determining, based on the information about the PDN connection, a network slice instance corresponding to the PDN connection; and determining the information about the second mobility management entity based on the S-NSSAI of the network slice corresponding to the PDN connection and information about the network slice instance.

In a possible implementation, that the second obtaining module 802 is configured to obtain the information about the second mobility management entity based on the S-NSSAI of the network slice corresponding to the PDN connection includes: sending, to an NSSF entity, the S-NSSAI of the network slice corresponding to the PDN connection, where the S-NSSAI of the network slice corresponding to the PDN connection is used to determine the information about the second mobility management entity; and receiving the information about the second mobility management entity from the NSSF entity.

Optionally, that the second obtaining module 802 is configured to obtain, based on the information about the PDN connection, S-NSSAI of a network slice corresponding to the PDN connection; and that the second obtaining module 802 is further configured to obtain information about a second mobility management entity include: sending a slice selection request message to an NSSF entity, where the slice selection request message carries the information about the PDN connection, and the information about the PDN connection is used to determine the information about the second mobility management entity and the S-NSSAI of the network slice corresponding to the PDN connection; receiving, from the NSSF entity, information about a candidate mobility management entity set and the S-NSSAI of the network slice corresponding to the PDN connection; and selecting the second mobility management entity from the candidate mobility management entity set based on the information about the candidate mobility management entity set.

Alternatively, optionally, that the second obtaining module 802 is configured to obtain, based on the information about the PDN connection, S-NSSAI of a network slice corresponding to the PDN connection; and that the second obtaining module 802 is further configured to obtain information about a second mobility management entity include: sending a slice selection request message to an NSSF entity, where the slice selection request message carries the information about the PDN connection, and the information about the PDN connection is used to determine the information about the second mobility management entity and the S-NSSAI of the network slice corresponding to the PDN connection; and receiving, from the NSSF entity, the S-NS- SAI of the network slice corresponding to the PDN connection and the information about the second mobility management entity.

In a possible implementation, the first mobility management entity 80 is different from the second mobility management entity. The first mobility management entity 80 further includes a transceiver module 803. The transceiver module 803 is configured to send, to the second mobility management entity, the S-NSSAI of the network slice corresponding to the PDN connection.

The transceiver module 803 is specifically configured to send, to the second mobility management entity by using an access device, the S-NSSAI of the network slice corresponding to the PDN connection.

In another possible implementation, the first mobility management entity 80 is the same as the second mobility management entity. The first mobility management entity 80 further includes a transceiver module 803 and an establishment module 804. The transceiver module 803 is configured to send a registration accept message to the terminal, where the registration accept message carries the S-NSSAI of the network slice corresponding to the PDN connection. The transceiver module 803 is further configured to receive a PDU session establishment request from the terminal, where the PDU session establishment request carries the S-NSSAI of the network slice corresponding to the PDN connection. The establishment module 804 is configured to establish, based on the S-NSSAI of the network slice corresponding to the PDN connection, the PDU session in the network slice corresponding to the PDN connection.

In another possible implementation, the first mobility management entity 80 is the same as the second mobility management entity. The first mobility management entity 80 further includes a transceiver module 803 and an establishment module 804. The transceiver module 803 is configured to send a registration accept message to the terminal. The transceiver module 803 is further configured to receive a PDU session establishment request from the terminal, where the PDU session establishment request carries S-NSSAI that is of a network slice and that is requested by the terminal and an APN that corresponds to a PDN connection and that is requested by the terminal. The establishment module 804 is configured to: when the S-NSSAI that is of the network slice and that is requested by the terminal is the same as pre-stored S-NSSAI of the network slice corresponding to the PDN connection, and the APN that corresponds to the PDN connection and that is requested by the terminal is the same as the APN corresponding to the PDN connection, establish, based on the S-NSSAI of the network slice corresponding to the PDN connection, the PDU session in the network slice corresponding to the PDN connection.

All related content of the steps in the foregoing method embodiments may be cited in function descriptions of corresponding functional modules. Details are not described herein again.

In this embodiment, the first mobility management entity 80 is presented with the functional modules obtained through division in an integration manner. The "module" herein may be an application-specific integrated circuit (ASIC), a processor and a memory for executing one or more software or firmware programs, an integrated logic circuit, and/or another component that can provide the foregoing function. In a simple embodiment, a person skilled in the art may figure out that the first mobility management entity 80 may be in a form shown in FIG. 3.

For example, the processor 301 in FIG. 3 may invoke the computer-executable instruction stored in the memory 303, so that the first mobility management entity 80 performs the session establishment method in the foregoing method embodiments.

Specifically, functions/implementation processes of the first obtaining module 801, the second obtaining module 802, the transceiver module 803, and the establishment module 804 in FIG. 8 may be implemented by the processor 301 in FIG. 3 by invoking the computer-executable instruction stored in the memory 303. Alternatively, functions/implementation processes of the first obtaining module 801, the second obtaining module 802, and the establishment module 804 in FIG. 8 may be implemented by the processor 301 in FIG. 3 by invoking the computer-executable instruction stored in the memory 303; and a function/an implementation process of the transceiver module 803 in FIG. 8 may be implemented by using the communications interface 304 in FIG. 3.

Because the first mobility management entity provided in the embodiments of this application may be configured to perform the foregoing session establishment method, for a technical effect that can be obtained by the first mobility management entity, refer to the foregoing method embodiments. Details are not described herein again.

Figure 9:
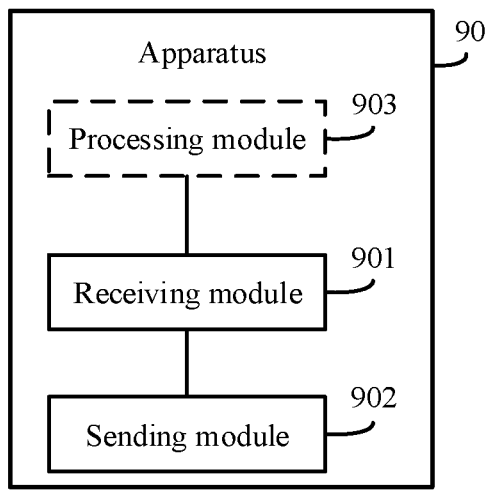
FIG. 9 is a schematic structural diagram of an apparatus according to an embodiment of this application.

For example, if the functional modules are obtained through division in an integration manner, FIG. 9 is a schematic structural diagram of an apparatus 90. The apparatus 90 may be a terminal or a chip in a terminal. This is not specifically limited in this embodiment of this application. The apparatus 90 includes a receiving module 901 and a sending module 902. The sending module 902 is configured to send a registration request message to a first mobility management entity, where the registration request message carries an identifier of the terminal, the identifier of the terminal is used to obtain subscription data of the terminal, and the subscription data includes information about a PDN connection that has been established when the terminal accesses an EPC. The receiving module 901 is further configured to receive a registration accept message, where the registration accept message carries S-NSSAI of a network slice corresponding to the PDN connection. The sending module 902 is further configured to send a PDU session establishment request, where the PDU session establishment request carries the S-NSSAI of the network slice corresponding to the PDN connection, and the PDU session establishment request is used to request to establish a PDU session in the network slice corresponding to the PDN connection.

Optionally, the registration accept message further carries information about a PDN connection allowed to be handed over. The apparatus 90 further includes a processing module 903. The processing module 903 is configured to release, based on the information about the PDN connection allowed to be handed over, all PDN connections, in the EPC, other than the PDN connection allowed to be handed over.

All related content of the steps in the foregoing method embodiments may be cited in function descriptions of corresponding functional modules. Details are not described herein again.

In this embodiment, the apparatus 90 is presented with the functional modules obtained through division in an integration manner. The "module" herein may be an ASIC, a processor and a memory for executing one or more software or firmware programs, an integrated logic circuit, and/or another component that can provide the foregoing function.

In a simple embodiment, a person skilled in the art may figure out that the apparatus 90 may be in a form shown in FIG. 3.

For example, the processor 301 in FIG. 3 may invoke the computer-executable instruction stored in the memory 303, so that the apparatus 90 performs the session establishment method in the foregoing method embodiments.

Specifically, functions/implementation processes of the receiving module 901, the sending module 902, and the processing module 903 in FIG. 9 may be implemented by the processor 301 in FIG. 3 by invoking the computer-executable instruction stored in the memory 303. Alternatively, a function/an implementation process of the processing module 903 in FIG. 9 may be implemented by the processor 301 in FIG. 3 by invoking the computer-executable instruction stored in the memory 303; and functions/implementation processes of the receiving module 901 and the sending module 902 in FIG. 9 may be implemented by using the communications interface 304 in FIG. 3.

Optionally, when the apparatus 90 is a chip, functions/implementation processes of the receiving module 901 and the sending module 902 may alternatively be implemented by using a pin, a circuit, or the like. Optionally, when the apparatus 90 is a chip, the memory 303 may be a storage unit in the chip, for example, a register or a cache. Certainly, when the apparatus 90 is a terminal, the memory 303 may be a storage unit, in the terminal, outside the chip. This is not specifically limited in this embodiment of this application.

Because the apparatus provided in this embodiment of this application may be configured to perform the foregoing session establishment method, for a technical effect that can be obtained by the apparatus, refer to the foregoing method embodiments. Details are not described herein again.

Figure 10:
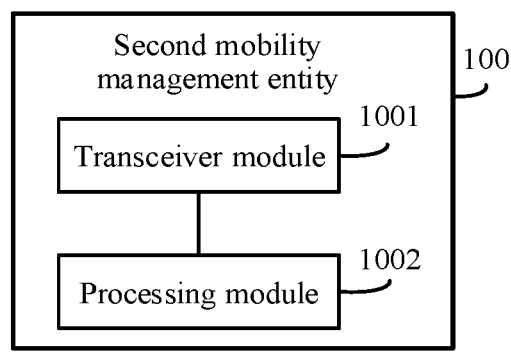
FIG. 10 is a schematic structural diagram of a second mobility management entity according to an embodiment of this application.

For example, if the functional modules are obtained through division in an integration manner, FIG. 10 is a schematic structural diagram of a second mobility management entity 100. The second mobility management entity 100 includes a transceiver module 1001 and a processing module 1002. The transceiver module 1001 is configured to receive, from a first mobility management entity, S-NSSAI of a network slice corresponding to a PDN connection that has been established when a terminal accesses an EPC. The transceiver module 1001 is further configured to send a registration accept message to the terminal. The transceiver module 1001 is further configured to receive a PDU session establishment request from the terminal, where the PDU session establishment request is used to request to establish a PDU session in the network slice corresponding to the PDN connection. The processing module 1002 is configured to establish, based on the S-NSSAI of the network slice corresponding to the PDN connection, the PDU session in the network slice corresponding to the PDN connection.

All related content of the steps in the foregoing method embodiments may be cited in function descriptions of corresponding functional modules. Details are not described herein again.

In this embodiment, the second mobility management entity 100 is presented with the functional modules obtained through division in an integration manner. The "module" herein may be an ASIC, a processor and a memory for executing one or more software or firmware programs, an integrated logic circuit, and/or another component that can provide the foregoing function. In a simple embodiment, a person skilled in the art may figure out that the second mobility management entity 100 may be in a form shown in FIG. 3.

For example, the processor 301 in FIG. 3 may invoke the computer-executable instruction stored in the memory 303, so that the second mobility management entity 100 performs the session establishment method in the foregoing method embodiments.

Specifically, functions/implementation processes of the transceiver module 1001 and the processing module 1002 in FIG. 10 may be implemented by the processor 301 in FIG. 3 by invoking the computer-executable instruction stored in the memory 303. Alternatively, a function/an implementation process of the processing module 1002 in FIG. 10 may be implemented by the processor 301 in FIG. 3 by invoking the computer-executable instruction stored in the memory 303; and a function/an implementation process of the transceiver module 1001 in FIG. 10 may be implemented by using the communications interface 304 in FIG. 3.

Because the second mobility management entity provided in the embodiments of this application may be configured to perform the foregoing session establishment method, for a technical effect that can be obtained by the second mobility management entity, refer to the foregoing method embodiments. Details are not described herein again.

In the foregoing embodiments, the first mobility management entity 80, the apparatus 90, and the second mobility management entity 100 are all presented with the functional modules obtained through division in an integration manner. Certainly, in the embodiments of this application, functional modules of the first mobility management entity, the apparatus, and the second mobility management entity may alternatively be obtained through division based on corresponding functions. This is not specifically limited in the embodiments of this application.

Optionally, an embodiment of this application provides a chip system. The chip system includes a processor, configured to support a first mobility management entity in implementing the foregoing session establishment method, for example, obtaining, based on information about a PDN connection, S-NSSAI of a network slice corresponding to the PDN connection. In a possible design, the chip system further includes a memory. The memory is configured to store a program instruction and data that are necessary for the first mobility management entity. The chip system may include a chip, or may include a chip and another discrete component. This is not specifically limited in this embodiment of this application.

Optionally, an embodiment of this application provides a chip system. The chip system includes a processor, configured to support a second mobility management entity in implementing the foregoing session establishment method, for example, establishing, based on S-NSSAI of a network slice corresponding to a PDN connection, a PDU session in the network slice corresponding to the PDN connection. In a possible design, the chip system further includes a memory. The memory is configured to store a program instruction and data that are necessary for the second mobility management entity. The chip system may include a chip, or may include a chip and another discrete component. This is not specifically limited in this embodiment of this application.

Figure 17:
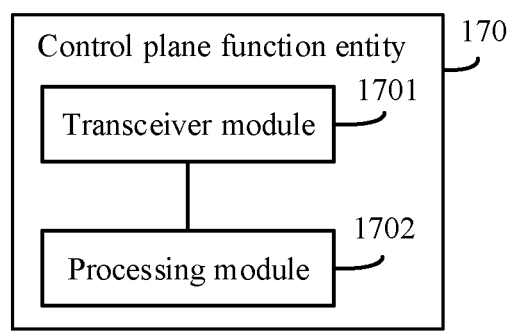
FIG. 17 is a schematic structural diagram of a control plane function entity according to an embodiment of this application.

For example, if the functional modules are obtained through division in an integration manner, FIG. 17 is a schematic structural diagram of the control plane function entity 170 in the foregoing embodiments. As shown in FIG. 17, the control plane function entity 170 includes a transceiver module 1701 and a processing module 1702. The processing module 1702 is configured to obtain information about a PDN connection that has been established when a terminal accesses an EPC and S-NSSAI of a network slice corresponding to the PDN connection. The transceiver module 1701 is configured to send, to a network storage function entity, the information about the PDN connection and the S-NSSAI of the network slice corresponding to the PDN connection; and the first mobility management entity obtains, from the network storage function entity based on the information about the PDN connection, the S-NSSAI of the network slice corresponding to the PDN connection, where the S-NSSAI of the network slice corresponding to the PDN connection is used to indicate a network slice for establishing a protocol data unit PDU session.

Optionally, the transceiver module 1701 is specifically configured to: in a process of establishing the PDN connection or in a process of establishing the PDU session, send, to the network storage function entity, the information about the PDN connection and the S-NSSAI of the network slice corresponding to the PDN connection.

Optionally, the transceiver module 1701 is further configured to send the information about the PDN connection to a third mobility management entity in the EPC. The third mobility management entity sends the information about the PDN connection to the first mobility management entity.

Optionally, the processing module 1702 is specifically configured to: determine S-NSSAI corresponding to the PDU session as the S-NSSAI of the network slice corresponding to the PDN connection when the PDU session is handed over to the EPC.

For example, if the functional modules are obtained through division in an integration manner, FIG. 10 is a schematic structural diagram of a second mobility management entity 100. The second mobility management entity 100 includes a transceiver module 1001 and a processing module 1002. The transceiver module 1001 is configured to receive, from a first mobility management entity, S-NSSAI of a network slice corresponding to a PDN connection that has been established when a terminal accesses an EPC. The transceiver module 1001 is further configured to send a registration accept message to the terminal. The transceiver module 1001 is further configured to receive a PDU session establishment request from the terminal, where the PDU session establishment request is used to request to establish a PDU session in the network slice corresponding to the PDN connection. The processing module 1002 is configured to establish, based on the S-NSSAI of the network slice corresponding to the PDN connection, the PDU session in the network slice corresponding to the PDN connection.

All related content of the steps in the foregoing method embodiments may be cited in function descriptions of corresponding functional modules. Details are not described herein again.

In this embodiment, the control plane function entity 170 is presented with the functional modules obtained through division in an integration manner. The "module" herein may be an ASIC, a processor and a memory for executing one or more software or firmware programs, an integrated logic circuit, and/or another component that can provide the foregoing function. In a simple embodiment, a person skilled in the art may figure out that the control plane function entity 170 may be in a form shown in FIG. 3.

For example, the processor 301 in FIG. 3 may invoke the computer-executable instruction stored in the memory 303, so that the control plane function entity 170 performs the session establishment method in the foregoing method embodiments.

Specifically, functions/implementation processes of the transceiver module 1701 and the processing module 1702 in FIG. 17 may be implemented by the processor 301 in FIG. 3 by invoking the computer-executable instruction stored in the memory 303. Alternatively, a function/an implementation process of the processing module 1702 in FIG. 17 may be implemented by the processor 301 in FIG. 3 by invoking the computer-executable instruction stored in the memory 303; and a function/an implementation process of the transceiver module 1701 in FIG. 17 may be implemented by using the communications interface 304 in FIG. 3.

Because the control plane function entity provided in this embodiment of this application may be configured to perform the foregoing session establishment method, for a technical effect that can be obtained by the control plane function entity, refer to the foregoing method embodiments. Details are not described herein again.

Optionally, an embodiment of this application provides a chip system. The chip system includes a processor, configured to support a control plane function entity in implementing the foregoing session establishment method, for example, obtaining information about a PDN connection that has been established when a terminal accesses an EPC and S-NSSAI of a network slice corresponding to the PDN connection. In a possible design, the chip system further includes a memory. The memory is configured to store a program instruction and data that are necessary for the control plane function entity. The chip system may include a chip, or may include a chip and another discrete component. This is not specifically limited in this embodiment of this application.

Figure 22:
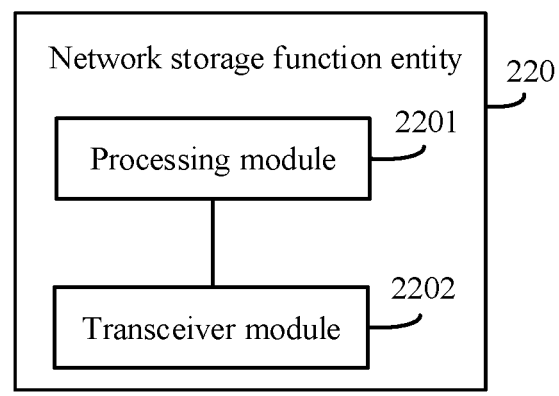
FIG. 22 is a schematic structural diagram of a network storage function entity according to an embodiment of this application.

Alternatively, for example, if the functional modules are obtained through division in an integration manner, FIG. 22 is a schematic structural diagram of a network storage function entity 220. The network storage function entity 220 includes a processing module 2201 and a transceiver module 2202. The transceiver module 2202 is configured to receive, from a first mobility management entity, first information of a user plane entity corresponding to a PDN connection. The processing module 2201 is configured to determine, based on the first information, S-NSSAI of a first network slice corresponding to the PDN connection. The transceiver module is further configured to send the S-NSSAI of the first network slice to the first mobility management entity.

Optionally, the transceiver module 2202 is further configured to receive, from the user plane entity, the first information and the S-NSSAI that is of the first network slice and that corresponds to the first information.

All related content of the steps in the foregoing method embodiments may be cited in function descriptions of corresponding functional modules. Details are not described herein again.

In this embodiment, the network storage function entity 220 is presented with the functional modules obtained through division in an integration manner. The "module" herein may be an ASIC, a processor and a memory for executing one or more software or firmware programs, an integrated logic circuit, and/or another component that can provide the foregoing function. In a simple embodiment, a person skilled in the art may figure out that the network storage function entity 220 may be in a form shown in FIG. 3.

For example, the processor 301 in FIG. 3 may invoke the computer-executable instruction stored in the memory 303, so that the network storage function entity 220 performs the session establishment method in the foregoing method embodiments.

Specifically, functions/implementation processes of the transceiver module 2202 and the processing module 2201 in FIG. 22 may be implemented by the processor 301 in FIG. 3 by invoking the computer-executable instruction stored in the memory 303. Alternatively, a function/an implementation process of the processing module 2201 in FIG. 22 may be implemented by the processor 301 in FIG. 3 by invoking the computer-executable instruction stored in the memory 303; and a function/an implementation process of the transceiver module 2202 in FIG. 22 may be implemented by using the communications interface 304 in FIG. 3.

Because the network storage function entity 220 provided in this embodiment may perform the foregoing session establishment method, for a technical effect that can be obtained by the network storage function entity 220, refer to the foregoing method embodiments. Details are not described herein again.

Optionally, an embodiment of this application further provides an apparatus (for example, the apparatus may be a chip system). The apparatus includes a processor, configured to support a network storage function entity in implementing the foregoing session establishment method, for example, determining, based on first information, S-NSSAI of a first network slice corresponding to a PDN connection. In a possible design, the apparatus further includes a memory. The memory is configured to store a program instruction and data that are necessary for a network storage function entity. Certainly, the memory may alternatively not be in the apparatus. When the apparatus is a chip system, the apparatus may include a chip, or may include a chip and another discrete component. This is not specifically limited in this embodiment of this application.

Figure 23:
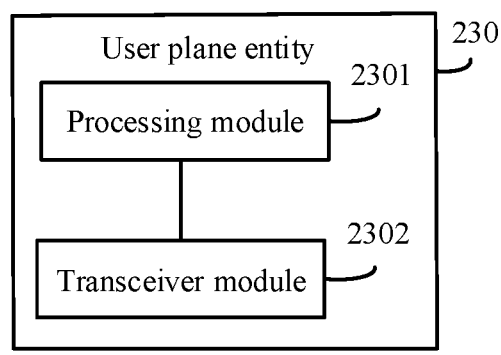
FIG. 23 is a schematic structural diagram of a user plane entity according to an embodiment of this application.

Alternatively, for example, if the functional modules are obtained through division in an integration manner, FIG. 23 is a schematic structural diagram of a user plane entity 230. The user plane entity 230 includes a processing module 2301 and a transceiver module 2302. The processing module 2301 is configured to obtain information about the user plane entity and S-NSSAI that is of a network slice and that corresponds to the information about the user plane entity. The transceiver module is configured to send the information about the user plane entity and the S-NSSAI of the network slice to a network storage function entity, and a first mobility management entity obtains, from the network storage function entity based on first information of a user plane entity corresponding to a PDN connection, S-NSSAI of a first network slice corresponding to the PDN connection.

Optionally, the transceiver module 2302 is specifically configured to: in a process in which the user plane entity registers with the network storage function entity, or in a process of establishing the PDN connection, or in an establishment process of a protocol data unit PDU session, send the information about the user plane entity and the S-NSSAI of the network slice to the network storage function entity.

All related content of the steps in the foregoing method embodiments may be cited in function descriptions of corresponding functional modules. Details are not described herein again.

In this embodiment, the user plane entity 230 is presented with the functional modules obtained through division in an integration manner. The "module" herein may be an ASIC, a processor and a memory for executing one or more software or firmware programs, an integrated logic circuit, and/or another component that can provide the foregoing function. In a simple embodiment, a person skilled in the art may figure out that the user plane entity 230 may be in a form shown in FIG. 3.

For example, the processor 301 in FIG. 3 may invoke the computer-executable instruction stored in the memory 303, so that the user plane entity 230 performs the session establishment method in the foregoing method embodiments.

Specifically, functions/implementation processes of the transceiver module 2302 and the processing module 2301 in FIG. 23 may be implemented by the processor 301 in FIG. 3 by invoking the computer-executable instruction stored in the memory 303. Alternatively, a function/an implementation process of the processing module 2301 in FIG. 23 may be implemented by the processor 301 in FIG. 3 by invoking the computer-executable instruction stored in the memory 303; and a function/an implementation process of the transceiver module 2302 in FIG. 23 may be implemented by using the communications interface 304 in FIG. 3.

Because the user plane entity 230 provided in this embodiment may perform the foregoing session establishment method, for a technical effect that can be obtained by the user plane entity 230, refer to the foregoing method embodiments. Details are not described herein again.

Optionally, an embodiment of this application further provides an apparatus (for example, the apparatus may be a chip system). The apparatus includes a processor, configured to support a user plane entity in implementing the foregoing session establishment method, for example, obtaining information about the user plane entity and S-NSSAI that is of a network slice and that corresponds to the information about the user plane entity. In a possible design, the apparatus further includes a memory. The memory is configured to store a program instruction and data that are necessary for the user plane entity. Certainly, the memory may alternatively not be in the apparatus. When the apparatus is a chip system, the apparatus may include a chip, or may include a chip and another discrete component. This is not specifically limited in this embodiment of this application.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD), or the like. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "including (comprising)" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A session establishment method, comprising:
    obtaining, by a first mobility management entity in a network supporting network slice, information about a first connection that has been established when a terminal accesses a first network, wherein the information about the first connection comprises information about a control plane function entity corresponding to the first connection;
    sending, by the first mobility management entity to the control plane function entity, a request message requesting an identification information of a network slice corresponding to the first connection based on the information about the control plane function entity;
    in response to the request message, determining, by the control plane function entity, the identification information of the network slice and sending the identification information of the network slice to the first mobility management entity, wherein the determining the identification information of the network slice comprises:
        determining a piece of S-NSSAI supported by the control plane function entity as the identification information of the network slice; or
        determining, based on at least one of subscription information of the terminal or a local policy, the identification information of the network slice; and
    receiving, by the first mobility management entity from the control plane function entity, the identification information of the network slice.

2. The method according to claim 1, wherein the identification information of the network slice indicates a network slice for establishing a protocol data unit (PDU) session.

3. The method according to claim 1, wherein the information about the control plane function entity comprises at least one of an internet protocol (IP) address or a fully qualified domain name (FQDN) of the control plane function entity.

4. The method according to claim 1, further comprising:
    obtaining, by the first mobility management entity, information about a second mobility management entity.

5. The method according to claim 4, further comprising:
    sending, by the first mobility management entity to the second mobility management entity, the identification information of the network slice; and
    receiving, by the second mobility management entity from the first mobility management entity, the identification information of the network slice.

6. The method according to claim 4, wherein the obtaining, by the first mobility management entity, information about a second mobility management entity comprises:
    obtaining, by the first mobility management entity, the information about the second mobility management entity based on the identification information of the network slice.

7. The method according to claim 4, wherein the method further comprises:
    sending, by the first mobility management entity to the second mobility management entity, the identification information of the network slice.

8. The method according to claim 7, wherein the sending, by the first mobility management entity to the second mobility management entity, the identification information of the network slice comprises:
    sending, by the first mobility management entity to the second mobility management entity through an access device, the identification information of the network slice.

9. The method according to claim 1, the first network is an evolved packet core (EPC), the first connection is a packet data network (PDN) connection, and the identification information of the network slice is a single network slice selection assistance information (S-NSSAI).

10. The method according to claim 1, wherein the first mobility management entity includes an access and mobility management function (AMF) entity.

11. The method according to claim 1, wherein the network supporting network slice includes a fifth generation (5G) network.

12. The method according to claim 1, wherein the network supporting network slice is not an EPC network.

13. The method according to claim 1, wherein the control plane function entity comprises a PDN gateway control plane function (PGW-C) entity and a session management function (SMF) entity.

14. A session establishment system, comprising a first mobility management entity in a network supporting network slice and a control plane function entity, wherein
    the first mobility management entity comprises at least one processor and one or more memories coupled to the at least one processor and storing programming instructions for execution by the at least one processor to cause the first mobility management entity to:
        obtain information about a first connection that has been established when a terminal accesses a first network, wherein the information about the first connection comprises information about a control plane function entity corresponding to the first connection;
        send, to the control plane function entity, a request message requesting an identification information of a network slice corresponding to the first connection based on the information about the control plane function entity; and receive, from the control plane function entity, identification information of the network slice; and the control plane function entity comprises at least one processor and one or more memories coupled to the at least one processor and storing programming instructions for execution by the at least one processor to cause the control plane function entity to:

in response to the request message, determine the identification information of the network slice, and send the identification information of the network slice to the first mobility management entity, wherein the determine the identification information of the network slice comprises:

determining a piece of S-NSSAI supported by the control plane function entity as the identification information of the network slice; or determining, based on at least one of subscription information of the terminal or a local policy, the identification information of the network slice.

15. The session establishment system according to claim 14, wherein the identification information of the network slice indicates a network slice for establishing a protocol data unit (PDU) session.

16. The session establishment system according to claim 14, wherein the information about the control plane function entity comprises at least one of an internet protocol (IP) address or a fully qualified domain name (FQDN) of the control plane function entity.

17. The session establishment system according to claim 14, wherein the first mobility management entity is further caused to:

obtain information about a second mobility management entity.

18. The session establishment system according to claim 17, wherein the first mobility management entity is further caused to:

send, to the second mobility management entity, the identification information of the network slice; and wherein the second mobility management entity is further configured to: receive, from the first mobility management entity, the identification information of the network slice.

19. The session establishment system according to claim 17, wherein the first mobility management entity is further caused to:

obtain the information about the second mobility management entity based on the identification information of the network slice.

20. The session establishment system according to claim 17, wherein the first mobility management entity is further configured to:

send, to the second mobility management entity, the identification information of the network slice.

21. The session establishment system according to claim 20, wherein the first mobility management entity is further caused to:

send, to the second mobility management entity through an access device, the identification information of the network slice.

22. The session establishment system according to claim 14, the first network is an evolved packet core (EPC), the first connection is a packet data network (PDN) connection, and the identification information of the network slice is a single network slice selection assistance information (S-NSSAI).

23. The session establishment system according to claim 14, wherein the first mobility management entity includes an access and mobility management function (AMF) entity.

24. The session establishment system according to claim 14, wherein the network supporting network slice includes a fifth generation (5G) network.

25. The session establishment system according to claim 14, wherein the network supporting network slice is not an EPC network.

26. The session establishment system according to claim 14, wherein the control plane function entity comprises a PDN gateway control plane function (PGW-C) entity and a session management function (SMF) entity.

* * * * *